United States Patent [19]

Haraguchi et al.

[11] Patent Number: 5,280,317
[45] Date of Patent: * Jan. 18, 1994

[54] LENS SHUTTER CAMERA INCLUDING ZOOM LENS DRIVE SYSTEM

[75] Inventors: Keisuke Haraguchi; Shinsuke Kohmoto; Takeo Kobayashi; Shigeru Kondoh; Hideki Ohkubo; Norio Numako; Saburo Sugawara, all of Tokyo, Japan

[73] Assignee: Asahi Kogaku Kogyo Kabushiki Kaisha, Tokyo, Japan

[*] Notice: The portion of the term of this patent subsequent to Jun. 26, 2007 has been disclaimed.

[21] Appl. No.: 884,479

[22] Filed: May 13, 1992

Related U.S. Application Data

[63] Continuation of Ser. No. 633,023, Dec. 24, 1990, abandoned, which is a continuation of Ser. No. 510,676, Apr. 18, 1990, Pat. No. 5,162,831, which is a continuation of Ser. No. 143,946, Jan. 7, 1988, Pat. No. 4,936,664.

[30] Foreign Application Priority Data

| May 12, 1986 | [JP] | Japan | 61-108278 |
| Sep. 19, 1986 | [JP] | Japan | 61-143964 |
| Nov. 26, 1986 | [JP] | Japan | 61-181723 |
| Feb. 5, 1987 | [JP] | Japan | 62-15853 |

[51] Int. Cl.$^5$ .............................................. G03B 5/00
[52] U.S. Cl. ................................................ 354/195.1
[58] Field of Search ........... 354/195.1, 195.12, 195.13, 354/199, 233; 358/225, 227

[56] References Cited

U.S. PATENT DOCUMENTS

| 2,995,061 | 8/1961 | Briskin et al. | 354/199 |
| 3,048,092 | 8/1962 | Gottschalk | 354/195.1 |
| 3,200,699 | 8/1965 | Graves | 354/222 |
| 3,246,590 | 4/1966 | Jenkins | 354/195.1 |
| 3,260,184 | 7/1966 | Pagel et al. | 354/195.1 |
| 3,701,309 | 10/1972 | Thiele et al. | 354/195.1 |
| 3,834,796 | 9/1974 | Komine | 350/429 |
| 3,884,555 | 5/1975 | Suwa et al. | 350/429 |
| 3,927,414 | 12/1975 | Moriyama et al. | 354/195.1 |
| 3,972,056 | 7/1976 | Tsujimoto et al. | 354/402 |
| 3,978,503 | 8/1976 | Shono | 354/250 |
| 3,980,398 | 9/1976 | Belvard | 350/430 |
| 4,043,642 | 8/1976 | Hirose et al. | 350/429 X |
| 4,110,005 | 8/1978 | Bohm et al. | 350/430 X |
| 4,122,466 | 10/1978 | Iwata | 354/413 |
| 4,129,369 | 12/1978 | Kobayashi et al. | 354/195.12 |
| 4,132,463 | 1/1979 | Sakaguchi et al. | 359/693 |
| 4,156,933 | 5/1979 | Pandres, Jr. | 350/429 X |
| 4,161,756 | 7/1979 | Thomas | 350/429 X |
| 4,171,887 | 10/1979 | Hayata | 354/199 X |
| 4,367,934 | 1/1983 | Matsui | 354/403 |
| 4,404,595 | 9/1983 | Ushiro | 354/402 X |
| 4,410,253 | 10/1983 | Tsuboi | 354/195.1 |
| 4,412,737 | 11/1983 | Iwanade et al. | 355/55 |
| 4,443,078 | 4/1984 | Niwa et al. | 354/403 |
| 4,445,757 | 5/1984 | Enomoto et al. | 354/195.12 X |
| 4,446,526 | 5/1984 | Iwanade | 350/429 X |
| 4,451,129 | 5/1984 | Ikari et al. | 354/195.12 |

(List continued on next page.)

OTHER PUBLICATIONS

Pratical Camera Information, pp. 163-166, published Sep. 2, 1987, and English Language Translation.

Primary Examiner—W. B. Perkey
Attorney, Agent, or Firm—Sandler, Greenblum & Bernstein

[57] ABSTRACT

A zoom lens for a camera having a between-the-lens shutter includes a motor for moving the lens along an optical axis in forward and rearward directions. A switch is operable by an operator to control operation of the motor for moving the lens from an initial position on the axis to a final stationary position that establishes the focal length of the lens. Control apparatus is responsive to the setting of the switch for operating the motor such that movement of the lens from its initial position to its final position always ends after the lens travels to its final position in a predetermined direction.

19 Claims, 45 Drawing Sheets

U.S. PATENT DOCUMENTS

| | | | |
|---|---|---|---|
| 4,491,396 | 1/1985 | Isobe et al. | 354/400 X |
| 4,508,443 | 4/1985 | Matsuzaki et al. | 354/402 |
| 4,521,100 | 6/1985 | Yonemori et al. | 355/57 X |
| 4,525,050 | 6/1985 | Ohashi | 354/195.12 |
| 4,537,487 | 8/1985 | Taniguchi et al. | 354/400 |
| 4,557,593 | 12/1985 | Iwanade | 355/57 |
| 4,596,449 | 6/1986 | Iwata et al. | 359/696 |
| 4,609,269 | 9/1986 | Kamata | 354/195.12 X |
| 4,627,720 | 12/1986 | Yonemori et al. | 355/57 |
| 4,643,555 | 2/1987 | Wakabayashi et al. | 354/403 |
| 4,669,848 | 6/1987 | Wakabayashi | 354/195.12 X |
| 4,697,891 | 10/1987 | Kawai | 350/429 |
| 4,699,491 | 10/1987 | Ishimura | 354/286 |
| 4,720,179 | 1/1988 | Ito | 350/423 |
| 4,721,972 | 1/1988 | Wakabayashi et al. | 354/195.1 |
| 4,768,048 | 8/1988 | Wakabayashi | 354/195.12 |
| 4,771,303 | 9/1988 | Matsumoto et al. | 354/195.12 |
| 4,827,296 | 5/1989 | Haraguchi et al. | 354/195.12 X |
| 4,857,947 | 8/1989 | Wakabayashi et al. | 354/195.1 |
| 4,857,951 | 8/1989 | Nakajima et al. | 354/195.1 X |
| 4,864,338 | 9/1989 | Wakabayashi | 354/195.12 X |
| 4,917,460 | 4/1990 | Yamada et al. | 355/56 X |
| 4,944,030 | 7/1990 | Haraguchi et al. | 354/403 |
| 4,962,399 | 10/1990 | Numako et al. | 354/195.1 |
| 4,967,218 | 10/1990 | Numako et al. | 354/195.1 |
| 4,975,725 | 12/1990 | Morisawa | 354/400 |
| 5,061,952 | 10/1991 | Ogawa | 354/195.1 X |
| 5,138,355 | 8/1992 | Morisawa | 354/400 |

FOREIGN PATENT DOCUMENTS

| | | |
|---|---|---|
| 2706551 | 8/1977 | Fed. Rep. of Germany . |
| 3211557 | 11/1982 | Fed. Rep. of Germany . |
| 3220265 | 1/1983 | Fed. Rep. of Germany . |
| 3336265 | 4/1984 | Fed. Rep. of Germany . |
| 47-27020 | 10/1972 | Japan . |
| 49-80242 | 2/1973 | Japan . |
| 50-36118 | 4/1975 | Japan . |
| 51-47236 | 4/1976 | Japan . |
| 53-127719 | 11/1976 | Japan . |
| 51-127725 | 11/1976 | Japan . |
| 51-147041 | 11/1976 | Japan . |
| 53-25422 | 3/1978 | Japan . |
| 53-63014 | 6/1978 | Japan . |
| 54-14231 | 2/1979 | Japan . |
| 54-50324 | 4/1979 | Japan . |
| 54-66541 | 5/1979 | Japan . |
| 56-5072 | 2/1981 | Japan . |
| 58-63921 | 4/1983 | Japan . |
| 56-102521 | 4/1983 | Japan . |
| 58-202432 | 11/1983 | Japan . |
| 59-113 | 1/1984 | Japan . |
| 59-23335 | 2/1984 | Japan . |
| 59-107310 | 6/1984 | Japan . |
| 59-109006 | 6/1984 | Japan . |
| 59-111139 | 6/1984 | Japan . |
| 59-121036 | 7/1984 | Japan . |
| 59-123832 | 7/1984 | Japan . |
| 60-52812 | 3/1985 | Japan . |
| 60-59311 | 4/1985 | Japan . |
| 60-60729 | 4/1985 | Japan . |
| 60-129717 | 7/1985 | Japan . |
| 60-131526 | 7/1985 | Japan . |
| 60-156052 | 8/1985 | Japan . |
| 60-175038 | 9/1985 | Japan . |
| 60-235126 | 11/1985 | Japan . |
| 60-258525 | 12/1985 | Japan . |
| 61-13839 | 1/1986 | Japan . |
| 61-187122 | 5/1986 | Japan . |
| 61-208040 | 9/1986 | Japan . |
| 61-273514 | 12/1986 | Japan . |
| 63-49740 | 3/1988 | Japan . |
| 64-25112 | 1/1989 | Japan . |

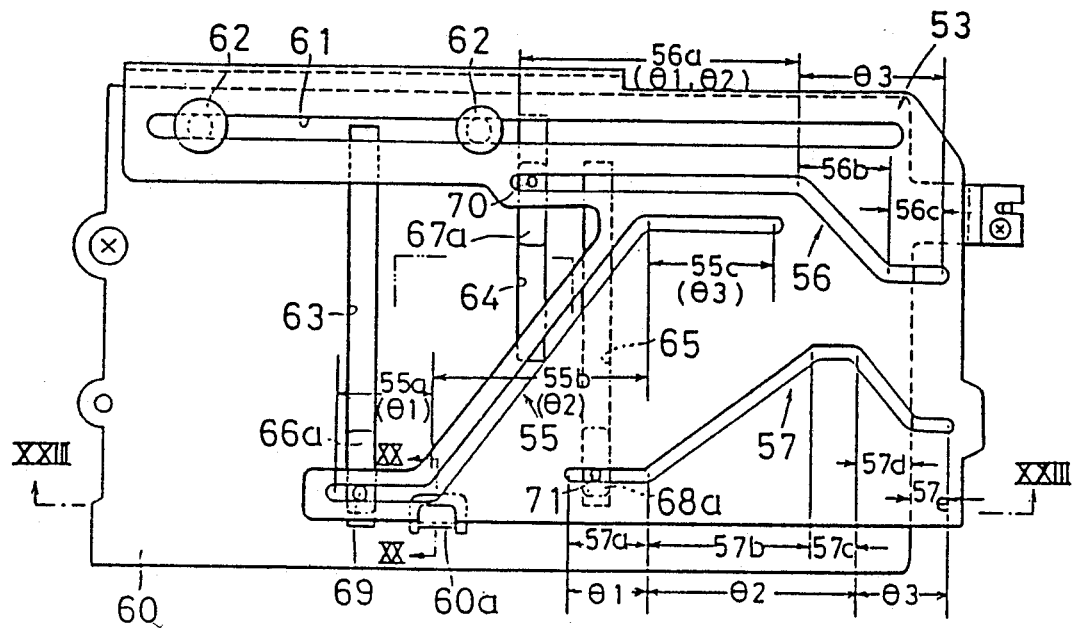
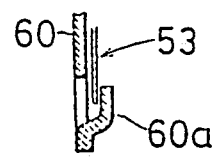
FIG. 19
FIG. 20
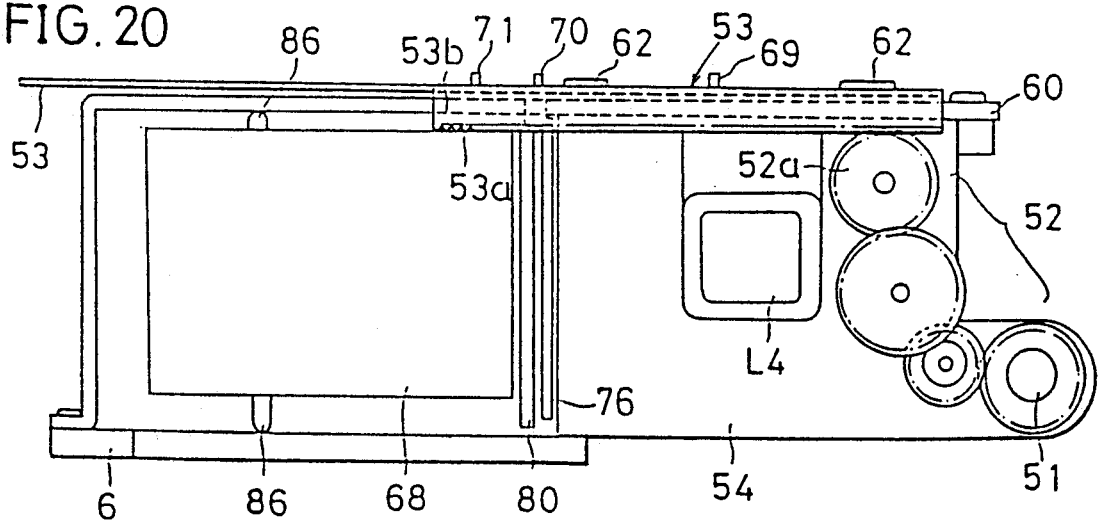
FIG. 21 i — Cam ring position ii — Normal mode changeover iii — Mode changeover switch at ZOOM position during zooming motor rotation in forward direction iiii — Mode changeover switch at ZOOM position during zooming motor rotation in revarse direction

| ZP 3 2 1 0 | POS | i | ii | iii | iiii |
|---|---|---|---|---|---|
| 1 1 1 0 | 0 | LOCK | | | |
| 1 0 1 0 | 1 | | | | |
| 1 0 1 1 | 2 | f0 | | | |
| 1 0 0 1 | 3 | f1 | | | |
| 0 0 0 1 | 4 | f2 | | | |
| 0 0 1 1 | 5 | f3 | | | |
| 0 0 1 0 | 6 | f4 | | | |
| 0 1 1 0 | 7 | f5 | | Stop on spot | |
| 0 1 1 1 | 8 | f6 | | | |
| 0 1 0 1 | 9 | f7 | | | |
| 0 1 0 0 | A | f7' | | | |
| 1 1 0 0 | B | | | | |
| 1 1 0 1 | C | MACRO | | | |

□ — Start position

○ — Stop position

FIG. 30

▽△ — Zoom lens positon when mode changeover switch is set at ZOOM position while zooming motor is rotating

| Fig.39(a) |
| Fig.39(b) |
| Fig.39(c) | i — Cam ring position ii — Normal mode changeover iii — Mode changeover switch at ZOOM position during zooming motor rotation in forward direction iiii — Mode changeover switch at ZOOM position during zooming motor rotation in reverse direction iiiii — Zooming operation

| ZP 3 2 1 0 | POS | i | ii | iii | iiii | iiiii |
|---|---|---|---|---|---|---|
| 1 1 1 0 | 0 | LOCK | | | | |
| 1 0 1 0 | 1 | | | | | |
| 1 0 1 1 | 2 | I0 | | | | |
| 1 0 0 1 | 3 | I1 | | | | |
| 0 0 0 1 | 4 | I2 | | | | Telephoto operation |
| 0 0 1 1 | 5 | I3 | | | | |
| 0 0 1 0 | 6 | I4 | | | | |
| 0 1 1 0 | 7 | I5 | | | | |
| 0 1 1 1 | 8 | I6 | | | | |
| 0 1 0 1 | 9 | I7 | | | | Wide angle operation |
| 0 1 0 0 | A | I7' | | | | |
| 1 1 0 0 | B | | | | | |
| 1 1 0 1 | C | MACRO | | | | |

U — Start position
O — Stop position

∇ Δ — Zoom lens position when mode changeover switch is set at ZOOM position while zooming motor is rotating

FIG. 43

✶ — Stop position is always a change point of zoom code i — Cam ring position ii — Normal mode changeover iii — Mode changeover switch at ZOOM position during zooming motor rotation in forward direction iiii — Mode changeover switch at ZOOM position during zooming motor rotation in reverse direction iiiii — Zooming operation

| ZP 3 2 1 0 | POS | i | ii | iii | iiii | iiiii |
|---|---|---|---|---|---|---|
| 1 1 1 0 | 0 | LOCK | | | | |
| 1 0 1 0 | 1 | | | | | |
| 1 0 1 1 | 2 | f0 | | | | |
| 1 0 0 1 | 3 | f1 | | | | |
| 0 0 0 1 | 4 | f2 | | | | Telephoto operation |
| 0 0 1 1 | 5 | f3 | | | | |
| 0 0 1 0 | 6 | f4 | | | | |
| 0 1 1 0 | 7 | f5 | | | | |
| 0 1 1 1 | 8 | f6 | | | | Wide angle operation |
| 0 1 0 1 | 9 | f7 | | | | |
| 0 1 0 0 | A | f7' | | | | |
| 1 1 0 0 | B | | | | | |
| 1 1 0 1 | C | MACRO | | | | | u — Start position
o — Stop position

∇ △ — Zoom lens position when mode changeover switch is set at ZOOM position while zooming motor is rotating ✕ — Stop position is always a change point of zoom code

FIG. 47 i — Cam ring position

| ZP 3 2 1 0 | POS | i | ZOOM-LOCK-ZOOM | ZOOM-MACRO-ZOOM | ZOOM-LOCK-ZOOM | ZOOM-MACRO-ZOOM |
|---|---|---|---|---|---|---|
| 1 1 1 0 | 0 | LOCK | | | | |
| 1 0 1 0 | 1 | | | | | |
| 1 0 1 1 | 2 | i0 | | Against backlash | | Against backlash |
| 1 0 0 1 | 3 | i1 | | | | |
| 0 0 0 1 | 4 | i2 | | | | |
| 0 0 1 1 | 5 | i3 | | | | |
| 0 0 1 0 | 6 | i4 | | | | |
| 0 1 1 0 | 7 | i5 | | | | |
| 0 1 1 1 | 8 | i6 | | | | |
| 0 1 0 1 | 9 | i7 | | | | |
| 0 1 0 0 | A | i7' | | | | |
| 1 1 0 0 | B | | | | | |
| 1 1 0 1 | C | MACRO | | | | |

Mode changeover during rotation of zooming motor

ʊ — Start position
o — Stop position

When mode changeover switch is placed at ZOOM position, zooming motor immediately rotates in reverse direction ※ — The stop position is always a change point of zoom code. The above chart is a one when Mpos = 5

◉ — When mode changeover switch is placed at ZOOM position zooming switch immediately rotates in forward direction

FIG. 50

| Fig.52(a) |
| Fig.52(b) |
| Fig.52(c) |

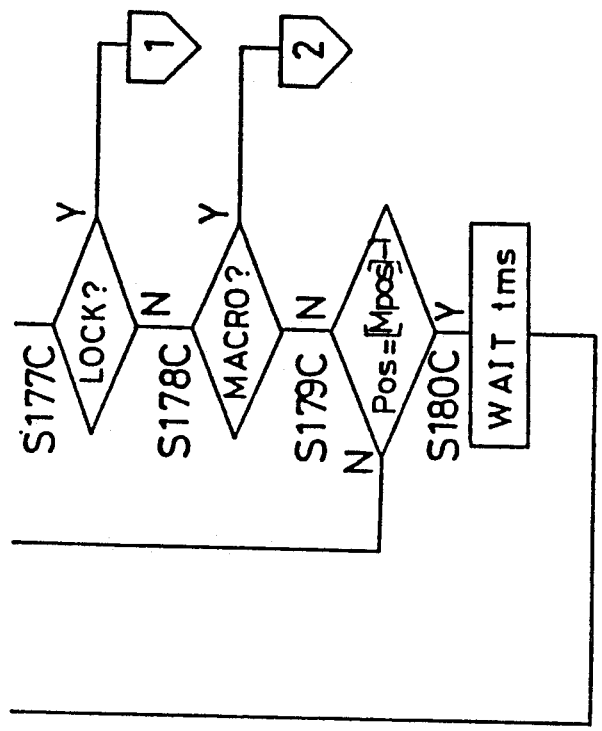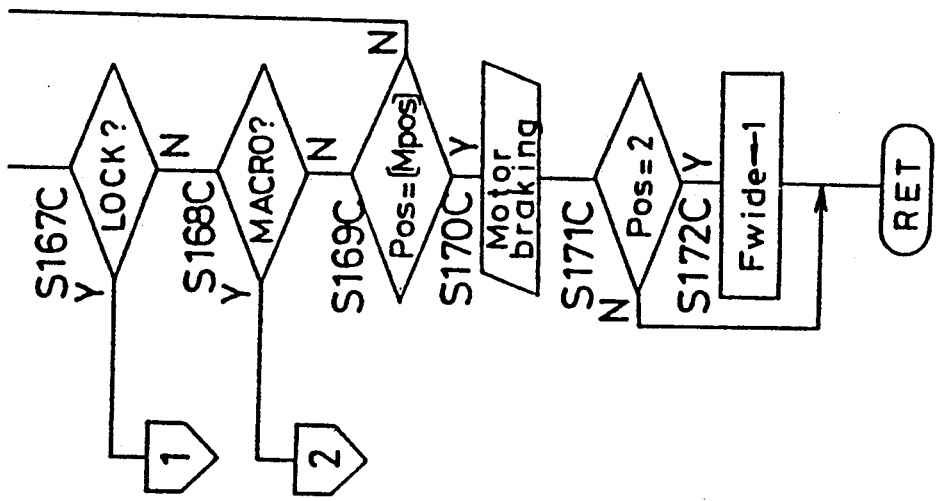
Fig. 52(c)

LENS SHUTTER CAMERA INCLUDING ZOOM LENS DRIVE SYSTEM

This application is a continuation of application Ser. No. 07/633,023, filed Dec. 24, 1990, now abandoned which is a continuation of application Ser. No. 07/510,676, filed Apr. 18, 1990, which is now U.S. Pat. No. 5,162,831, which is a continuation of application Ser. No. 07/143,946, filed Jan. 7, 1988, which issued as U.S. Pat. No. 4,936,664 on Jun. 26, 1990.

TECHNICAL FIELD

The present invention relates to a zoom lens drive system for a lens shutter type of camera having a finder optical system and an electronic flash device compatible with the lens.

More precisely, the present invention relates to a zoom lens drive system for a camera having a between-the-lens shutter, but not limited thereto.

This application is related to the commonly assigned application filed on even date herewith, application Ser. No. 07/144,030, now U.S. Pat. No. 4,944,030, issued Jul. 24, 1990 entitled "Lens Shutter Camera Including Zoom Lens", the disclosure of which is expressly incorporated by reference herein.

BACKGROUND ART

Most conventional automatic focus cameras having lens shutter, such as between-the-lens-shutters, have fixed focal lengths. Some cameras of this type permit a user to select one or the other of two separate lenses of different focal lengths for providing, for example, wide angle and telephoto capability. In such cameras, however, stepless variations in focal lengths in the range between these extremes of focal lengths are not possible. Heretofore, only single lens reflex camera using focal plane shutters had the capability of taking pictures using a zoom lens.

Single lens reflex cameras are more expensive and heavier than between-the-lens-shutter cameras; and accordingly, a photographer unfamiliar with cameras usually does not find it easy or convenient to use a single lens reflex camera, especially in taking action pictures at high speed using flash illumination. Furthermore, because of its relatively large weight and size, a single lens reflex camera is not favored by many photographer or travellers who are concerned with weight and the number of bags that have to be handcarried. Consequently, these individuals hesitate using single lens reflex cameras even if they appreciate the high quality pictures that can be taken by suing such a camera. Accordingly, users who hesitate to use single lens reflex cameras have only two choices in a lightweight, small between-the-lens-shutter automatic camera: one with a fixed focal length, and one which has two extreme focal lengths without adjustment therebetween.

An object of the present invention, therefore, is to provide a new and improved small, light, and compact camera having a lens shutter, such as a between-the-lens-shutter and having a zoom lens in which focusing control and electronic flash control can be carried out automatically.

Another object of the present invention is to provide a zoom lens automatic focus camera having a lens shutter, such as a between-the-lens-shutter, and having an additional macro function with which an extremely large detailed image can be taken, the finder optical system and electronic flash device associated with the macro function operating in a manner similar to the manner of operation in a normal mode (i.e., wideangle, telephoto and standard, etc.).

Still another object of the present invention is to provide a zoom lens drive system for a lens shutter type of a compact camera with a zoom lens, in which a powered zooming operation can be elecrically and automatically effected.

DISCLOSURE OF INVENTION

A zoom lens for a camera having a between-the-lens shutter includes a motor for moving the lens, in forward and rearward directions, along an optical axis. The first embodiment of the present invention includes switch means operable by an operator to control operation of the motor for moving the lens from an initial position on the axis to a final stationary position that establishes the focal length of the lens, and control means for operating the motor such that movement of the lens from its initial position to its final position always ends after the lens travels to the final position in a predetermined direction. The lens may occupy any position between and including a wide angle terminus that establishes the smallest focal length, and a telephoto terminus that establishes the largest focal length, and may also include a macro position beyond the telephoto terminus position. The invention insures that, regardless of the initial position of the lens relative to the final position, the lens will always be travelling in the predetermined direction when it arrives and halts at the final position.

To reach a final position, the lens may have to travel in a direction opposite to the predetermined direction. In such case, instead of halting the lens when the final position is initially reached, the invention provides for causing the lens to continue to move beyond, or overshoot, the final position before movement of the lens is halted. By thereafter reversing the direction of movement of the lens, and returning it in the predetermined direction to the final position, all of the backlash in the drive system will be taken into account. This arrangement will accurately locate the lens at the final position regardless of the initial position of the lens relative to final position.

The second embodiment of the invention includes switch means having two settings operable by an operator to control operation of the motor for moving the lens from an initial position on the axis to a final stationary position that establishes the focal length of the lens. In addition, this embodiment includes position detector means responsive to the lens position for detecting the position of the lens on the axis, and control means responsive to operation of the switch means to either of said two settings and to the position detector means for operating the motor such that: (1) the final position of the lens is a predetermined number of discrete focal length steps from its initial position; and (2) movement of the lens to its final position always occurs while the lens is travelling in a predetermined direction.

The position of the lens when the switch means is operated by the operator defines the initial position of the lens. Operation of the switch means to one of the settings causes the control means to move the lens in said predetermined direction to its final position located said predetermined number of focal-length steps from its original position. Operation of the switch means to the other one of the settings causes the control means to first move the lens in a direction opposite to said predetermined direction until it is located more than said predetermined number of focal-length steps from its initial position, and then to reverse movement of the lens and move it in said predetermined direction until it reaches its final position located said predetermined number of focal-length steps from its original position.

The third embodiment of the invention includes switch means having two settings operable by an operator to control operation of the motor for moving the lens from an initial position on the axis defined by the position of the lens when the switch is operated to a final stationary position that establishes the focal-length of the lens. In addition, this embodiment includes position detector means responsive to the lens position for detecting the position of the lens on the axis, and delay means for introducing a predetermined pause in operation of the motor. Finally, this embodiment includes control means responsive to sustained operation of the switch means to either of said two settings, to the position detector means, and to the delay means for operating the motor such that: (1) the final position of the lens is a predetermined number of discrete focal-length stops from its initial position; (2) movement of the lens to its final position always occurs while the lens is travelling in a predetermined direction; and (3) the lens remains stationary at the final position for said predetermined pause before moving to another position located therefrom by said predetermined number of discrete steps. Thus, sustained operation of the switch means to one of the settings causes the control means to repeatedly move the lens through a predetermined number of focal-length steps, pausing for a predetermined period of time between moves.

The fourth embodiment of the invention includes switch means having a plurality of settings selectable by an operator to control operation of the motor for moving the lens from an initial position on the axis defined by the position of the lens when the setting is selected, to a final stationary position that establishes the focal-length of the lens. In addition, this embodiment includes position detector means responsive to the lens position for detecting the position of the lens on the axis, and memory means for storing data representative of a position of the lens on said axis. Finally, this embodiment includes control means responsive to selection of a setting of the switch means, to the position detector means, and to the memory means for operating the motor such that selection of a zoom setting of the switch means by the operation causes said motor to drive the lens from its initial position to a final position determined by the contents of said memory means under the condition that movement of the lens to its final position always occurs while the lens is travelling in a predetermined direction.

According to one aspect of the present invention, there is provided an apparatus for driving a zoom lens system in a lens shutter type of camera, in which said zoom lens system is moved in optical axis directions by a driving source to vary the focal length, wherein the improvement comprises means for driving the driving source during the zooming operation, means for reversing the direction of the movement of the zoom lens system only when the latter moves in a predetermined one direction and when the zooming operation ends, and means for stopping the actuation of the driving source subsequent to reverse of the actuation of the driving source.

According to another aspect of the present invention, there is provided an apparatus for driving a zoom lens system in a lens shutter type of camera, in which said zoom lens system is moved in optical axis directions by a driving source to vary the focal length, wherein the improvement comprises means for driving the driving source during the zooming operation, means for detecting the position of the zoom lens system in the optical axis directions, means for detecting the movement of said zoom lens system by a predetermined displacement in response to detection signals of said detecting means during actuation of the driving source, and means for stopping the actuation of the driving source when said detecting means detects the movement of the zoom lens system by said predetermined displacement.

According to still another aspect of the present invention, there is provided an apparatus for driving a zoom lens system in a lens shutter type of camera, in which said zoom lens system is moved in optical axis directions by a driving source to vary the focal length, wherein the improvement comprises means for driving the driving source during the zooming operation, means for detecting the position of the zoom lens system in the optical axis directions, means for detecting the movement of said zoom lens system by a predetermined displacement in response to detection signals of said detecting means during the actuation of the driving source, means for stopping the actuation of the driving source when said detecting means detects the movement of the zoom lens system by said predetermined displacement, means for determing whether or not a further movement of the zooming lens system is necessary, and means for moving said zooming lens system by a predetermined displacement when said determing means determines a further movement of the zooming lens system.

According to a variant of the present invention, there is provided an apparatus for driving a zoom lens system in a lens shutter type of camera having at least two operation modes including a zoom mode in which said zoom lens system is moved within a predetermined zooming range and a specific mode in which said zoom lens system is moved beyond said zooming range, said zooming lens system being moved in optical axis directions by a driving source to vary the focal length, wherein the improvement comprises first means for driving the driving source during the zooming operation, means for detecting the position of the zoom lens system in the optical axis directions, means for moving said zoom lens sysem so as to selectively occupy said zooming mode and said specific mode, means for storing the position data detected by said detecting means, and second means for driving the zoom lens system to the position represented by the stored position data when a change of the operation modes from the specific mode to the zoom mode takes place.

BRIEF DESCRIPTION OF DRAWINGS

Embodiments of the present invention are shown in the accompanying drawings wherein:

FIG. 19 is a plan view of a cam plate of a finder block as mounted on a mother plate;

FIG. 20 is a sectional view taken along the line XX—XX in FIG. 19;

FIG. 21 is a back view of FIG. 19;

FIG. 30 is a chart showing a zoom code carried by the code plate shown in FIG. 29, and showing possible start and stop positions;

FIGS. 38A, 38B, 39A, 39B, 39C, 40 and 41 are flow charts of the first embodiment of the present invention;

FIGS. 38 and 39 are diagrams showing the relationship between FIGS. 38A and 38B, and between FIGS. 39A, 39B, and 39C, respectively;

FIG. 43 is a diagram showing a zoom code by a code plate shown in FIG. 29 and stop positions;

FIG. 47 is a diagram showing a zoom code by a code plate shown in FIG. 29 and stop positions;

FIGS. 48, 49A and 49B are flow charts of a third embodiment of the present invention;

FIG. 50 is a diagram showing a zoom code by a code plate shown in FIG. 29 stop positions; and FIGS. 51 and 52 are diagram showing the relationship between FIGS. 51A, 51B, and 51C and between FIGS. 52A, 52B, and 52C respectively; and FIGS. 51A, 51B, 51C, 50A, 52B, and 52C are flow charts of a forth embodiment of the present invention.

BEST MODE FOR CARRYING OUT THE INVENTION

Figure 1:
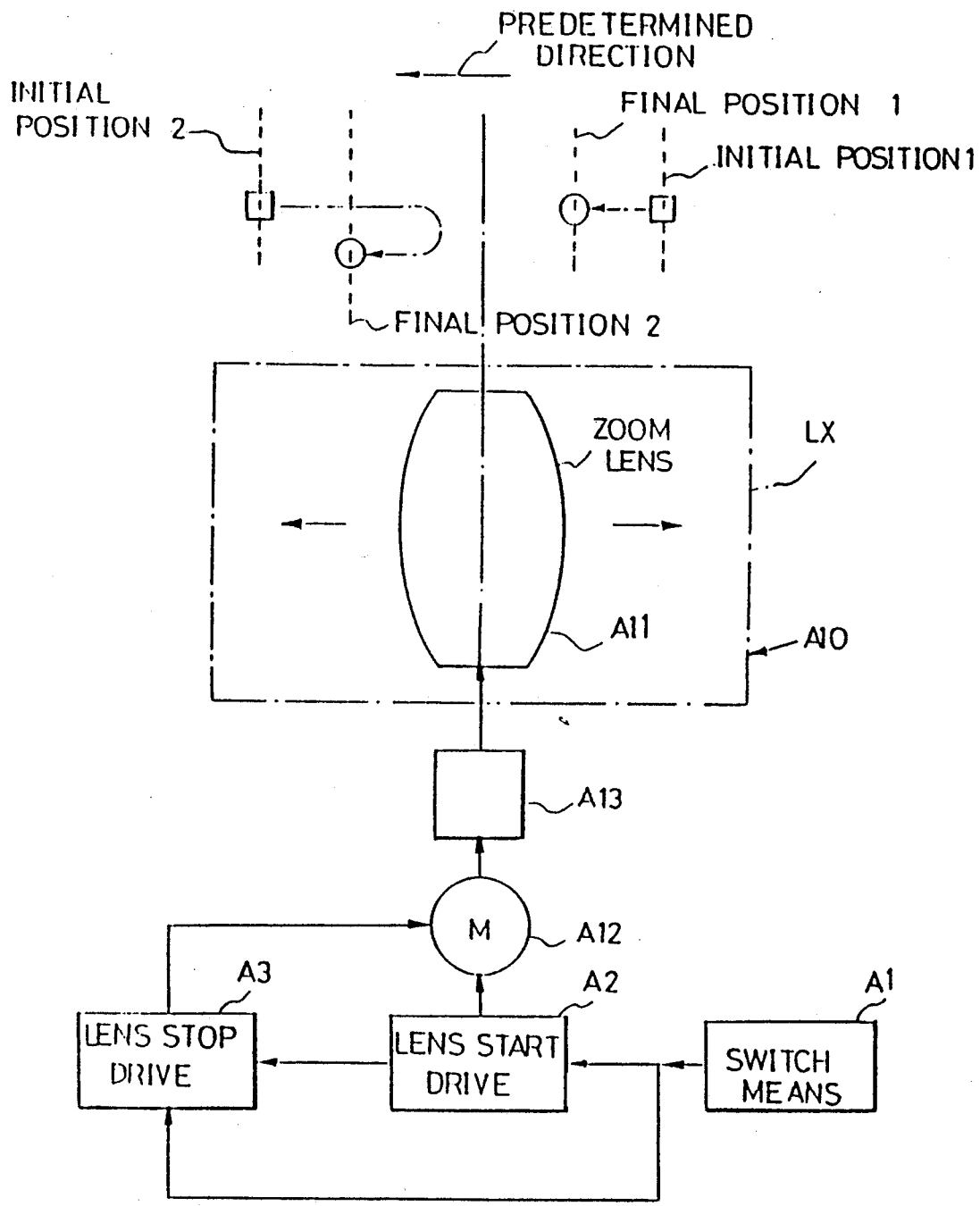
FIG. 1 is a schematic block diagram of a first embodiment of the present invention.

Basic Construction of Between-the-lens Shutter Type of Camera (FIGS. 5-29)

A camera having a between-the-lens shutter according to the present invention comprises lens barrel block 1 defining optical axis OA, a finder block comprising finder and strobe block 2, distance measuring device AF comprising light emitter 3 and light receiver 4, and zoom motor 5 for effecting zooming operations. These elements are secured in the manner described below to base 6 which is rigidly attached to a camera housing.

As shown in FIGS. 6-10, base 6 includes lens barrel supporting plate portion 6a lying in a plane perpendicular to optical axis OA, flange supporting plate portion 6b extending from one side of plate portion 6a at a right angle thereto, and motor supporting plate portion 6c perpendicular to the plate portion 6b. Lens barrel block 1 is supported on lens barrel supporting plate portion 6a, and zoom motor 5 is secured to motor supporting plate portion 6c located above the center portion of lens barrel block 1. Light emitter 3 and light receiver 4, which are secured to supporting plate portion 6b, are located on opposite sides of zoom motor 5. Finder block 2 is secured to the right portion of supporting plate portion 6b as viewed from the front of the camera. Gear train supporting plate 6e, parallel to support plate 6c, is connected thereto by spacers 6f.

Lens barrel block 1, which is actuated by zoom motor 5, is mounted on base 6 as described below with reference to FIGS. 10-13. Rear securing plate 11 of block 1 is mounted to lens barrel supporting plate portion 6a of base 6 by means of fastening screws 10. The rear securing plate has four guide rods 12 secured thereto which are located around the optical axis and extend parallel thereto. Front securing plate 13 is attached to the front ends of the guide rods 12.

Figure 10:
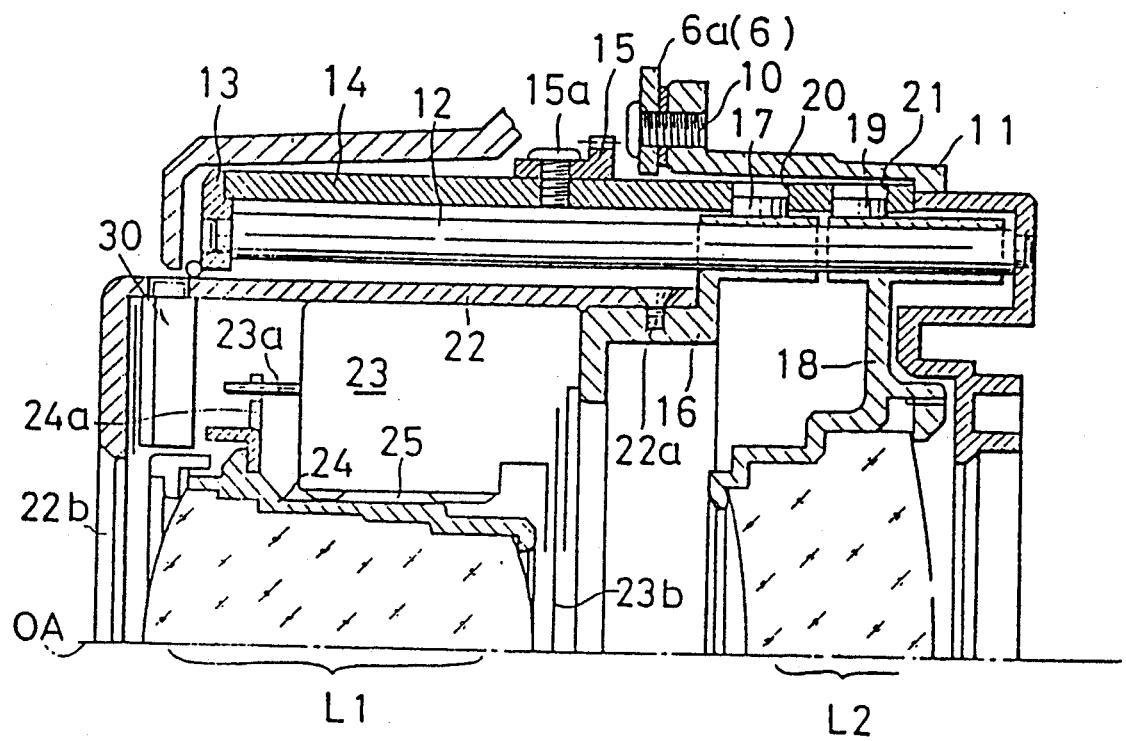
FIG. 10 is a longitudinal sectional view of the lens barrel block of the first embodiment.

Rotatable cam ring 14 is mounted between front and rear securing plates 13 and 11, and is provided, on its outer periphery, with gear 15 fixed thereto by means of set screws 15a (FIG. 10). Pinion 7 (FIG. 8) on the output shaft of motor 5 directly, or indirectly through a gear train, engages gear 15 which may be a sector gear of a size that covers a predetermined range of rotational movement of cam ring 14. The cam ring has zooming cam grooves 20 and 21 for establishing the relative positions of the front and rear lens-element groups, respectively.

Figure 11:
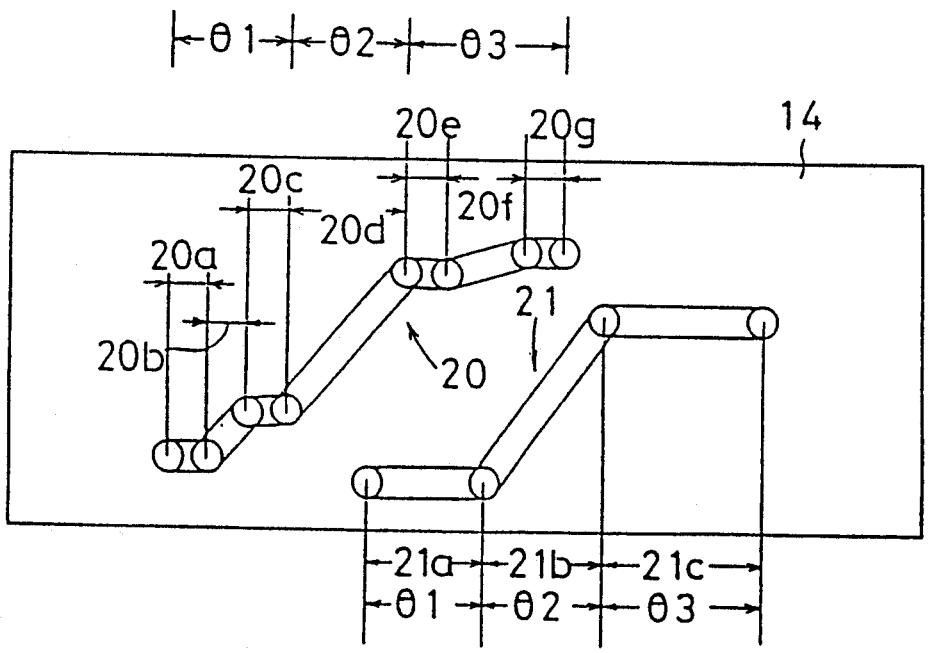
FIG. 11 is a developed view of cam grooves of a cam ring for the front and rear lens-element groups associated with the lens barrel block of FIG. 10.
Figure 12:
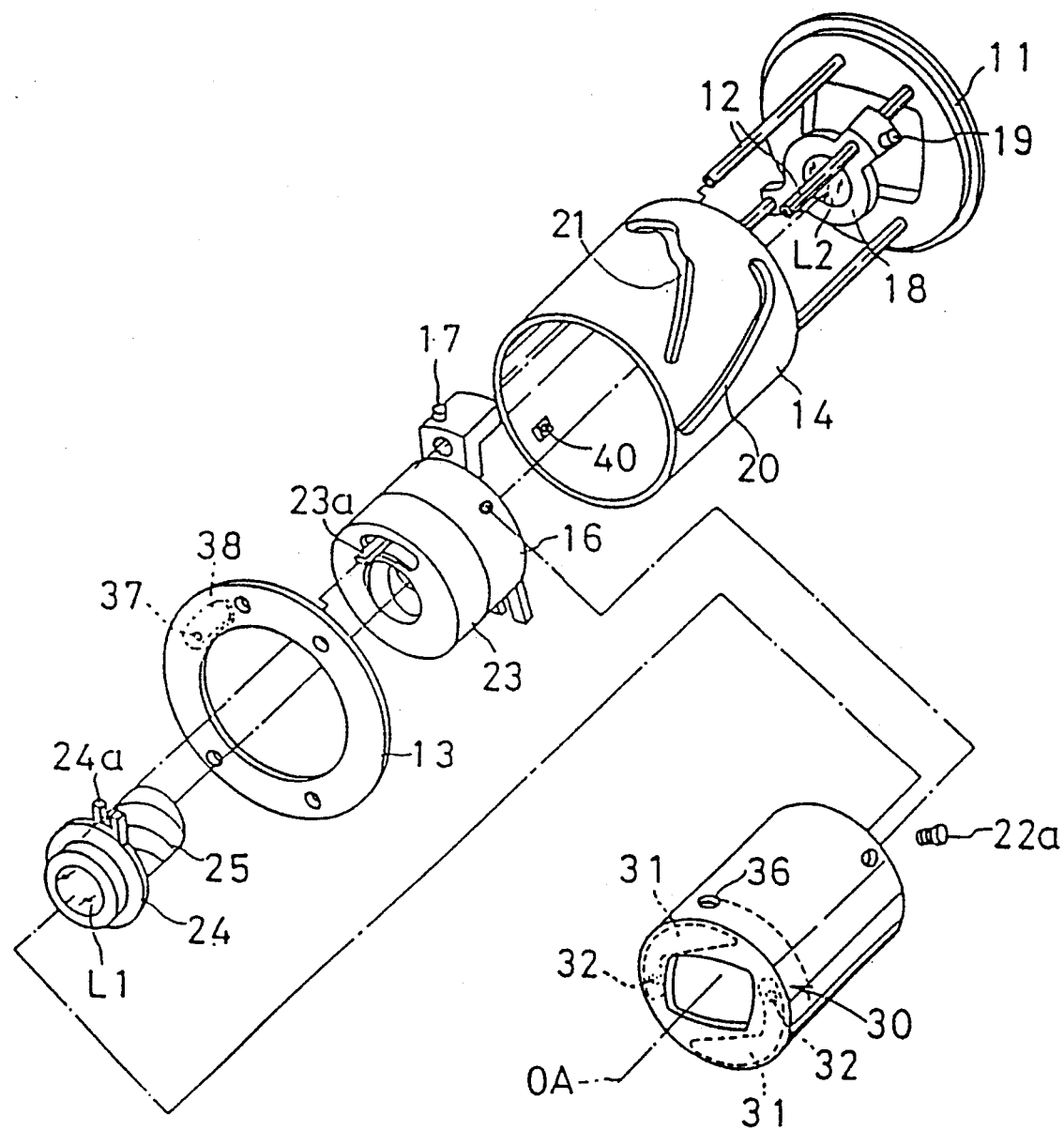
FIG. 12 is an exploded perspective view of the lens barrel block shown in FIG. 10.

FIG. 11 is a development of zooming cam groves 20 and 21. Cam groove 21, for the rear lens-element group, includes wide angle terminus fixing section 21a, variable magnification section 21b, and telephoto terminus fixing section 21c. Cam groove 20 for the front lens-element group, includes the following sections: section 20a for opening and closing barrier block 30 (FIG. 12), lens retracting section 20b, wide angle terminus fixing section 20c, variable magnification section 20d, telephoto terminus fixing section 20e, macro transferring section 20f, and macro terminus fixing section 20g. Rotational displacement of the front lens group through the angle $\theta_1$ will occur when sections 20a, 20b, and 20c of zooming cam groove 20 are used. This angle is identical to the angle $\theta_1$ of the rear lens group which uses section 21a of the zooming cam groove 21. The angle $\theta_2$ of the variable magnification (variable power) section 20d of groove 20 is identical to the angle $\theta_2$ of the variable magnification (variable power) section 21b of groove 21. Further, the angle $\theta_3$, which comprises sections 20e, 20f, and 20g of groove 20, is equal to the angle $\theta_3$ of section 21c of groove 21. In the illustrated embodiment, the zooming range is 35 mm–70 mm.

Cam follower roller 17 of front group frame 16 is operatively engaged in cam groove 20, and cam follower roller 19 of rear group frame 18 is operatively engaged in cam groove 21. Front group frame 16 and rear group frame 18 are mounted on guide rods 12 for sliding axial movement parallel to the optical axis. Decorative frame 22 and shutter block 23 (FIG. 10) are secured to front group frame 16 by means of set screws 22a.

Shutter block 23, which controls focusing and exposure, is in operative engagement with front lens frame 24, which supports front lens-element group L1 by means of helicoid 25. Front lens frame 24 includes arm 24a engaged focusing lever 23a of shutter block 23. When lever 23a circumferentially rotates, rotation is imparted to front lens frame 24 relative to frame 22 and block 23 such that the front lens frame moves along the optical axis by reason of helicoid 25 to effect focusing. Rear lens-element group L2 is directly secured to the rear group frame 18.

Shutter block 23 is known per se. It rotates lens focusing lever 23a through a predetermined angular displacement in accordance with a detection signal from the distance measuring device which is described below. Rotation of lever 23a is effected by means of a pulse motor (not shown) incorporated in the camera body to open the sectors of shutter 23b for a predetermined time, and thereafter to close the sectors by returning lever 23a to its initial position. This kind of shutter block is disclosed, for example, in Japanese Unexamined Patent Publication (Kokai) Nos. 60-235126. In the present invention, such a conventional shutter block is used essentially as is.

Barrier mechanism 30 (shown in detail in FIGS. 13 and 14) includes a pair of light barriers 31, which are pivotally mounted at 32 ahead of front lens-element group L1. These barriers, which are symmetrically positioned relative to axis OA, control the passage of light through photographing opening 22b in frame 22. Movement of these barriers is effected by rotational force produced when roller 17 engages section 20b of groove 20. Each of barriers 31, 31 has barrier plate portion 31a that is projectable across optical axis OA and is located on one side of pivot pin 32, and driving arm portions 31b on the opposite side of pivot pin 32. Each driving arm portion 31b has pin 33 which engages respective operational arms 34a of springs 34 which are made of, for example, molded synthetic resin. Each of springs 34 has generally Y-shaped spring arm 34b and driving arm 34c, in addition to operational arm 34a, and is pivoted to barrier mechanism 30 by means of pin 35. Spring arms 34b bear against the inner wall of front group lens supporting frame 22 to continuously bias barrier plate portions 31a into positions at which barrier plate portions 31a are retracted out of blocking relationship to optical axis OA.

Figure 13:
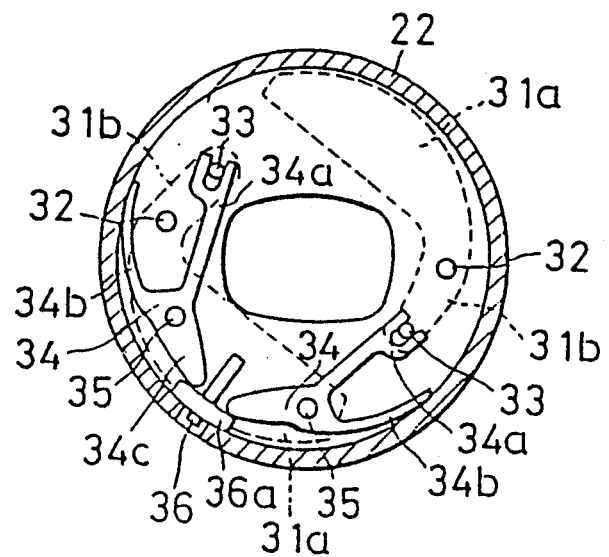
FIGS. 13 and 14 are sectional views of an optical barrier mechanism associated with the lens barrel block of FIG. 10, the views being taken along a plane perpendicular to the optical axis of the block, and showing the barrier in open and closed positions, respectively.
Figure 14:
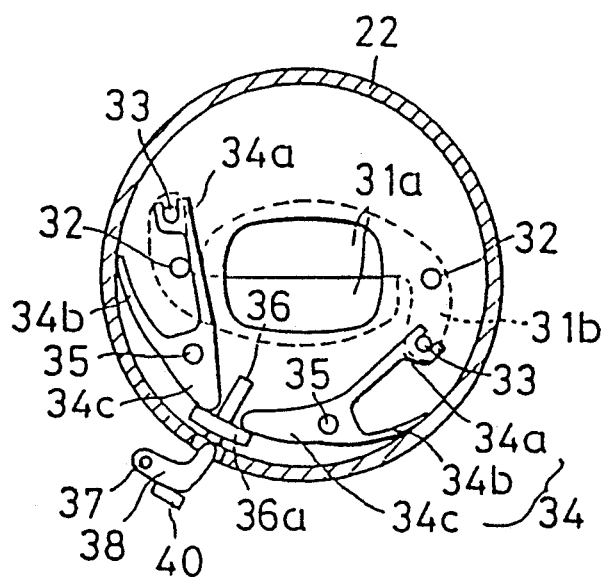

Driving arms 34c are urged by spring arms 34c into engagement with flange portion 36a of pin 36 which is mounted in front group lens supporting frame 22 for radial movement relative to axis OA. The head portion of pin 36 is engaged by a free end of operational lever 38 which projects through operational hole 39 in supporting frame 22, and is pivoted to front securing plate 13 by means of pin 37. Springs 34c normally bias pin 36 radially outwardly from the optical axis to a radial projecting position when lever 38 exerts no external force on pin 36. In this state, barrier plate portions 31a are retracted out of blocking position of the optical path (FIG. 13).

The inner wall of the cam ring 14 is formed with restriction projection 40 (FIG. 12), which bears against the outer end of operational lever 38 to press pin 36 radially inwardly when cam ring 14 rotates while roller 17 is engaged in section 20a of cam groove 20. With the arrangement of the barrier mechanism described above, barriers 31 unblock photographing opening 22b whenever projection 40 is out of engagement with lever 38. That is to say, whenever cam ring 14 causes roller 17 to engage sections other than opening and closing section 20a of the zooming cam groove 20, barriers are 31 open.

When zoom motor 5 rotates cam ring 14 so that roller 17 moves from engagement with section 20b into engagement with section 20a of groove 20, projection 40 engages lever 38 which radially displaces pin 36 and rotates barriers 31, by means of drive arms 34c and operational arms 34a, until barrier plate portions 31a of the barriers are moved into blocking position relative to the optical parts of the lens system. As a result, photographing opening 22b is closed to protect front lens-element group L1. That is to say, front group lens supporting frame 22 closes barriers 31 after the group moves to its retracted position from the wide-angle terminus position.

When a picture is to be taken, zoom motor 5 drives cam ring 14 in a forward direction. Roller 17 engaged with cam groove 20 thus moves from section 20a towards section 20b causing barriers 31 to open as front lens-element group L1 moves to its wide position where a the picture can be taken.

Figure 15:
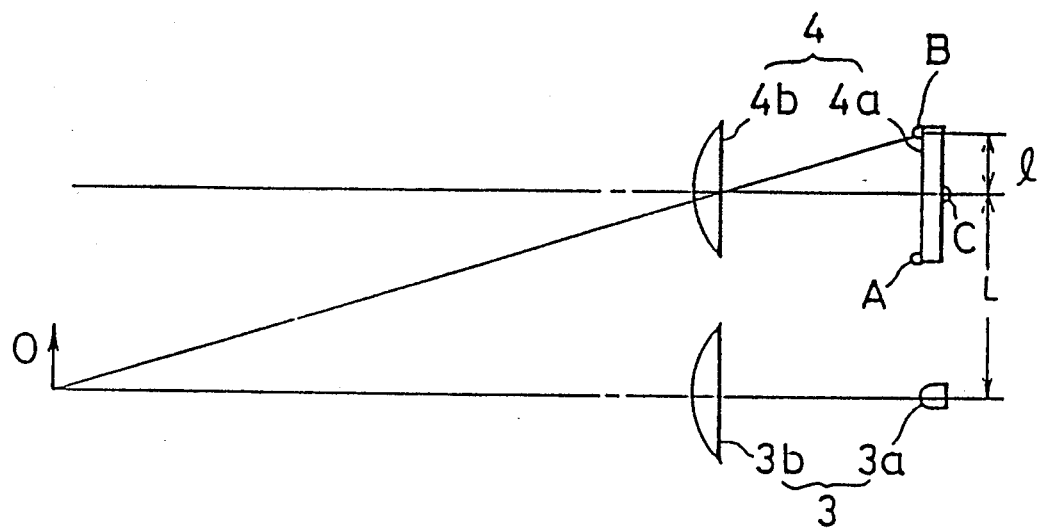
FIG. 15 is a schematic view of a distance measuring device according to the present invention.

FIGS. 15 to 18 show a distance measuring device that can be used in the present invention. In the illustrated embodiment, distance measuring device AF includes light emitter 3 and light receiver 4 in the form of a position detection element (PSD), the receiver and emitter being arranged in a triangulation type of measuring system. As shown in FIG. 15, light emitter 3 comprises light source 3a, such as a light emitting diode (LED) and light emitting lens 3b. Light receiver 4 is composed of PSD 4a spaced from light source 3a at a base length L, and light receiving lens 4b. PSD 4a has a single elongated light receiving element with a common terminal (cathode) C and two terminals (anodes) A and B which have a polarity different from that of the common terminal C, as is well known.

In the operation of the distance measuring device, light emitted from light source 3a and focused by lens 3b is reflected from subject 0 to be photographed. Light reflected from the subject is received by PSd 4a and focused by lens 4b on the light receiving surface of PSD 4a at a position that is functionally related to the distance of the subject from the light source producing a current related to the position of incident light on the PSD. Thus, the subject distance can be detected by measuring this electric current, and using a triangulation measuring method which is known per se.

In response to the measurement data thus obtained, an operation signal is supplied to shutter unit 23 (FIG. 10) to perform an automatic focusing operation in any of the possible zooming ranges. Such operation is performed by applying driving pulses to a pulse motor (not shown) within shutter unit 23 in accordance with the measurement data. In response, lens actuating lever 23a of unit 23 rotates through an angle corresponding to the number of pulses thus rotating front lens frame 24 through the same angle. As a result of rotation of front lens frame 24 relative to cam 14, front lens-element group L1 is moved by helicoid 25 in the optical axis direction so that focusing is automatically effected. AF devices other than the triangulation type mentioned above could also be used in the present invention.

Preferably, the distance between light emitter 3 and light receiver 4 is as large as possible, because the precision of measurement in a triangulation computation generally depends on the base length. Accordingly, in the present invention, the base length is made as large as possible by placing zoom motor 5 between light emitter 3 and light receiver 4. Locating zooming motor 5 between light emitted 3 and light receiver 4 contributes not only to an increase in base length L, but also to a realization of a small and compact camera body. Zoom motor 5 is secured to motor supporting plate 6c (FIG. 9) integral with the base plate 6, plate 6c preferably being formed by bending a portion of base plate 6 out of the plane thereof.

As shown in FIG. 11, cam groove 20 in cam ring 14, includes zooming cam groove 20f which serves a macro transferring function because it causes a further forward movement of front lens-element group L1 from its "telephoto" terminus. In this state, i.e. in the macro position, light reflected from a subject at such a close range, in response to actuation of the distance measuring device, would not be incident upon PSD 4a; and subject distance would not be measured. Accordingly, no operation signal would be generated for application to shutter unit 23, and exposure could not be achieved. In the illustrated embodiments, the detection mechanism of FIGS. 16 to 18 is provided to measure the subject distance at the macro terminus.

Figure 16:
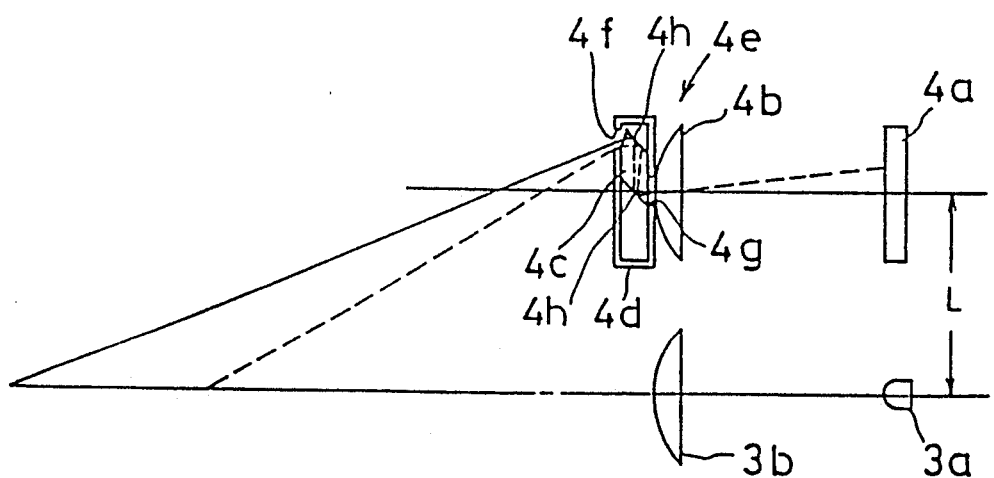
FIG. 16 is a schematic view of an optical arrangement for adjusting the focus in a macro mode of operation of the invention.
Figure 17:
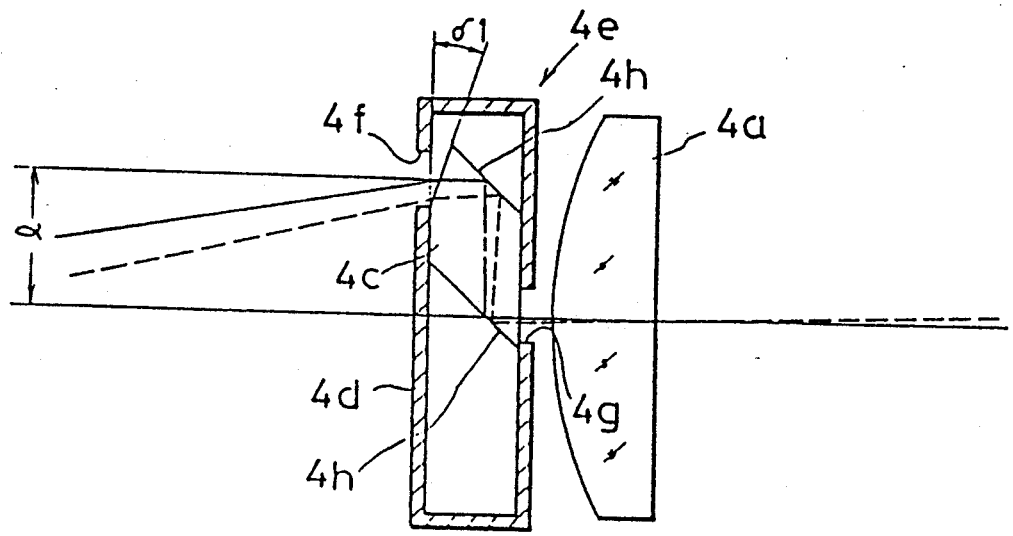
FIG. 17 is an enlarged view of a detail of a part of FIG. 16.
Figure 18:
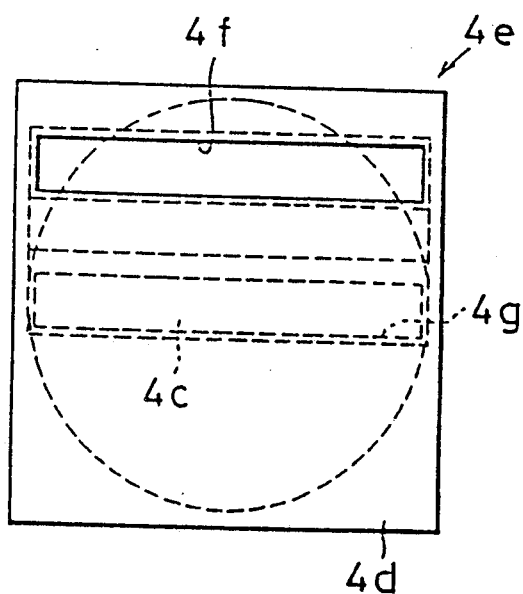
FIG. 18 is a front elevational view of the detail of FIG. 17.
Figure 22:
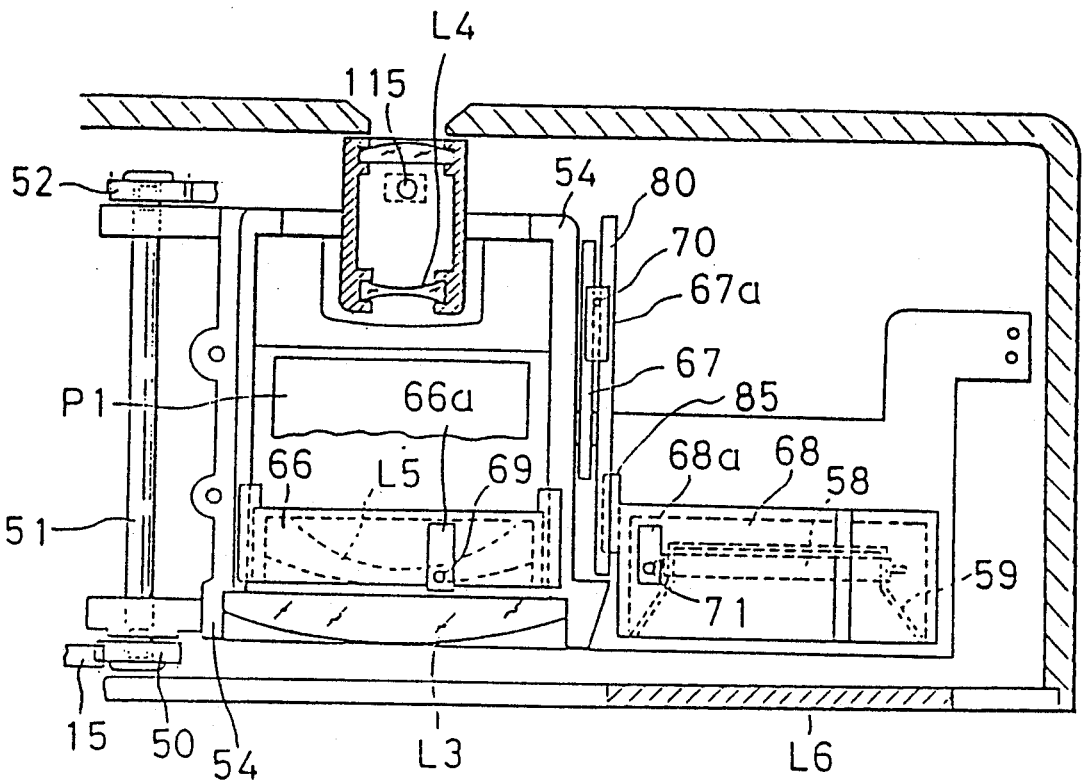
FIG. 22 is a plan view of FIG. 19 with the mother plate and cam plate removed.

In FIGS. 16-18, macro compensating optical element 4e, comprising prism 4c with two totally reflecting surfaces 4h and mask 4d, is positioned in front of light receiver 4, but only at the macro setting. At all other settings, element 4e is out of alignment with light receiver 4. Prism 4c optically extends the base length of the subject distance measuring device and refracts the light rays. Mask 4d is designed to accept only rays of light from the subject to be photographed. To this end, mask 4d has opening 4f facing the subject and opening 4g adjacent to light receiving lens 4b, the opening being in the form of a slit spaced from the optical axis of the light receiving lens 4b by a distance 1 on the side of the optical axis opposite to light emitting lens 3b. Opening 4g is also in the form of a slit on the optical axis of light receiving lens 4b.

With this arrangement, which is effective only at the macro setting, spaced reflecting surfaces 4h of prism 4c cause the optical axis of light receiving lens 4b of the distance measuring device, to be displaced in parallel by the distance 1 toward the base length L so that the optical axis of light receiving lens 4b intersects the optical axis of the light emitting lens 3b at a finite distance. According to the present invention, not only is the distance measuring light refracted, but also the optical axis of the light receiving lens is moved in parallel by the distance 1 toward the base length L, whereby the base length is optically extended to (L+1). Thus, deviation of a spot image on the PSd 4a can be increased in relation to the change of subject distance. Accordingly, by properly selecting the angle $\delta_1$ (see FIG. 17) and the refractive index etc., of prism 4c, the subject distance can be detected with high accuracy. Thus, when the lens is positioned at its macro setting, shutter unit 23 is actuated in accordance with the measurement data and focusing is automatically and precisely effected.

Macro compensating optical element 4e is secured to one end of arm 42 (FIG. 6) which is pivoted to base plate 6 by means of shaft 41 located below light receiver 4. Arm 42 is provided, at its opposite end, with integral projection 43 that bears against cam ring 14. Arm 42, which is flexible, is normally retained in a straight unflexed position when no external force is applied thereto and can be elastically deformed by application of an external force. Macro compensating element 4e is continuously rotatably biased by tension spring 16 into a retracted position in which it is out of alignment with the optical axis of light receiver 4. Projection 44 on cam ring 14 moves into engagement with projection 43 when the cam ring is rotated to its macro setting position. Such engagement causes arm 42 to pivot against the bias of spring 46, thus moving macro compensating optical element 4e in front of light receiver 4.

Projection 44, for operatively positioning macro compensating element 4e relative to receiver 4, is positioned on ring 14 and shaped so that macro compensating optical element 4e is rotated slightly past the position in which the element 4e comes into alignment with the optical axis of the light receiver 4. The extreme end of the rotational movement of the element 4e by the projection 44 is restricted by the side of gear supporting plate 6e integral with the base 6. In this case, the over-rotational movement of element 4e by projection 44 is absorbed by the resilient deflection of arm 42. With the arrangement mentioned above, macro compensating optical element 4e is automatically moved in front of light receiver 4, when cam ring 14 is moved to its macro mode setting.

Operation signals from distance measuring device AF are supplied to shutter block 23 through a flexible printed circuit board (FPC board) which is not shown. The FPC board is curved around the inside of cam ring 14, so that the FPC board can be freely extended and folded to fit within the entire range of displacement of front lens-element group L1 and rear lens-element group L2.

Finder block 2 includes finder device 8 and strobe device 9. The finder device and the strobe device are constructed and arranged so that the field of view of the finder device and the illumination angle (intensity) of the strobe are varied in accordance with the focal length of lens barrel block 1. The power source that powers zoom motor 5 also powers the finder and strobe controls.

Gear 15 on cam ring 14 is engaged by another pinion 50 in addition to pinion 7 mounted on motor shaft 5a. Shaft 51, carrying pinion 50, extends toward the rear portion of base 6 and is provided on its rear end with reduction gear train 52. Gear 52a of train 52, meshes with rack 53a of cam plate 53. The cam plate is slidable in the right and left hand directions (lateral directions) as seen in FIG. 19, and has a downwardly bent portion 53b at its rear end. Rack 53a is formed on the lower end of bent portion 53b of cam plate 53. Reduction gear train 52 reduces the rotation of the gear 15 in order to produce a limited displacement of cam plate 53 which is provided with variable power cam groove 55 for controlling finder device 8, parallel correction cam groove 56, and strobe cam groove 57 for controlling strobe device 9.

The lens system of finder device 8 is essentially composed of subject lens group L3, eye-piece group L4, movable variable power lens group L5, and deflection prism P1 for use during macro mode operation.

Figure 26:
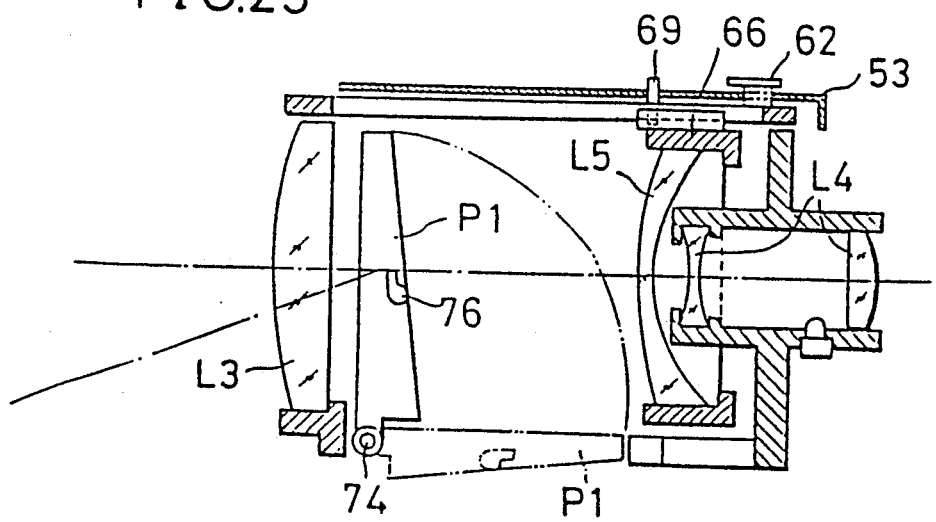
FIG. 26 is a sectional view similar to FIG. 24, but without the deflection prism actuating plate.
Figure 27:
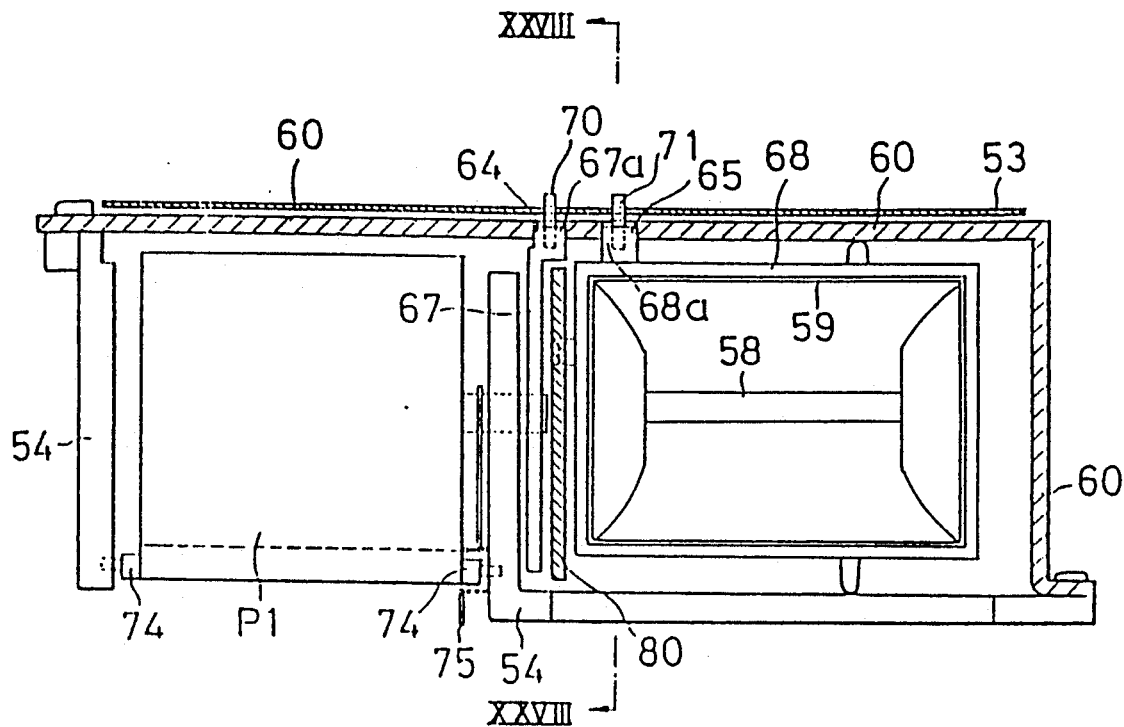
FIG. 27 is a front elevational view of the apparatus shown in FIG. 23, but showing a deflection prism in line with the view finder.

Variable power lens group L5 varies the image picture size in accordance with the variable power operation of lens barrel block 1 coincident with the field of view of finder device 8. Deflection prism P1 is moved into the optical path of the lens system of the finder device only in the macro mode of operation in order to compensate for parallax. Parallax is inevitable in a camera having a between-the-lens shutter and becomes significant as the distance of the camera to the subject to be photographed comes smaller. Accordingly, a large parallax error is normally involved in a macro mode operation of the camera. To solve this problem of large parallax in the macro mode, deflection prism P1 is provided in the present invention. Prism P1 is in the form of an optical wedge with a thicker lower end and a thinner upper end. Deflection prism Pl, when located in the optical path of the finder system, deflects light rays downwardly toward a subject close to the camera. FIG. 26 shows the direction of the optical path of rays through the finder lens when deflection prism P1 is positioned in the optical axis of the finder lens.

Strobe device 9 controls the illumination angle as a function of the focal length of the photographing lens. When the focal length is large, namely as the lens is moved forwardly, the illumination angle is increased. When the camera is operated in the macro mode, the illumination angle is further increased to decrease the quantity of light incident on the subject. In the illustrated embodiment, strobe device 9 includes fixed Fresnel lens L6, and movable concave reflector 59 operatively associated with xenon lamp 58 (FIG. 28) which is movable in the optical axis direction. Under some conditions, a simple strobe in which the illumination angle is fixed can be used, however.

The driving mechanism for actuating finder device 8 and strobe device 9 is shown in FIGS. 19-28. Finder block 54 is mounted to one side of base 6. Mother plate 60, secured to block 54, is provided with guide pins 62 which fit in linear guide groove 61 of cam plate 53. Sliding movement of cam plate 53 in the lateral direction with respect to the optical axis is restricted by the engagement of guide grooves 61 on plate 53 with guide pins on plate 60, and an edge of plate 53 with guide projection 60a formed integral with finder mother plate 60 as shown in FIGS. 19 and 20. This arrangement prevents cam plate 53 from floating from mother plate 60, especially at the front end of cam plate 53.

Finder mother plate 60 has variable power lens guide groove 63, deflection prism guide groove 64, and strobe guide groove 65. These guide grooves all extend parallel to the optical axis. Variable lens frame 66 (FIG. 23), which carries variable power lens group L5, is provided with guide projection 66a that operatively engages variable power lens guide groove 63. Deflection prism actuating plate 67 (FIG. 23) is provided with guide projection 67a that operatively engages deflection prism guide groove 64. Strobe case 68, which has a concave reflector 59 secured thereto, is provided with guide projection 68a that operatively engages strobe guide groove 65. Thus each of variable power lens frame 66, deflection prism actuating plate 67, and strobe case 68, is moveable in a direction parallel to the optical axis along respective guide grooves. Guide projections 66a, 67a, and 68a are provided with driven pins 69, 70 and 71, which operatively engage variable power cam groove 55, parallax compensating cam groove 56, and strobe cam groove 57, respectively. Accordingly, when cam plate 53 moves laterally relative to the optical axis, variable power lens frame 66, refraction prism actuating plate 67, and strobe case 69 move in respective cam grooves 55, 56 and 57.

Figure 29:
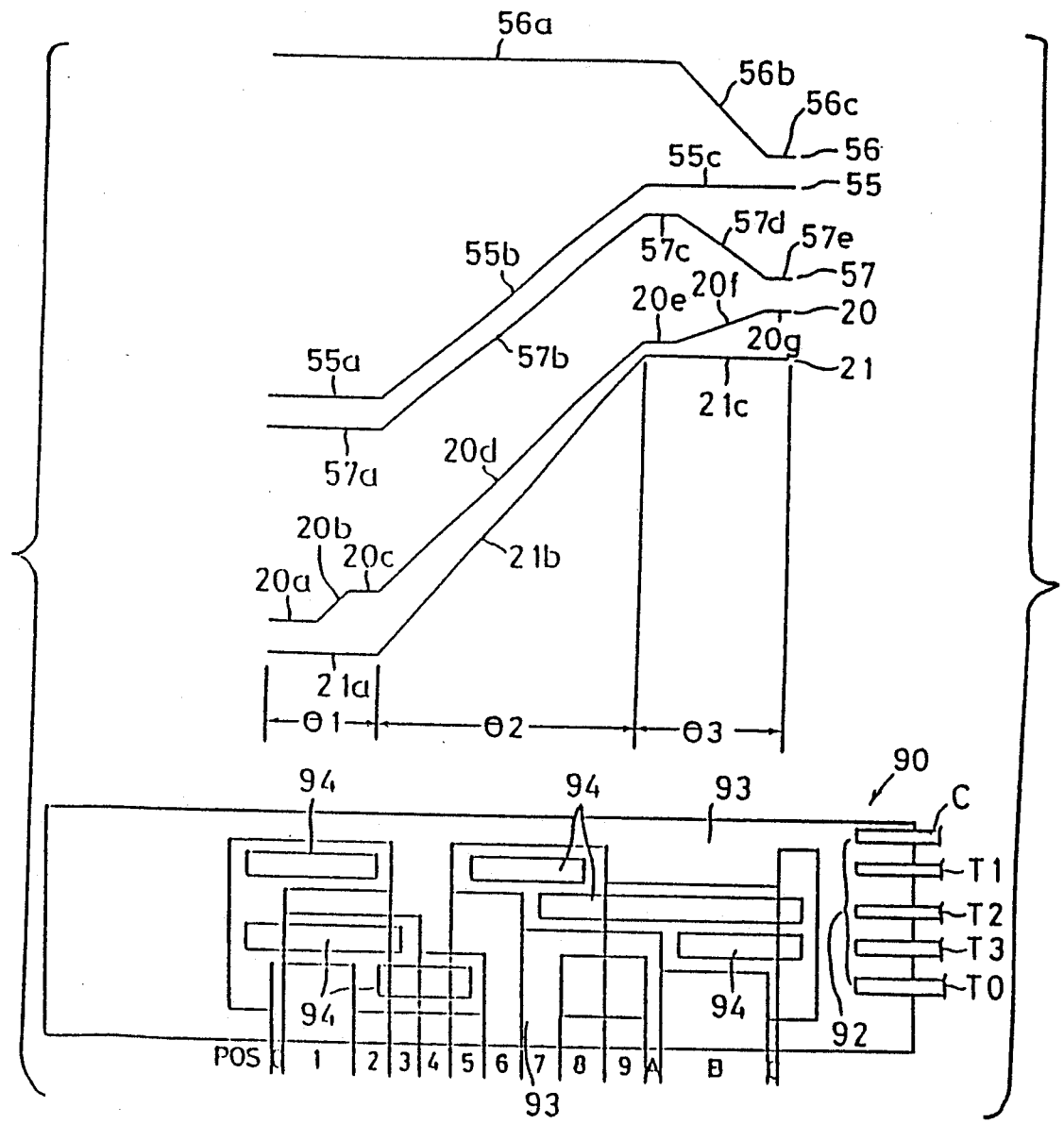
FIG. 29 is a developed view of a code plate, showing the lands thereof, and showing a developed view of the cam grooves for the purpose of illustrating the functional relationship therebetween.

The sections of variable power cam groove 55, parallax compensating cam groove 56 and the strobe cam groove 57 are uniquely related to the various sections of zooming cam grooves 20 and 21 of cam ring 14, which is described above with reference to FIG. 11. That is to say, variable power cam groove 55 includes wide angle terminus fixing section, 55a, variable power section 55b, and telephoto terminus fixing section 55c; and the sections are marked $\theta_1$, $\theta_2$, and $\theta_3$ which correspond to the same angles shown in FIG. 11. Parallax compensating cam groove 56 has non-projecting section 56a, projecting movement section (forward feed section for macro mode) 56b, and projected position fixing section (macro terminus fixing section) 56c. Strobe cam groove 57 has wide angle terminus fixing section 57a, variable power section 57b, telephoto terminus fixing section 57c, macro feeding section 57d, and macro terminus fixing section 57e. The relationship between cam grooves 55, 56 and 57 and zooming cam grooves 20 and 21 is shown in FIG. 29.

Figure 23:
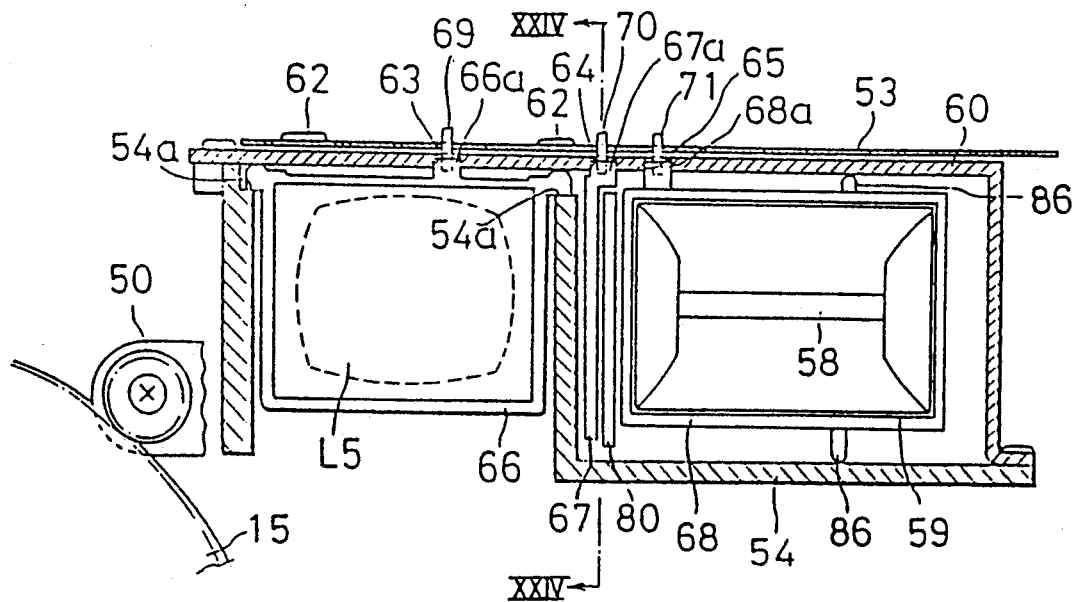
FIG. 23 is a sectional view taken along the line XXIII—XXIII in FIG. 19.

Variable power lens frame 66, which supports variable power lens group L5, is movably supported on guide face 54a of finder block 54 so that frame 66 is suspended therefrom as shown in FIG. 23. When frame 66 moves in response to the interaction between pin 69 on the frame and variable power cam groove 55 as cam plate 53 is displaced, the movement of frame 66 varies the magnification of the finder optical system including lens group L3, eyepiece group L4 and variable power lens group L5. Thus, the field of view of the finder is substantially consistent with the field defined by lens barrel block 1.

Figure 24:
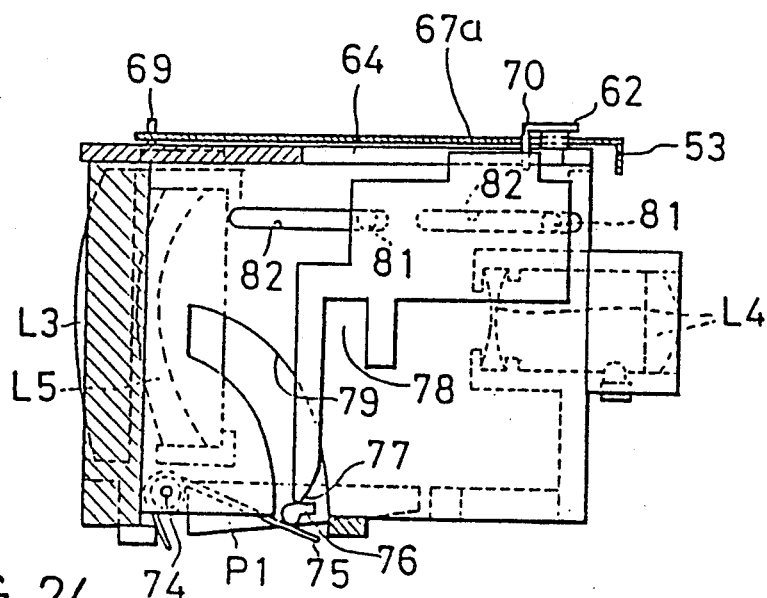
FIG. 24 is a sectional view taken along the line XXIV—XXIV in FIG. 23 showing a deflection prism actuating plate.
Figure 25:
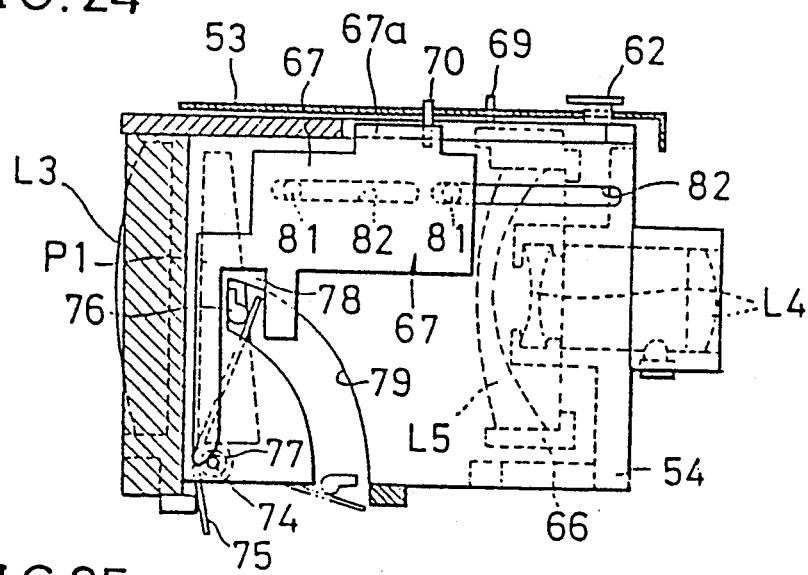
FIG. 25 is a sectional view similar to FIG. 24 but showing the actuating plate in a different operational position.

Referring now to deflection prism actuating plate 67 shown in FIGS. 24–26, deflection prism P1, which is made of synthetic resin, is rotatably supported by lower opposite supporting pins 74 on finder block 54. Each supporting pin 74 is surrounded by torsion spring 75, one end of which bears against respective abutment 76 provided on a side face of deflection prism P1. Consequently, deflection prism P1 is continuously biased toward a position in which the prism is in alignment with the optical axis of the lenses L3–L5. Each abutment 76 is located in arcuate groove 79 formed in finder block 54. Deflection prism actuating plate 67 is held between finder block 54 and guide plate 80 connected to the finder block. Guide pins 81 provided on the side face of plate 80 operatively engage in linear guide grooves 82 in finder block 54.

When pin 70 on plate 67 is located in section 56a of groove 56, position restricting abutment 76 on prism P1 engages rotation preventing face 77 on plate 67 as shown in FIG. 24. In such position, deflection prism actuating plate 67 holds deflection prism P1 out of the optical path of lenses L3–L5 against the bias of springs 75. During movement of plate 67, which occurs when the pin 70 engages projecting movement section 56b of groove 56, spring 75 biases prism P1 into the optical path of lens L3–L5. Eventually, guiding surface 78 on plate 67 engages abutment 76 so that deflection prism P1 is rotated into alignment with the optical path. During this movement, abutments 76 move into guiding surface 78 of deflection prism P1 which gradually comes into alignment with the optical path as shown in FIGS. 25 and 26, so that the optical path of the finder is deflected downwardly by prism P1 as shown in FIG. 26. As a result of this, a subject located close to the camera, and below the viewfinder, comes into the field of view. Thus parallax error in the macro mode of operation is decreased.

Figure 28:
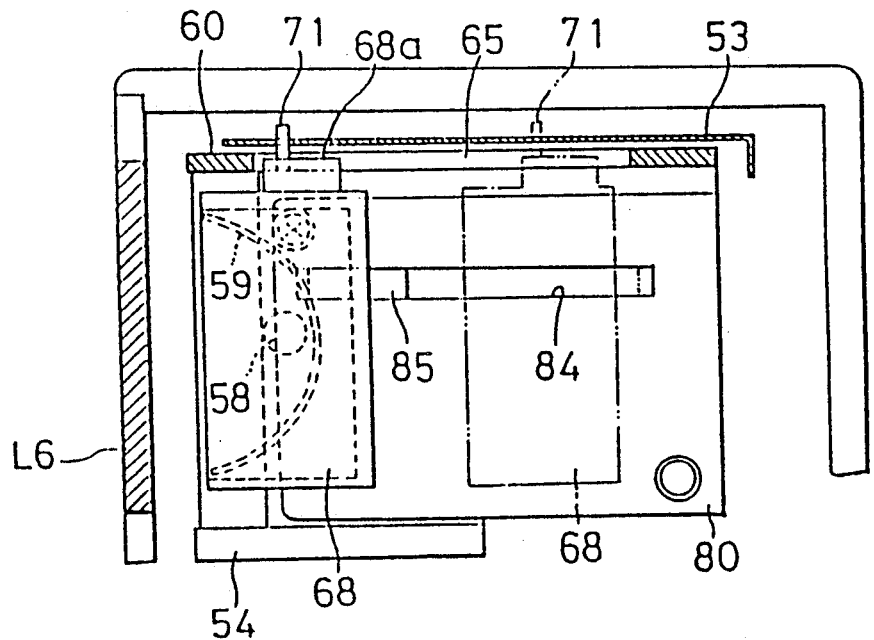
FIG. 28 is a sectional view taken along the line XXVIII—XXVIII in FIG. 27.

Strobe case 68 is provided, on one side, with guide block 85 which operatively slides in linear guide groove 84 in guide plate 80, groove 84 being parallel to the optical axis of the camera as shown in FIG. 28. Height adjusting pins 86 (FIGS. 23 and 27) are located on the upper and lower faces of case 68 to slidingly support the case during its axial displacement as pin P1 moves in strobe cam groove 57 in response to lateral movement of cam plate 53. Variable power section 57b of the strobe cam groove 57 is effective to move xenon lamp 58 backwardly, away from Fresnel lens L6. The backward movement of xenon lamp 58 causes the illumination angle of the light transmitted by Fresnel lens L6 to decrease in order to substantially increase the guide number in accordance with an increase in focal length. On the contrary, when pin P1 is located in macro feeding section 57d, the illumination angle is increased, and the guide number is thus, substantially decreased. The last mentioned situation occurs during micro mode operation of the camera.

In the above discussion, the mechanical design of a camera having a between-the-lens shutter camera to which the present invention is applicable has been described. Control systems according to the present invention are explained below.

First Embodiment of Zoom Lens System Drive

Referring now to FIG. 1, reference numeral A10 designates, in schematic form, the first embodiment of the present invention which includes zoom lens A11 for a camera having a between-the-lens shutter, and selectively reversible motor A12 coupled to the lens system through drive system A13 for moving the lens in opposite directions as indicated by the arrows in FIG. 1 along an optical axis.

Embodiment A10 comprises switch means A1 operable by an operator to control operation of motor A12 for moving the lens from an initial position on the axis to a final stationary position that establishes the focal length of the lens. This embodiment also includes control means in the form of lens start drive means A2 and lens stop drive means A3 collectively responsive to switch means A1 for operating motor A12 such that movement of the lens from its initial to its final position always occurs after lens A11 travels to its final position in a predetermined direction. This is illustrated schematically within block LX.

This arrangement will accurately position the lens at the final position by always taking into account, to the same degree, any backlash in drive system A13 that connects motor A12 to lens A11.

Figure 5:
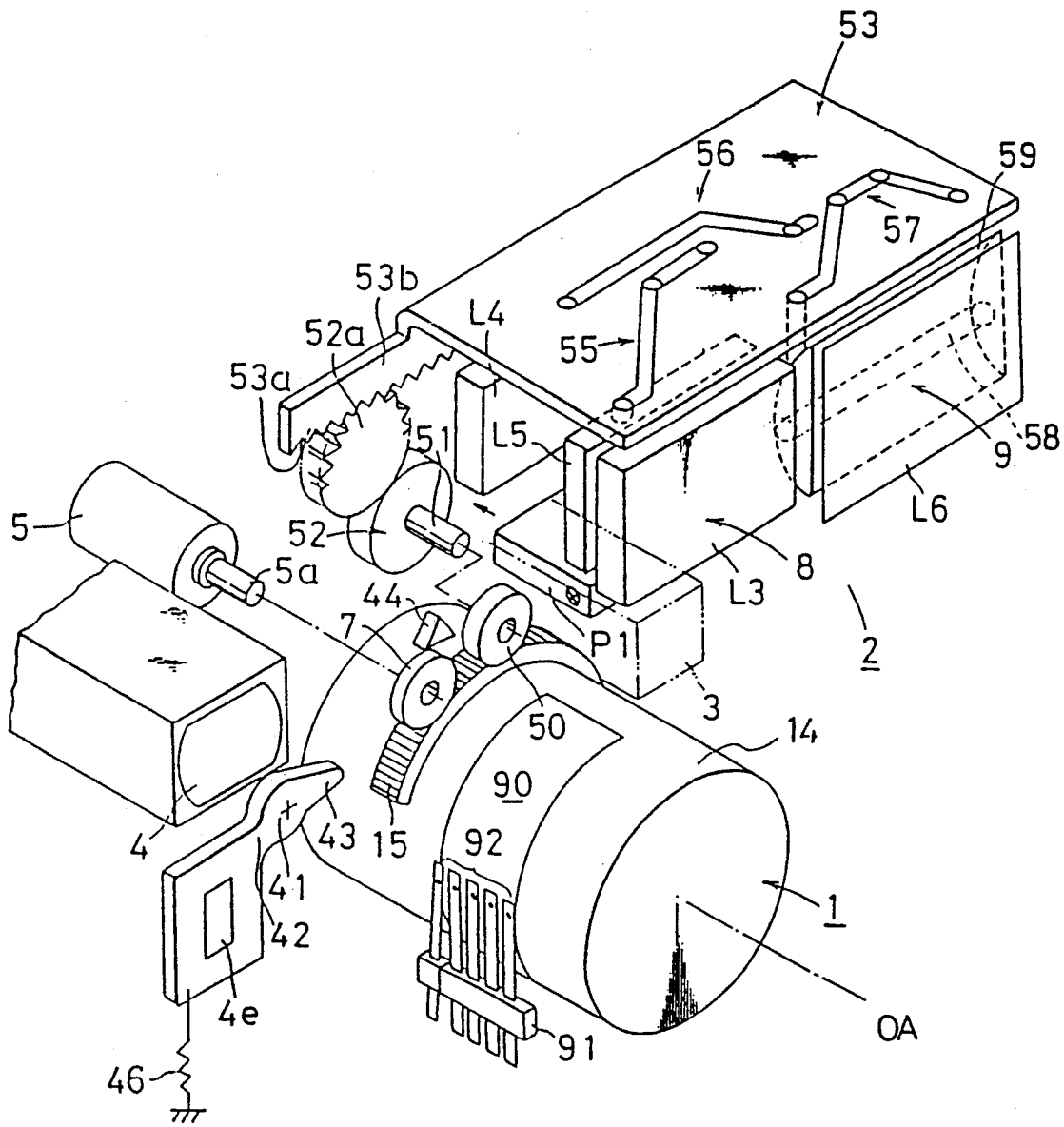
FIG. 5 is a schematic perspective view of between-the-lens shutter camera with a zoom lens according to the present invention.
Figure 6:
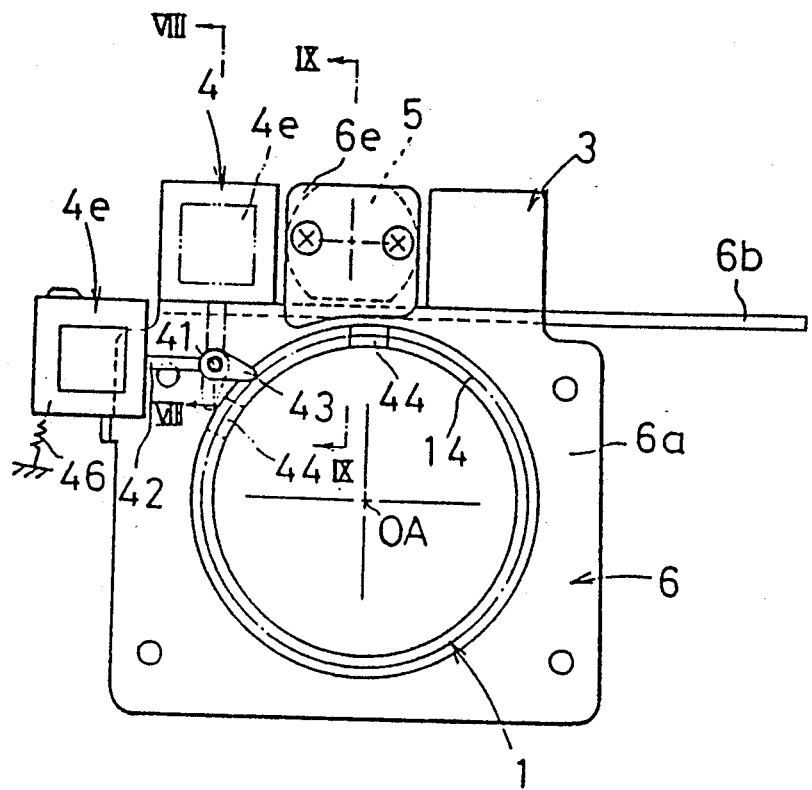
FIG. 6 is a front elevational view of the lens barrel block of FIG. 5 showing a light emitter and receiver, a macro compensating optical element associated with a distance measuring device, and a zoom motor.
Figure 7:
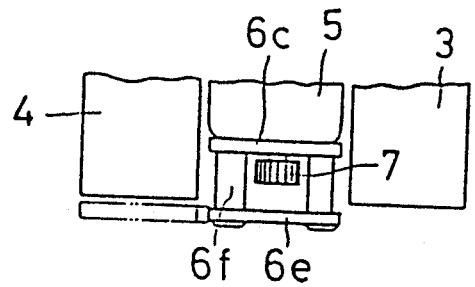
FIG. 7 is a top plan view of a portion of the apparatus of FIG. 6.
Figure 8:
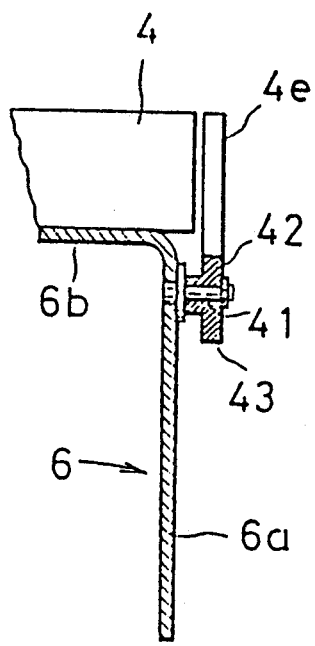
FIGS. 8 and 9 are sectional views taken along the lines XIII—XIII and IX—IX, respectively, in FIG. 6.
Figure 9:
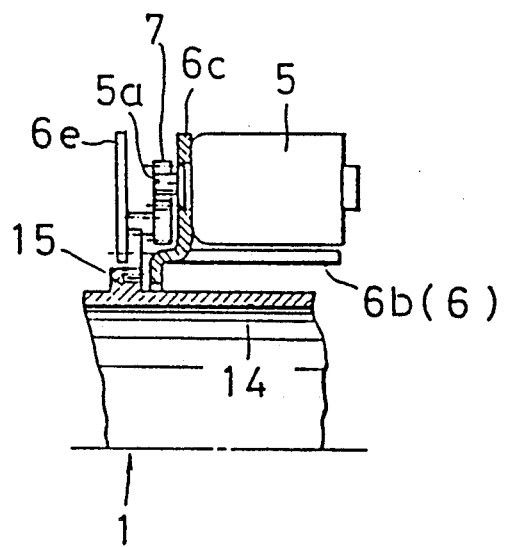

The camera according to the present invention can be controlled variously according to information, automatically detected, concerning changes in focal length of the zoom lens in lens barrel block 1, changes of the open F value due to changes in focal length, and changes in lens position which can vary from the wide-angle or telephoto terminus, retraction position to macro-photographic position. For detecting lens position, code sheet 90, shown schematically in FIG. 5, is fixed to the outer circumference of cam ring 14 of lens barrel block 1. Fixed frame 91 located adjacent ring 14 carries a plurality of brushes 92 which sliding by contact the code sheet 90.

FIG. 29 is a development plan of code sheet 90, showing the relationship of the conductive portions on code sheet 90 to cam profiles of zooming cam grooves 20 and 21 in the cam ring 14, and the cam profiles of cam grooves 55, 56 and 57 in a cam plate 53 which are depicted above the development plan of the code sheet. Brushes 92 include common terminal C, and terminals T0, T1, T2, and T3. When terminals T0 to T3 are in contact with conductive lands 93 of the code sheet 90, a "0" signal is produced. When they are not in such contact, a "1" signal is derived. The angular position of cam ring 14 is detected from a combination of these "0" and "1" signals. Reference numeral 94 indicates a conductive region isolated from lands 93 by a non-conducting region. The information T0, T1, T2 and T3 is given as zoom code data ZP0, ZP1, ZP2 and ZP3 to a zoom code encoder. FIG. 30 is a table showing the combinations of zoom code data "1" and "0". In the embodiment of FIG. 5, the angular position (POS) of the cam ring 14 is divided into 13 steps ranging from "0" to "9" through "A", "B", and "C" (hexadecimal number). Position "0" corresponds to locking position LOCK and position "C" corresponds to the macro-photographic position (MACRO). Intermediate these positions are different focal-length positions ranging from f0 to f7'. The positions are also depicted at the bottom of code sheet 90 in FIG. 29. As seen in FIG. 30, the zoom code data is a Gray code in that one and only one bit changes from position to position.

The detail of "POS" are described below:

POS 1: The transition from the "LOCK" position to "WIDE" terminus position is detected by a change from "1" to "0" in the data derived from brush T2. Strictly speaking, the "LOCK" position is not "POS 0" but a point between "POS 0" and "POS 1". However, when the camera is in the "LOCK" position, the brush is in "POS 0" which is very close to "POS 1". Similarly, the transition from "WIDE" terminus to variable magnification "f0" is a point between "POS 1" and "POS 2" and is detected by a change data from "0" to "1" in the data derived from brush T0. However, "POS 2" of brush 92 is very close to "POS 1". Accordingly, "POS 1" connotes a range in which cam ring 14 moves from the "WIDE" terminus to "LOCK" and vice versa, and from "WIDE" terminus to "f0".

Figure 45:
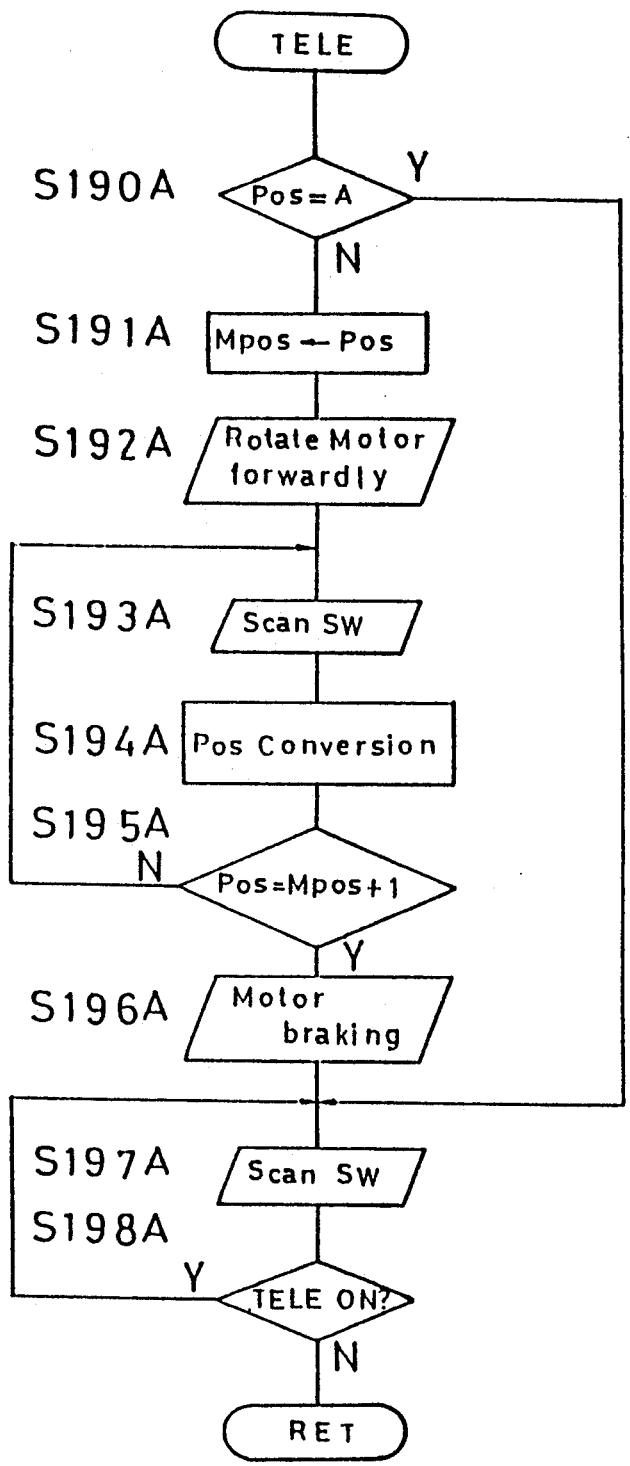

POS f7': This zone is provided for absorbing the backlash of cam ring 14 (lens system). As shown in FIG. 45, and as described in detail below, during rotation of the cam ring from "POS 0" toward "POS C", the cam ring halts immediately when a stop signal is given (i.e. when the zoom switch is turned OFF). On the contrary, during rotation of the cam ring from "POS C" toward "POS 0", cam ring 14 reverses only after it overruns a selected position by a predetermined displacement and then it halts at a first changing point of "POS".

"POS f7'" is the "TELE" terminus, and accordingly, when cam ring 14 is in "TELE" terminus ("TELE" zone: a zone in which the camera operates at the exposure of "TELE"), the brush is in "POS A" which is very close to "POS 9". Focal length information, or the F number information, is fed to the shutter by the code plate and the brush. Accordingly, the same focal length information is fed at the "TELE" zone and the "TELE" terminus. This is the reason that "POS 9" is represented by "f7", and "POS A" is represented by "f7'" to distinguish it from "f7". The zone of "f7'" is very small and accordingly the zone of "F7" can be basically considered identical to "TELE" terminus.

POS B: This zone is provided to distinguish the transition between "MACRO" and "TELE" terminus, and "TELE" terminus and "POS 7'".

POS 2—POS A: These represent the zooming range of the lens and intermediate focal lengths consist of a plurality (nine in the illustrated embodiment) of focal-length steps.

The CPU checks the code information and setting positions of the various switches as soon as power is applied. If the mode changing switch is in "ZOOM", and the cam ring is located in any of "POS 2"—"POS A", no zooming is necessary. If the mode changing switch is in a position other than "ZOOM", namely in any one of "LOCK", an intermediate position between "LOCK" and "WIDE", an intermediate position between "TELE" and "MACRO", or "MACRO", and is then changed to ZOOM, zooming operation is immediately effected. The same is true when the switch is changed to "ZOOM" during reverse rotation of the zoom motor, independently of whether the zoom code is within the range of "POS 2"="POS A" which is the range in which zooming can be effected. If the zoom code is out of this range, no picture can be taken, and accordingly, the cam ring is moved to the zooming position. In other words, "POS1" and "POS B" are positions in which the cam ring is prohibited from stopping, and in which a picture cannot be taken.

Figure 31:
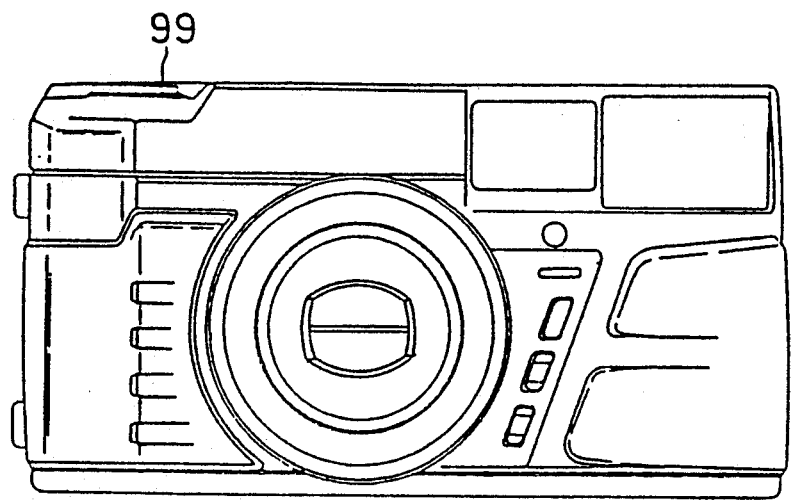
FIG. 31, 32 and 33 are front elevational, back elevational, and plan views, respectively, of a camera of the invention showing operational switches.
Figure 32:
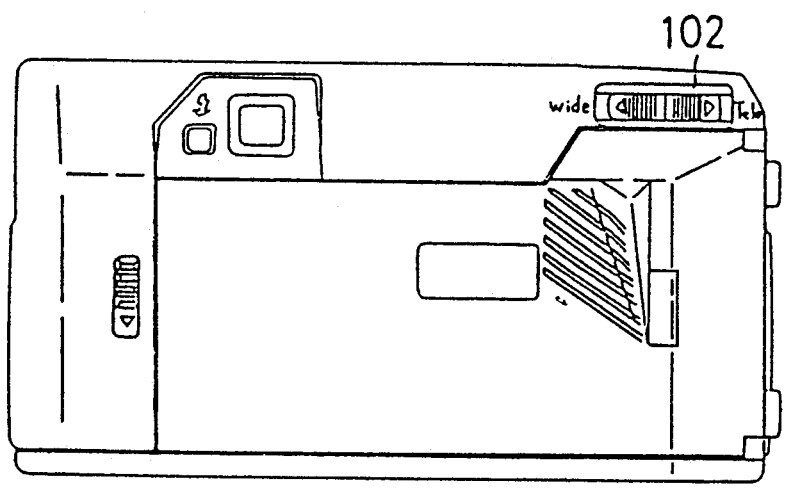
Figure 33:
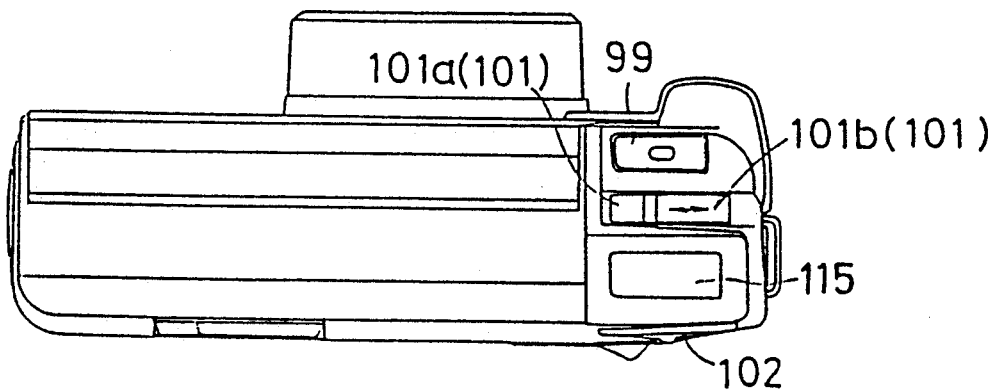

The rotation of cam ring 14 is controlled by mode changeover switch 101 and zoom switch 102. FIGS. 31 to 33 show, a typical layout of switches 101 and 102 on the camera body. Reference numeral 99 indicates a multi-position button; when depressed to its first step, light-measuring switch 103 (see FIG. 36) is turned on; and further depressing to the second step turns on release switch 123 (also see FIG. 36).

The control system for the camera is described in detail below in reference to FIGS. 36 and 41, but first, a brief overview of the control system is provided.

Figure 34:
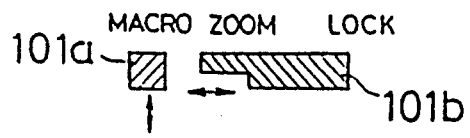
FIGS. 34 and 35 are sectional views of a mode changing switch, and a macro button shown in different operational positions.
Figure 35:
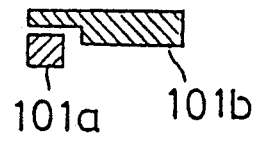
Figure 42:
FIG. 42 is a plane view of a zoom switch in a modified arrangement.

Mode changeover switch 101 is a transfer switch which can take three positions LOCK, ZOOM and MACRO. As shown in FIGS. 33 to 35, when macro-photographic button 101a is not pressed, switch lever 101b can be shifted between LOCK and ZOOM positions. By sliding switch lever 101b onto macro-photographic button 101a with the latter kept pressed, mode changeover switch 101 takes the MACRO position. When the mode changeover switch is at the LOCK position, the shutter cannot be released and zooming operation is not possible. With mode changeover switch 101 is set at the ZOOM position, the shutter can be released, and zooming operation is also possible. When switch 101 is set at the MACRO position, the shutter is releasable but zooming operation is not possible. FIG. 42 shows an example of another zoom switch in which pressing the wide-angle button W and telephoto button T, respectively, will cause the lens to move to the zoom and wide-angle positions, respectively.

When released, zoom switch 102 takes a neutral position (OFF). When a force is applied in different directions, the switch is turned on and the setting is changed to either the WIDE or the TELE positions, depending upon the direction of the force. Operating switch 102 will cause zoom motor 5 to rotate in either forward and reverse directions, according to the setting of the switch.

Mode changeover switch 101 and zooming switch 102 cause the camera to work as is described below.

(1) Moving mode changeover switch 101 to LOCK position causes zoom motor 5 to rotate in the reverse direction. When the position (POS) of cam ring 14 detected by the code sheet 90 and brushes 92 becomes "0" (see FIGS. 29 and 30), zoom motor 5 is stopped.

(2) Moving the mode changeover switch 101 to MACRO position causes zoom motor 5 to rotate in the forward direction. When POS="C" (see FIGS. 29 and 30), zoom motor 5 is stopped.

(3) Moving the mode changeover switch 101 to ZOOM position.

If zoom switch 102 is set at the WIDE position, zoom motor 5 rotates in the reverse direction while the zoom switch is on, and cam ring 15 moves rearwardly. If the mode changeover switch 101 remains set to the WIDE position, after POS becomes "1" (see FIGS. 29 and 30), zoom motor 5 keeps rotating in the reverse direction for a short time. The rotation is reversed, and motor 5 rotates in the forward direction until POS becomes "2", at which point motor 5 is stopped.

If switch 102 is set to the TELE position, zoom motor 5 rotates in the forward direction while the switch is on. While switch 102 remains the TELE position, cam ring 14 moves forwardly until POS="A" (see FIGS. 29 and 30) and zoom motor 5 is stopped.

If zoom switch 102 is turned off (at the neutral position) while zoom motor 5 is rotating forwardly in the TELE direction, the motor is immediately stopped. If switch 102 is turned off while motor 5 is rotating rearwardly in the WIDE direction (reverse), the motor is stopped only after it has been reversed and allowed to rotate in the forward direction for a short time. This forward rotation is intended to eliminate mechanical backlash in the lens drive system barrel block 1 and finder block 2 in order to eliminate a difference between the stop positions of motor 5 when rotating in the WIDE and TELE directions, respectively.

Figure 36:
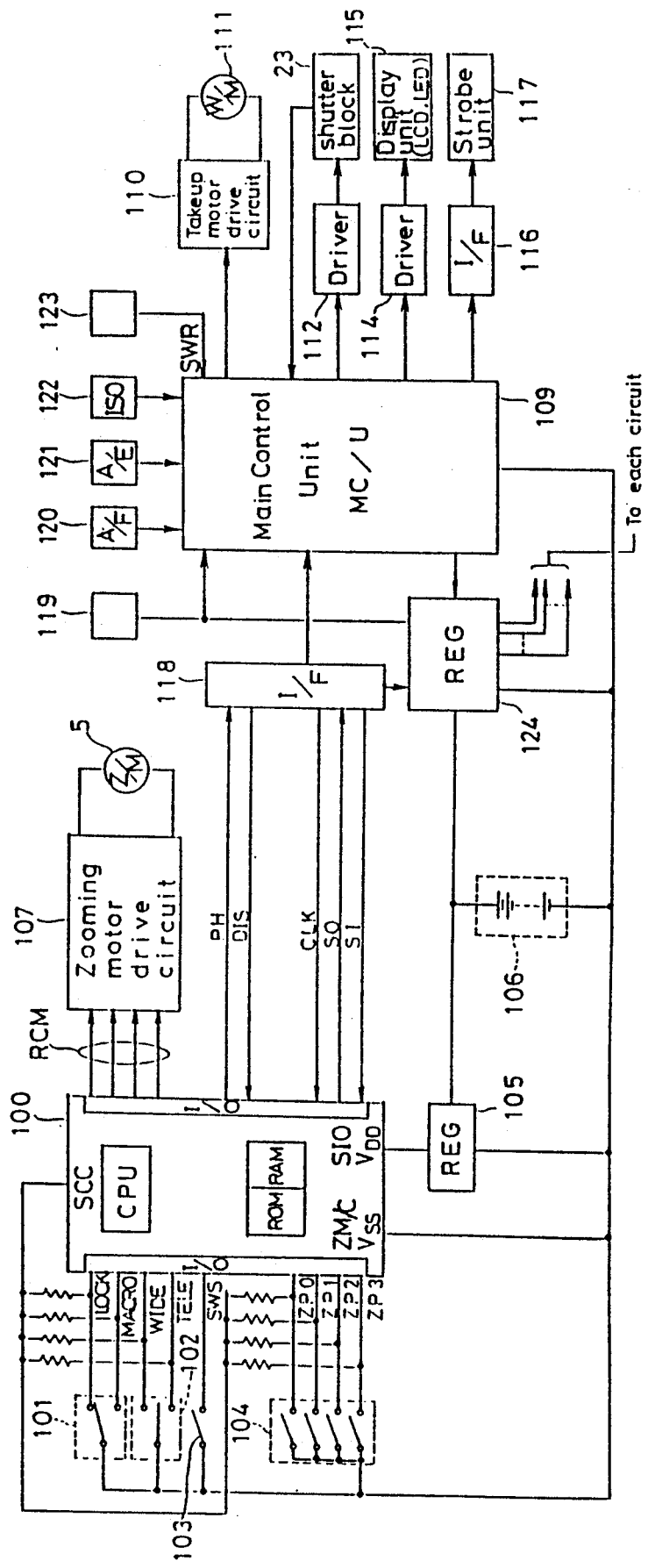
FIG. 36 is a block diagram of a controlling device for the present invention.

Referring now to FIG. 36, zoom motor control unit 100 (referred to as "ZM/C" hereinafter) is composed of, for example, a single-chip microcomputer having therein a program memory (ROM) in which the programs described below is stored.

ZM/C 100 is supplied with switch data from mode changeover switch 101, zoom switch 102, distance-measuring switch 103, and zoom encoder 104 (shown as a switch equivalent circuit). It, also receives, from main control unit 109 (referred to as "MC/U" hereinafter), zoom motor disable signal DIS, serial data transfer clock CLK, and serial signal SI which carries switch checking/operation terminating data which is described below. ZM/C 100 supplies rotation control command RCM to zoom motor drive circuit 107 which controls zoom motor 5, and delivers to MC/U 109 a power-hold signal PH to turn on/off MC/U 109 and serial signal SO carrying zoom encoder data, ZPO to ZP3 from zoom encoder 104.

Mode changeover switch 101 generates two signals, LOCK and MACRO as shown in Table 1 according to the aforementioned three positions LOCK, ZOOM and MACRO.

TABLE 1

| Position | Signal Name | |
|---|---|---|
| | Lock | Macro |
| Lock | (ON) | (OFF) |
| Zoom | OFF | OFF |
| Macro | OFF | ON |

Zoom switch 102 takes the three positions WIDE MOMENTARY, OFF, and TELE MOMENTARY.

Light-measuring switch 103 is actuated (to produce a signal SWS) when release button 99 is pressed to the first step to initiate operation of distance-measuring device 120 (comprising light-emitter 3 and photo-dectector 4 as mentioned previously) and light-measuring device (A/E) 121.

Zoom encoder 104 converts the angular position of cam ring 14 to zoom codes ZP0 to ZP3 by means of code sheet 90 and brushes 92, and supplies the codes to ZM/C 100.

The switch scan control process effected through the terminal SSC is such that a high voltage "H" is developed at this terminal only when the above-mentioned input from each switch is checked, and a low voltage "L" is developed in other than the checking mode to reduce power consumption.

Voltage regulator 105 is supplied from battery 106 to supply the required drive voltages to ZM/C 100.

Figure 37:
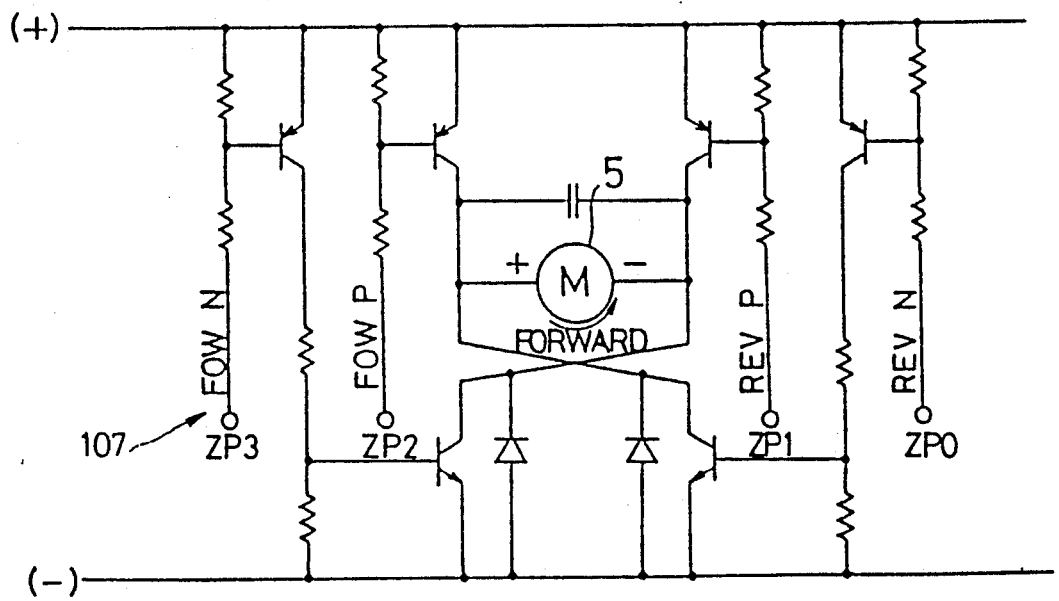
FIG. 37 is a drive circuit a zoom motor.

Zoom motor drive circuit 107 may be configured, for example, as shown in FIG. 37. The operation of this circuit is based on a rotation control command RCM of 4 bits (FOWN, FOWP, REVN and REVP) from ZM/C 100 for controlling rotation, and to stop zoom motor 5 as shown Table 2 and 3 where "ON" corresponds to a "1" in FIG. 30, and "off" corresponds to a "0".

TABLE 2

| | Forward Run | | | | |
|---|---|---|---|---|---|
| | FOWN | FOWP | REVP | REVN | FUNCTION |
| 1 | | | | | OPEN |
| 2 | ON | ON | OFF | OFF | RUN FORWARD |
| 3 | | | | | OPEN |
| 4 | ON | OFF | OFF | ON | BRAKE |
| 5 | | | | | OPEN |

TABLE 3

| | Reverse Run | | | | |
|---|---|---|---|---|---|
| | FOWN | FOWP | REVP | REVN | FUNCTION |
| 1 | | | | | OPEN |
| 2 | OFF | OFF | ON | ON | RUN FORWARD |
| 3 | | | | | OPEN |
| 4 | ON | OFF | OFF | ON | BRAKE |
| 5 | | | | | OPEN |

MC/U 109 maybe composed of, for example, a single-chip microcomputer, and performs the following functions by executing the programs stored in an internal program memory thereof:

(1) control of the rotation of film takeup motor 111 through takeup drive circuit 110;

(2) driving and control of shutter block 23 through driver 112;

(3) control of various display indicators 115 through driver 114;

(4) control of strobe unit 117 (strobe circuit includes xenon light-emitting tube 58) through interface 116;

(5) outputting of zoom motor disable signal DIS to ZM/C 100- through interfaced 118;

(6) outputting of serial transfer clock CLK through interface 118;

(7) outputting, through interface 118, of serial signal SI which carries switch checking/operating terminating data described below; and (8) keeping regulator 124 in operation.

For the purpose of performing the above-mentioned functions, MC/U 109 is supplied with switch data from takeup motor control switch 119 of the film rewinding switch, rear-cover switch, etc., measured light data from the light-measuring device 121, detected distance data from distance-measuring device 120, film sensitivity setting or film sensitivity data from automatic film sensitivity read (ISO) 122, switch data SWR from release switch 123, etc.

MC/U 109 causes voltage regulator 124 to keep operating, or started/stopped depending upon the existence of power hold signal supplied through interface 118. In addition, regulator 124 is also put into operation with the switch data from takeup motor control switch 119; and, when it is in operation, voltage regulator 124 supplies required power to various circuits of the main control system except for the zoom control system.

Referring to the flow charts shown in FIGS. 38 to 41, the operation of ZM/C 100 is explained below together with the programs stored in the ROM of ZM/C 100.

Figure 38A:
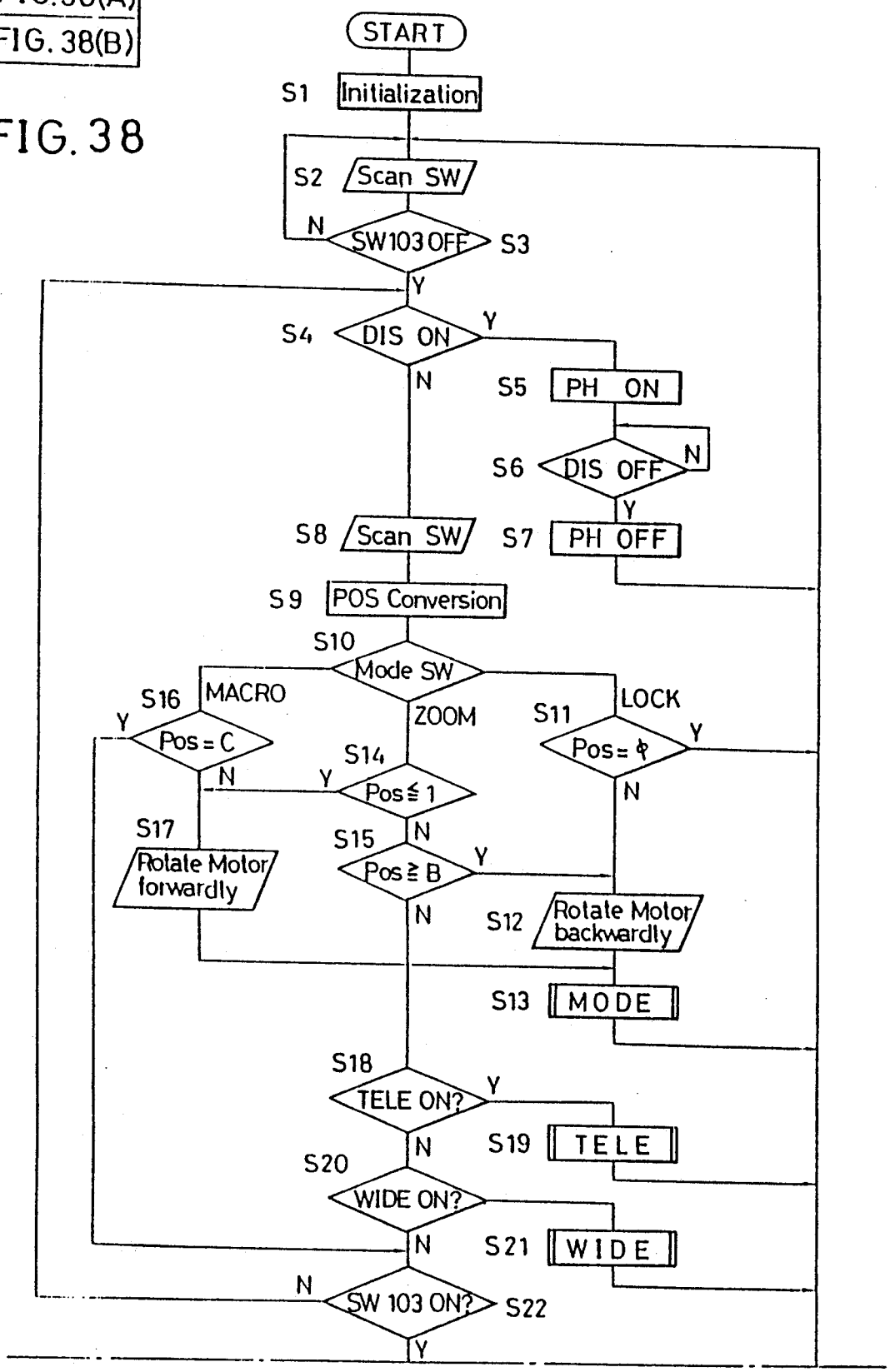
Figure 38:
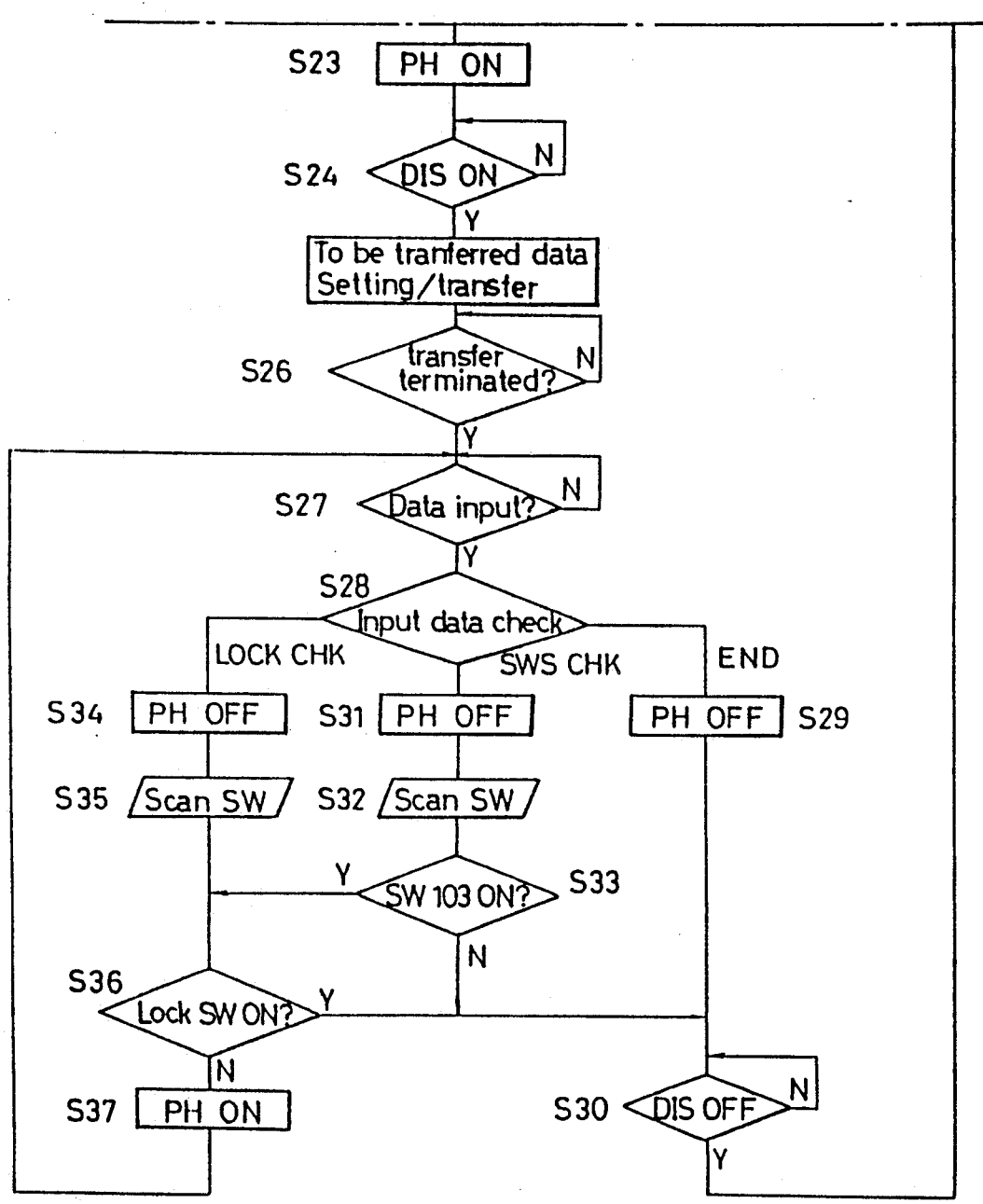

Referring to FIG. 38, S1 carries out an initialization process as ZM/C 100 is energized through regulator 105 by battery 106 contained in a battery case (not shown). At S2, the CPU effects a switch scan control process, detecting the state of each of mode changeover switch 101, zoom switch 102, light-measuring switch 103, and zoom encoder 104. Thereafter, S3 checks the status of light-measuring switch 103. If light-measuring switch 103 is ON, the CPU repeats the processes at S2 until light-measuring switch 103 is OFF. When light-measuring switch 103 is found to be OFF, the CPU advances the process to S4 where the status of zoom motor disable signal DIS is checked. If this signal is present, (i.e., DIS in ON, or DIS="1") the process is advanced to S5; but if the signal is not present, (i.e., DIS="0"), the process is advanced to S8.

Zoom motor disable signal DIS is provided for the purpose of prohibiting simultaneous operation of takeup motor 111 and zoom motor 5 in order to reduce power consumption and prolong the life of battery 106. Thus MC/U 109 turns on disable signal DIS only when MC/U 109 is actuated by takeup motor control switch 199 to enable operation of takeup motor 111. When zoom motor disable signal DIS is on, power hold signal PH is turned on (for example, "1"). The purpose of the output of power hold signal PH at S5 is to effect operation of takeup motor 111 at the time of MC/U 109 is actuated by takeup motor control switch 119, rather than to let operation of motor 111 take place unconditionally. In other words, operation of motor 111 can take place only after permission is given by the power hold signal supplied from the ZM/C 100. In this way, zoom motor 5 and takeup motor 111 cannot rotate simultaneously.

At S6, the process is suspended until disable signal DIS from MC/U 109 turns off; i.e., until the rotation control of takeup motor 111 by MC/U 109 terminates. When zoom motor disable signal DIS turns off, power hold signal PH is turned off (for example, "0"). At S7, which detects when DIS is off, regulator 124 is turned off, and the the process is reset to S2. Even after regulator 124 is turned off, not all power supply stops. For example, power is still s supplied to indicator 115.

When the process has advanced to S4 and signal DIS is off, the process then advances to S8 where a switch scanning procedure is carried out similar to the procedure at S2. The process then advances to S9 where a POS conversion is effected in order to detect the POS values (refer to FIGS. 29 and 30) from the zoom encoder, and the zoom code ZP0 to ZP3. At S10, the state of mode changeover switch 101 is tested for the states "LOCK", "ZOOM" or "MACRO", which had been determined previously at S8. If the position is "LOCK", the process is advanced to S11; if it is "ZOOM", to S14; and if it is "MACRO", to S16.

If the state of switch 101 is "LOCK", S11 tests whether the POS conversion at S9 yields POS=0. If so, the process is reset to S2, otherwise the process is advanced to S12 which applies the appropriate signals to drive circuit 107 to effect reverse rotation of motor 5 (refer to the rotation control command in Table 3). A mode subroutine, described below, is then executed at S13, and the process is reset to S2 thereafter.

If the state of switch 101 is "ZOOM", S14 tests whether the POS conversion at S9 yields POS≦1. If so, the process advances to S17 to enable zoom motor 5 to rotate in the forward direction (refer to the rotation control command in Table 2). A mode subroutine described below is then executed at S13, and the process is reset to S2 thereafter.

In POS>1, S15 tests whether the POS conversion at S9 yields POS≧B. If so, the procedure advances to S12 where a mode subroutine described below is then executed at S13, and the process is reset to S2 thereafter; otherwise, the process advances to S18.

If the state of switch 101 is "MACRO", S16 tests whether the POS conversion at S9 yields POS=C. If so, the process jumps to S22; but if POS=C, the process is advanced to S17 to enable forward rotation of zoom motor 5. A mode subroutine described below is then called and executed at S13, and thereafter the process is reset to S2.

At S18, the state of zoom switch 102 is checked based on the switch screen at S8. If this switch is set to TELE, the TELE subroutine described below is called and executed at S19, and the process is reset to S2. If the switch is not set to TELE, the process advances to S20.

At S20, the state of zoom switch 102 is checked based on the switch scan at S8. If this switch is set to WIDE, the WIDE subroutine described below is called and executed at S21, and the process is reset to S2. If the switch is not set to WIDE, the process advances to S22 where the state of light-measuring switch 103 is checked based on the switch scan at S8. If switch 103 is not turned on, the process is reset to S2; otherwise the process advances to S23.

Processes S1 to S22 are main processes; and before explaining the processes at S23 and those that follow, the operation of the camera is described as are the mode subroutine at S13, the TELE subroutine at S19 and the WIDE subroutine at S21.

MODE SUBROUTINE OF FIRST EMBODIMENT

Figures 39, 39A:
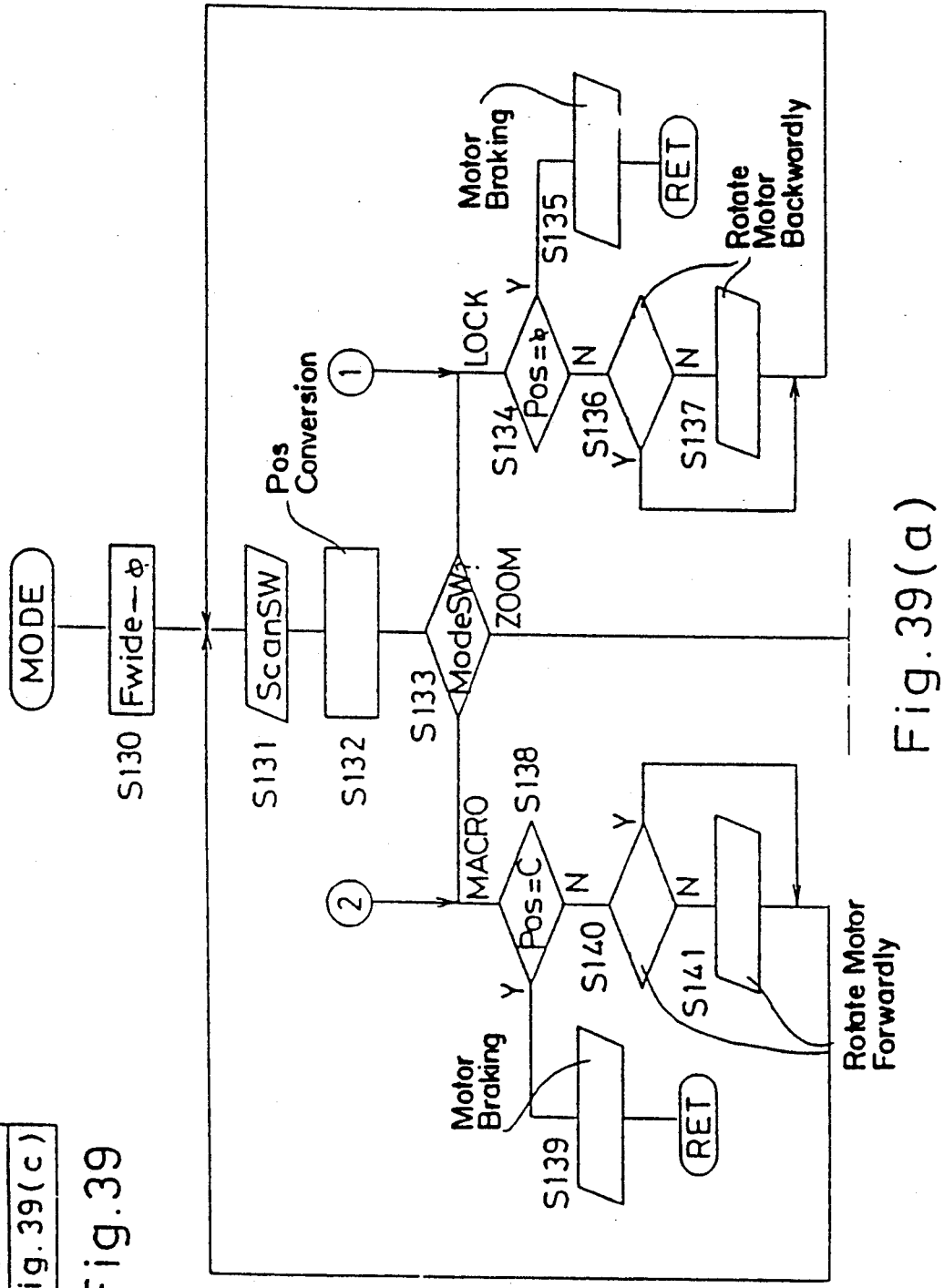
Figure 39B:
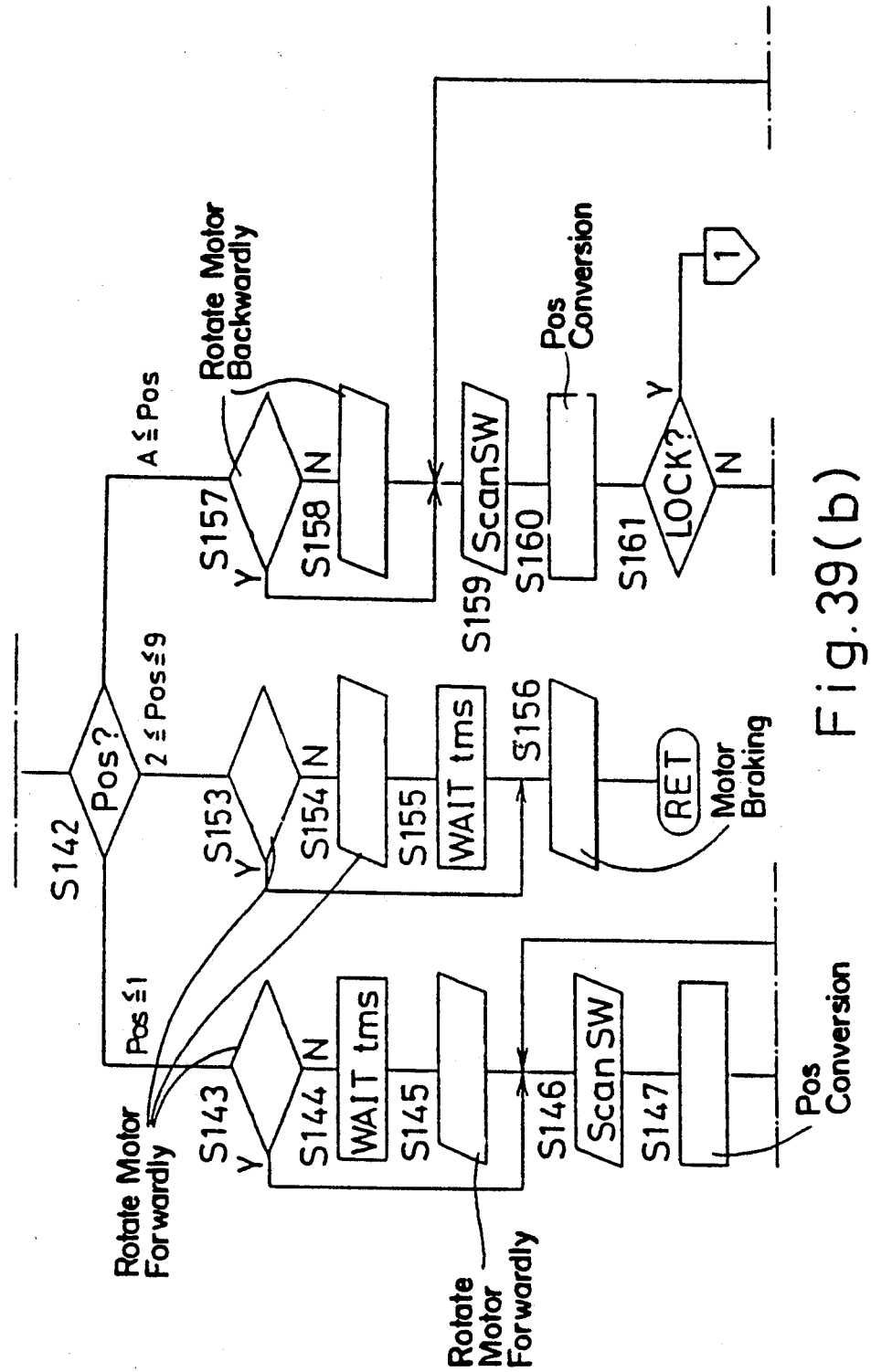
Figure 39C:
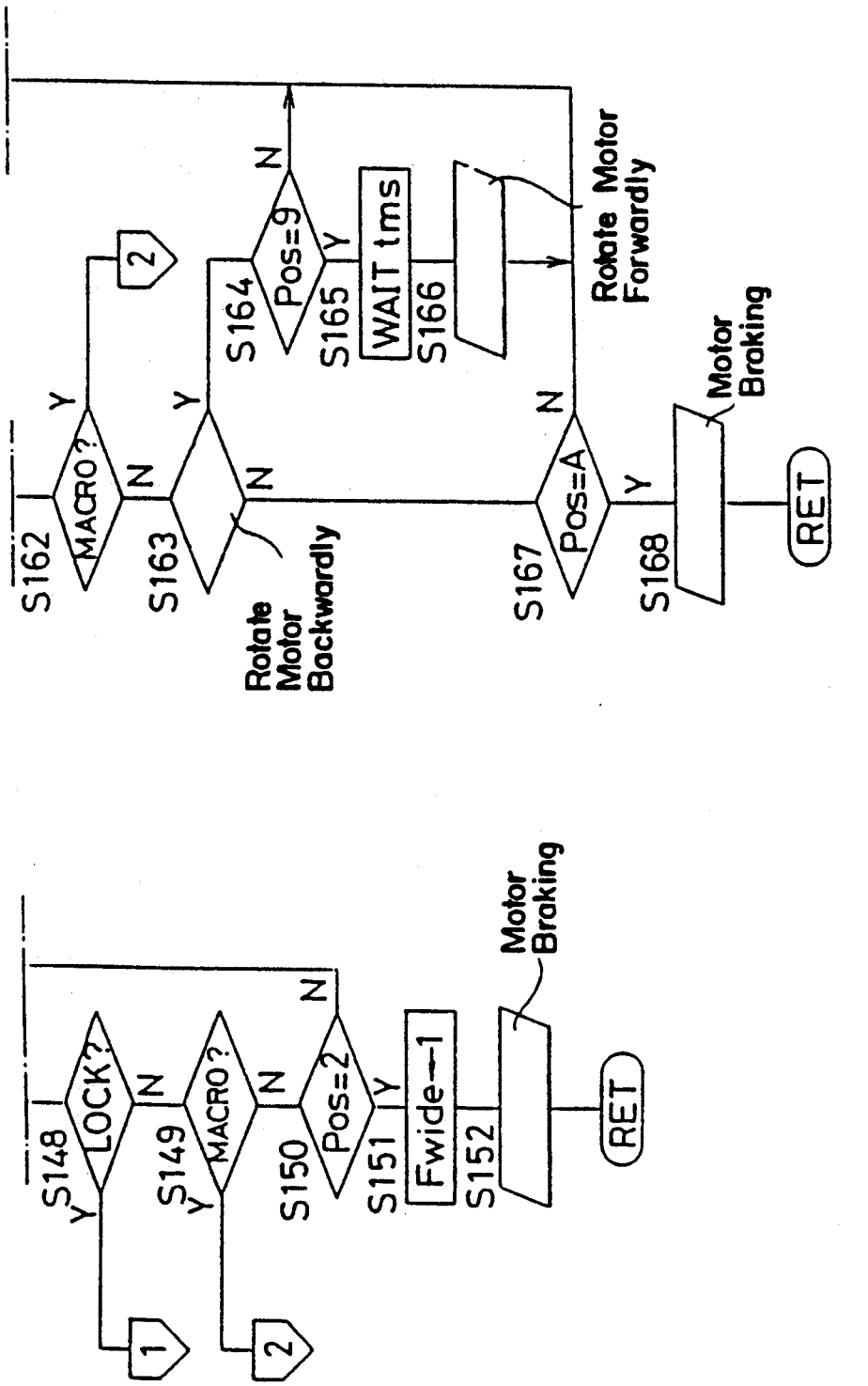

Referring to the flow chart of FIG. 39, the mode subroutine is detailed. The flow chart, and others that follow, utilize a flag stored in a register in the RAM of ZM/C 100, the flag being designated Fwide. When this flag is reset to 0, this connotes that the angular position of cam ring 14 is such that the lens system of the camera is located at a position other than its wide angle terminus position adjacent a transition to its variable magnification position (see FIGS. 29 and 30). In such position, POS=2 and the lens system is set at f0.

At S130, the CPU of ZM/C 100 resets flag Fwide to "0", and then effects sequential processes at S131 and S132 similar to those carried out previously at S8 and S9, respectively. Subsequently, at S133, the state of mode changeover switch 101 is determined based on the switch scan at S131. The process then advances to S134 if switch 101 is in "LOCK" position, to S138 if the switch is in "MACRO" position, or to S142 if the switch is in "ZOOM" position.

If switch 101 is set to "LOCK", the process advances to S134 which tests whether the POS conversion effected at S134 has produced POS=0, namely, the LOCK position. If the result of this test is POS=0, the process advances to S135 which stops rotation of zoom motor 5 (refer to the rotation control command RCM in Table 3) because the motor can be rotating only in reverse (due to S12), and a return process is then executed returning the program to S2 (FIG. 38). On the other hand, if the result of test S134 is POS≠0, zoom motor 5 may be operating in either its forward or reverse directions, and the process advances to S136 which checks whether the motor is operating in its reverse direction. If it is, the process is reset immediately to S131; otherwise (due to S17), the process advances to S137 which causes ZM/C 100 to issue a rotation control command that causes the motor to operate in the reverse direction; and thereafter the process is reset to S131.

If switch 101 is set to "MACRO", the advance to S138 tests whether the POS conversion effected at S132 has produced POS=C, i.e., the MACRO position. If so, the process advances to S139 which effects braking of zoom motor 5 (refer to rotation control command RCM in Table 2) because the motor can be rotating only in its forward direction and a return process is then executed returning to S2 (FIG. 38). If POS=C, zoom motor 5 may be rotating either forwardly or in reverse, and the process advances to S140 which checks whether the motor is operating in its forward direction. If it is, the process is immediately reset to S131; otherwise, the process advances to S141 where zoom motor 5 is commanded to rotate in the forward direction before the process is returned to S131.

If switch 101 is set to "ZOOM", the process advances to S142 which tests whether the POS conversion effected at S132 has produced POS24 A, POS$\leq$1 or 2$\geq$POS$\geq$9. The process advances to S143 if POS$\leq$1, to S153 if 223 POS$\leq$9, and to S157 if POS$\leq$A.

Recalling that entry into the mode subroutine can occur with the motor rotating in either forward or reverse, the direction of rotation is tested in the procedures that follow. If the POS conversion at S132 is such that POS$\leq$1, the process advances to S143 at which a test is made to determine if zoom motor 5 is rotating in the forward direction. If so, the process jumps to S146; otherwise, the motor is rotating in the reverse direction and the process advances to S144 where a standby process is carried out for a predetermined period of time, t msec, for a reason described below. After a delay of t msec, the process advances to S145 where a command is issued to motor 5 to reverse direction and rotate in the forward direction. After this command, the process advances sequentially to S146 and S147.

At S146 and S147, processes similar to those carried out at S8 and S9 in FIG. 38 take place to scan the states of the switches and to effect position conversion. Thereafter, at S148 and S149, the state of switch 101 is decoded to detect whether the operator has changed switch 101 from "ZOOM", to "LOCK" or to "MACRO". The current state of switch 101 is based on the switch scan at S146. If switch 101 has been changed to "LOCK", the process is reset to S134. On the other hand, if switch 101 has been changed to "MACRO", the process is reset to S138. If switch 101 remains "ZOOM", the process advances to S150.

S150 tests whether the POS conversion at S147 yields POS=2. If so, the process is reset to S146; otherwise, the process advances to S151. Recalling that at POS=2, the lens system is located at its wide angle terminus, S151 sets flag Fwide to "1" and the procedure advances to S152 where zoom motor 5 is braked by a suitable command (see Table 2) and stopped. Thereafter, the process is reset to S2 (FIG. 38).

If the POS conversion at S132 is such that 2$\leq$POS$\leq$9, the process advances to S153 which tests whether zoom motor 5 is rotating in the forward direction. If so, the process jumps to S156 which causes ZM/C 100 to issue a brake command that stops the zoom motor; thereafter, reset to S2 occurs. On the other hand, if zoom motor is rotating in the reverse direction, the process advances to S154 where a command to rotate motor 5 in the forward direction is sent; and thereafter, the process advances to S155 where a standby process is carried out for a predetermined period of time, t msec, for a reason described below. After an elapse of t msec, the process advances to S156 where a command to brake and thus stop zoom motor 5 is sent. Thereafter, reset to S2 (FIG. 38) occurs.

If the POS conversion at S132 is such that POS$\geq$A, the process advances to S157 which tests whether zoom motor 5 is rotating in the reverse direction. If it is, the process jumps to S159; otherwise, the process advances to S158 at which a command is issued to rotate motor 5 in the reverse direction; thereafter, the process advances to S159.

At S159 and S160, process similar to those for S8 and S9 in FIG. 38 are carried out; and thereafter, at S161 and S162, processes similar to the processes for S148 and S149 are carried out.

If mode changeover switch 101 remains in "ZOOM" position (as originally ascertained at S159, which is to say that the process advances through S161 and S162) S163 tests whether zoom motor 5 is rotating in the reverse direction. If so, the process advances to S164; otherwise the process advances to S167.

S164 tests whether the POS conversion at S160 resulted in POS=9. If so, the process is reset to S159; otherwise, processes similar to processes carried out at S144 and S145 are effected at S165 and S166, and the process is thereafter reset to S159.

If the process has advanced to S167 because the motor had been operating in the forward direction when S163 was executed, a test is carried out to determine whether the POS conversion at S160 yields POS=A which is indicative of whether telephoto terminus (f7' in FIG. 30) has been reached. If POS=A, the process is reset to S159; otherwise, the process advances to S168 at which a command is issued to stop zoom motor 5. Thereafter, the process is reset to S2 (FIG. 38).

TELE SUBROUTINE OF FIRST EMBODIMENT

Figure 40:
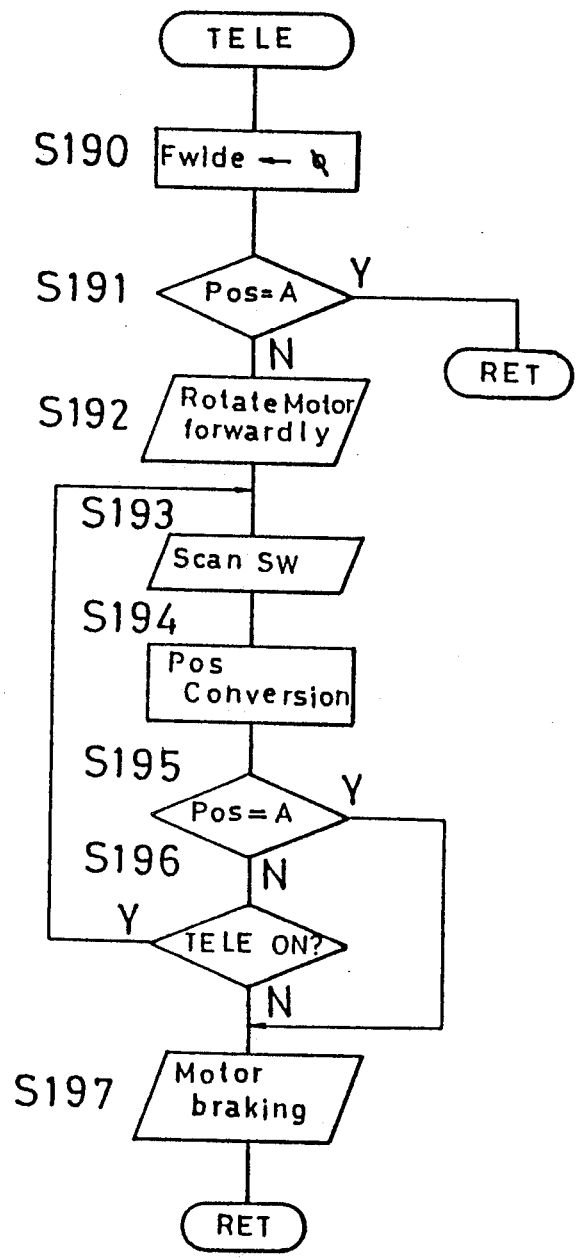

The flow chart of FIG. 40 details the TELE subroutine. At S190, the CPU of ZM/C 100 resets wide-angle terminus flag Fwide to "0", and the process advances to S191 where the result of the POS conversion at S9 (FIG. 38) is tested for POS=A. If POS=A, the process is immediately reset to S2 (FIG. 38); otherwise, the process advances to S192 to effect forward rotation of zoom motor 5. Thereafter, the process sequentially advances to S193 to S196. At S193 and S194, processes similar to those of S8 and S9 (FIG. 38) are carried out. At S195, the result of the POS conversion at S194 is tested for POS=A. If POS=A, the process jumps to S197 where braking and stopping of zoom motor 5 occurs; and thereafter the process is reset to S2 (FIG. 38). If POS $\neq$A, the process advances to S196 which tests whether zoom switch 102 has been changed from "ZOOM" to "TELE" based the switch scan at S193. If switch 102 has been changed to "TELE", the process is reset to S198; otherwise, the process advances to S197 where zoom motor 5 is caused to stop. Thereafter, the process is reset to S2 (FIG. 38).

WIDE SUBROUTINE OF FIRST EMBODIMENT

Figure 4:
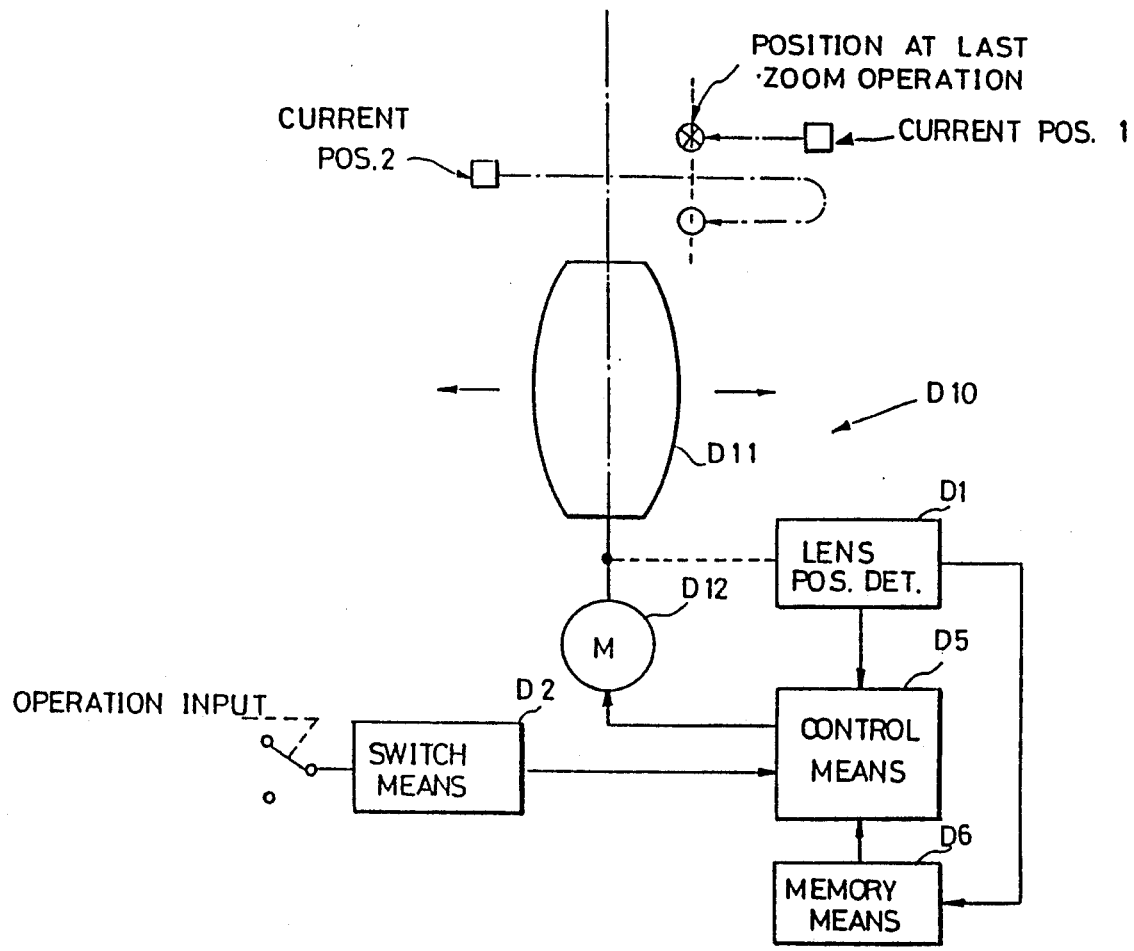
FIG. 4 is a schematic block diagram of a forth embodiment of the present invention.

The flow chart of FIG. 4 details the WIDE subroutine. At S210, the CPU of ZM/C 100 tests whether wide-angle teminus flag Fwide has been set to Fwide=1. The test is to determine if motor 5 has stopped at the wide-angle terminus. If Fwide=1, the process is immediately reset to S2 (FIG. 38); otherwise, the process advances to S211.

At S211, zoom motor 5 is commanded to rotate in the reverse direction, and the process advances to S212 which is a standby process that delays advance of the process to S213 for a predetermined period of time, t msec, for a reason described below. After the elapse of t msec, processes similar to those for S8 and S9 (FIG. 38) are effected at S213 and S214 before the process advances to S214 where the POS conversion at S214 is tested for POS=1. If POS=1, the process sequentially advances to S216 and then to S217; otherwise, the process advances to S223.

At S216 and S217, processes similar to the processes of S144 and S145 (FIG. 39), respectively, are executed before the process advances sequentially to S213 and S219, where processes similar to the processes of S9 and S9 (FIG. 38) are executed.

After the position conversion procedure of S219 is executed, the process advances to S220 which tests whether the POS conversion at S219 is POS=2. If POS=2, the process is reset to S218; otherwise a procedure is executed at S221 to set the wide-angle terminus flag Fwide to "1", followed by the execution of procedure S222 which brakes and thus stops rotation of zoom motor 5. The process is thereafter reset to S2 (FIG. 38).

If the test at S215 finds POS≠1, the process advances to S223 to check whether zoom switch 102 has been changed from WIDE as detected at S214. If switch 102 is still set to WIDE, motor 5, which is operating in reverse, drives the lens mount to POS=1. If switch 102 is not set to "WIDE", the process advances sequentially to S224, S225 and S226, where procedures similar to procedures carried out at S155 and S156 (FIG. 39), respectively, are effected. Thereafter, this process is reset to S2 (FIG. 38).

OPERATION OF FIRST EMBODIMENT.

Figure 41:
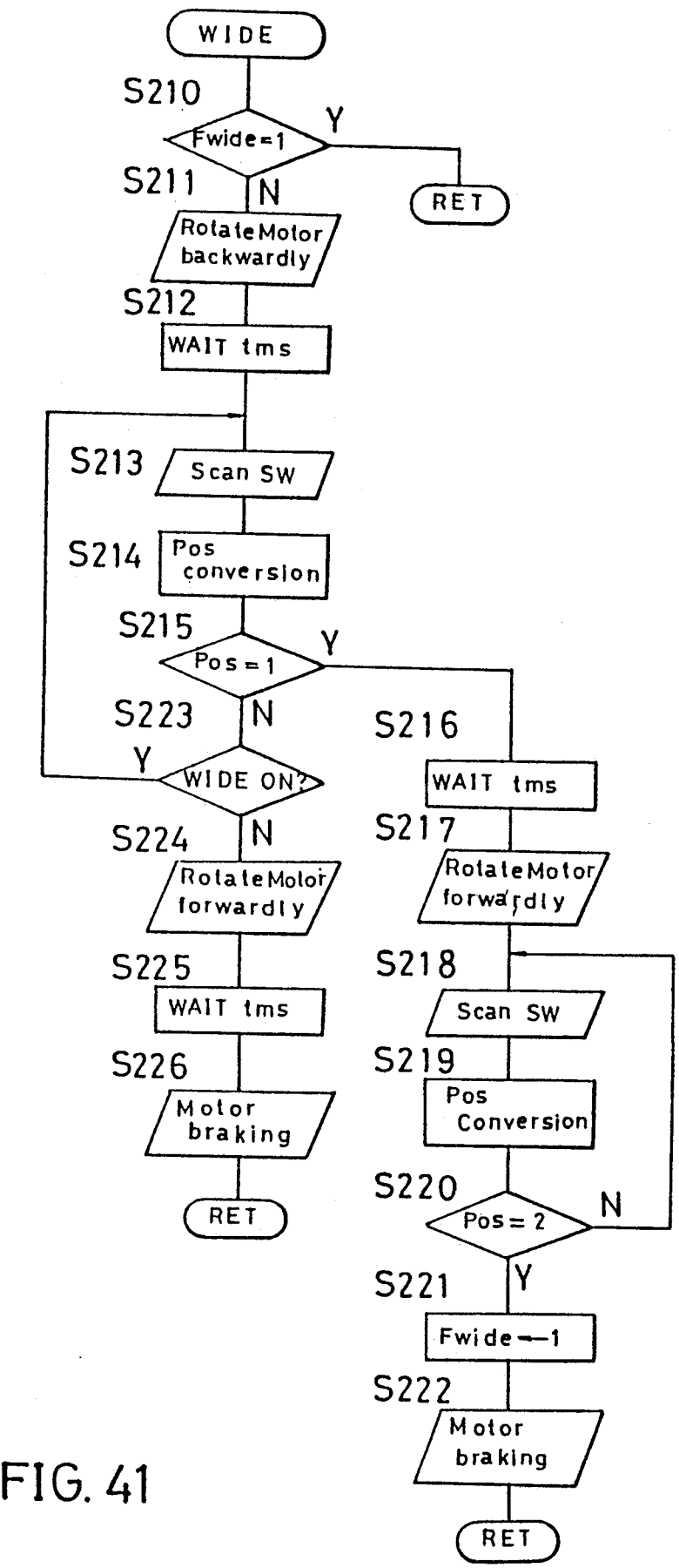

The effects of the processes at S1 to S22 in FIG. 38, and those in FIGS. 39 to 41 is explained below.

(1) Battery 106 is connected and none of the following switches are manipulated: takeup motor control switch 119, shutter release button 99 (and switch 123), and zoom switch 102.

a) If mode changeover switch 101 is set to LOCK position, the CPU of ZM/C 100 carries out the initialization process at S1 in FIG. 38 and thereafter repeats processes according to the first loop S2 to S4, S8 to S11 and S2 on the condition that the rotational position of cam ring 14 (that controls the motion of the front lens group L1 and rear lens group L2) is POS=0; and no camera operations take place. If, during the above processes, shutter release button 99 is pressed to close switch 123 and to close light-measuring switch 103, the processes for S2 and S3 are executed repeatedly until switch 103 opens; and the operation of the shutter release button 99 is disregarded.

If the rotational position of the cam ring 14 is POS≠0, the process at S12 in FIG. 38 effects reverse rotation of zoom motor 5 which continues during repetitive execution of processes S131 to S134, S1326 and S131 until cam ring 14 has moved to POS=0. At this point, the process is reset to S2 of the first loop.

b) If mode changeover switch 101 is changed from LOCK to ZOOM position, the CPU of ZM/C 100 executes the first loop and then advances the program to S17 causing zoom motor 5 to rotate forwardly, and the process sequentially advances through S130 to S133, and S142 (FIG. 39), and then S143, S146 and S147 on condition that mode changeover switch 101 is not changed from ZOOM to either LOCK, or to MACRO when procedures S148 and S149 are executed. Loop S150 and S146 to S149 is executed until POS=2; and when this condition is detected at S150, zooming motor 5 is braked to a stop at S152 through S151 before the process is reset to S2 (FIG. 38). In other words, the rotational stop position of cam ring 14 is the wide-angle terminus (POS=2) where the focal length shown in FIG. 30 is $f_0$.

After the process is reset to S2, the CPU of ZM/C 100 repeats processes according to second loop S4, S8 to S10, S14, S15, S18, and S4 on condition that no further switch manipulations are made.

c) If switch 101 is changed from ZOOM to MACRO position when cam ring 14 has stopped at the wide-angle terminus (i.e., POS=2), the CPU of ZM/C 100 causes the program to exit the second loop at S10, and to advance to S16. Because POS=2 at that time, the process at S17 causes zoom motor 5 to rotate in the forward direction, and the sequential processes of S131 to S133, S138, S140 and S131 (FIG. 39) are repetitively executed until POS=C is detected, at which time procedure S139 brakes motor 5 to a stop. When POS=C, the process is reset to S2 (FIG. 38), and the processes according to a third loop of S4, S8 to S10, S16, S22 and S4 repeat on condition that no further camera manipulations are made.

d) If mode changeover switch 101 is changed from MACRO to ZOOM position, the CPU of ZM./C 100 causes the program to exit third loop at S10, and to sequentially advance through S14, S15 and S12, because POS=C at that time. The execution of procedure S12 causes motor 5 to rotate in reverse; and thereafter, the procedures of S131-S133, S142, S157, S159 and S160 are sequentially executed. On condition that mode changeover switch 101 remains in ZOOM position, the process drives cam 14 to POS=9 by executing loop S163, S164,.and S159 to S163. When POS=9 is detected at S164, a t msec delay occurs at S165 and at S166, after which the rotation of zoom motor 5 is changed from reverse direction to forward direction. The purpose for procedures S165 and S166 ar ⒭described below.

Changing switch 101 from MACRO to ZOOM position, causes cam ring 14 to stop at POS=A from the POS=9 side. If zoom motor 5 were to stop at POS=A by having its rotation change from reverse direction to forward direction immediately after reading POS=9 from POS=A, there is the possibility that backlash due to the gearing of the drive and transmission system associated with zoom motor 5 will prevent proper positioning of cam 14. By having zoom motor 5 continue to rotate in the reverse direction for t msec after detection of POS=9, and by thereafter rotating motor 5 in the forward direction, motor 5 can be stopped precisely at POS=A under the condition that backlash on the forward-rotation side is removed. Procedures 165 and 166 achieve this result. After the motor is commanded to run in the forward direction by executing the procedure at S166, the program will drive cam 14 to POS=A by executing loop S159 to S163, S167 and S159. When POS=A is detected at S167, the process advances to S168 where the motor is braked and stopped. Thereafter, the process is reset to S2 (FIG. 38).

After the process is reset to S2, cam ring 14 will be its telephoto terminus (POS=A) where the focal length shown in FIG. 30 is f7'. The cam ring will remain in this position, which is the same as described in Item (b) above, on condition that no switch manipulations are made, after the process is reset to S2 because the second loop is repeatedly executed.

Switch 101 may be changed from MACRO to ZOOM position during the loop process S131-S133, S138, S140, S141, S131 while cam ring 14 is at a position corresponding to POS=A and the motor is running in the forward direction. In such case, branching to S157 occurs as S142. In branch S157, the process at S158 causes zoom motor 5 to reverse its direction of rotation and begin to run in the reverse direction.

(e) If mode changeover switch 101 is changed from ZOOM to MACRO position when cam ring 14 is stopped at its telephoto terminus (POS=A), the process that follows will be similar to that described in item (c) above with the exception that the starting point is POS=A instead of POS =2.

(f) The tests performed at S148, S149, S161 and S162 (FIG. 39) mentioned in the descriptions in items (b) to (d) above, determine whether mode changeover switch 101 has been changed from ZOOM to LOCK, or to MACRO position. If the change is to LOCK position, the branch beginning at S134 is entered and the procedures S136, S137 are executed until cam ring 14 stops at POS=0; thereafter, reset to S2 occurs. If the change is to MACRO position, the branch beginning at S138 is entered and the procedures S140, S141 are executed until cam ring 14 stops at POS=C; thereafter, reset to S2 occurs.

(g) If mode changeover switch 101 is changed to the ZOOM position while cam ring 14 is at a position corresponding to $2 \leq POS \leq 9$ during either the loop processes of S131 to S133, S1389, S140, S141 and S131 (FIG. 39), or the loop processes of S131 to S137 and S131 (FIG. 39), the CPU of ZM/C100 branches in the program occurs at S133, and the process advances to S142 and then to S153.

If zoom motor 5 is rotating in the forward direction, the process jumps from S153 to S156 where zoom motor 5 is immediately braked to a stop, and the process thereafter returns to S2. On the other hand, if zoom motor 5 is rotating in the reverse direction, the process advances to S154, where a delay of t msec occurs to remove backlash on the forward-rotation side, before the process advances to S156 where the motor is braked to a stop. The rotational position of the cam ring 14, when it stops, will be a position where the focal length shown in FIG. 30 lies in the range $f_0$ to $f_7$. While cam ring 14 is in a corresponding position corresponding to $2 \leq POS \leq 9$, mode changeover switch 101 assumes the ZOOM position according to the operational specifications of zoom switch 102 as will be described below.

h) If mode changeover switch 101 is changed from LOCK to ZOOM position when cam ring 14 is located at POS=1 while executing procedure S131–S136 (FIG. 39), zoom driving motor 5 will be operating in the reverse direction driving cam 14 away from POS=2 which is the desired end point of cam 14 for ZOOM mode of operation. The changed switch position will be sensed at S133 advancing the process to S142 which will advance the process to the branch beginning at S142 (FIG. 39). After a delay of t msec, during which the motor continues to rotate in the reverse direction; motor 5 will begin to operate in the forward direction by sequential execution of the procedures at S144 and S145. The loop S146–S150 will be executed until POS=2 is detected at S150. Thus, the wide angle terminus position of cam 14 (POS =2) is reached when motor 5 is running in the forward direction. If motor 5 were permitted to stop at POS=2 by reversing its reverse rotation to forward direction immediately after cam ring 14 reached POS=1 from POS=2, there would be a possibility that zoom motor 5 would stop in the condition that the backlash of the toothed wheels, etc. of the drive and transmission system of the zoom motor 5 would still be present. By causing zoom motor 5 to rotate in the reverse direction for an additional period of t msec, and by causing zoom motor 5 to rotate in the forward direction thereafter, zoom motor 5 can be stopped at POS=2 under the condition that the backlash on the forward-rotation side is removed.

(2) If motor control switch 119 is changed while the CPU of ZM/C100 is executing a loop process of the type described above, the following occurs:

When the CPU of MC/U109 turns on the zoom motor disable signal DIS, the CPU will advance the process from S4 to S5 in FIG. 38. At S5, by turning on power hold signal PH, MC/U 109 is enabled to rotate takeup motor 111 whose rotation starts. After MC/U 109 terminates control of takeup motor 111, and turns off zoom motor disable signal DIS, the CPU of ZM/C100 advances the process from S6 to S7, turns off power hold signal PH and resets the process to S2.

Branching from the above described first or second loop processes to S4, and then to S7, prevents operation of zooming motor 5 while takeup motor 111 is operating; and manipulations of light-measuring switch 103 and shutter release switch 123 are disregarded at the same time.

(3) If zooming switch 102 is changed to the TELE side while the CPU of ZM/C100 is executing a process according to the above described second loop, the following occurs:

The CPU of ZM/C100 advances the process from S18 to S19 in FIG. 38, and calls and executed the TELE subroutine shown in FIG. 40. After wide-angle extremity flag Fwide is reset to "0" at S190, the process advances to S191. If cam ring 14 is already stationary at the telephoto terminus position (POS=A), zoom motor 5 need not be rotated, and the process is therefore immediately reset to S2 in FIG. 38. If cam ring 14 is located at any position other than the telephoto terminus, (e.g., at 223 $POS \leq 9$ when the TELE subroutine is called), the procedure at S192 causes zoom motor 5 to rotate in the forward direction. Thereafter, on condition that zoom switch 102 is not returned to neutral position from the TELE side, loop S193 to S196 and S193 is repeatedly executing until cam ring 14 reaches POS=A. When this occurs, procedure S197 stops further movement of zoom motor 5, and the process is thereafter reset to S2 (FIG. 38).

As above, in the case where zooming switch 102 is manipulated to the TELE side, cam ring 14 stops at the telephoto extremity if switch 102 is not further changed. However, if zoom switch 102 is returned to its neutral position during movement of cam ring 14 toward the telephoto terminus, the process proceeds from S196 to S197, and zoom motor 5 is stopped immediately. In other words, by properly timing the change in zoom switch 102 from TELE side to neutral position, cam ring 14 can be stopped at any desired position (i.e., at any desired focal length of the lens system) corresponding to $2 \leq POS \leq 9$.

(4) If zoom switch 102 is changed to the WIDE side while the CPU of ZM/C100 is executing a process in the above described second loop, the following occurs:

The CPU of ZM/C100 advances the process from S20 to S21 (FIG. 38), and calls and executed the WIDE subroutine shown in FIG. 41. At first, the state of wide-angle extremity flag Fwide is tested at S210; and if Fwide=1, cam ring 14 remains at the wide-angle extremity (POS=2), and no rotation of zooming motor 5 occurs because the process is immediately reset to S2

(FIG. 38). If Fwide=0, S211 causes motor 5 to rotate in reverse.

At S212, a delay of t msec is effected. During this delay, motor 4 continues to run in reverse to take into account the possibility that switch 102 will be returned to its neutral position immediately after it is changed to the WIDE side. In such case, the amount of reverse-rotational operation of zoom motor 5 becomes undefined, and there is the possibility that the amount of reverse rotation that takes place will be too great to be overcome by the backlash-removing operation due to S224 and S225.

After the process at S212 is executed, loop S213-S215, S223-S131 is repeatedly executed until cam ring 15 arrives at POS=1, on condition that zoom switch 102 is not returned from WIDE to neutral position. When POS=1, processes similar to the aforementioned processes for S165 and S166 are accomplished at S216 and S217, and the loop of S218 to S220 and S218 is processed to remove backlash as cam 14 is driven to POS=2.

When cam ring 14 comes to the wide-angle terminus (POS =2), the process advances to S221 where flag Fwide is set to "1", and then to S222 where rotation of zoom motor 5 is stopped. Thereafter, the process is reset to S2 (FIG. 38).

As above, if zoom switch 102 is changed to the WIDE position, cam ring 14 stops at the wide-angle terminus POS=2 if the WIDE position setting is maintained. Of course, if zoom switch 102 is opened and returns to its neutral position during movement of cam ring 14 towards the wide-angle terminus, a backlash-removing process similar to the aforementioned process at S154 and S155 in FIG. 39 is effected at S223 to S224 and S225; and zoom motor is subsequently stopped at S226. In other words, by returning zoom switch 102 from its ZOOM position to its neutral position at the appropriate time, cam ring 14 will stop at any desired position (desired focal length) in the range $2 \leq POS \leq 9$.

Turning now to the processes after S22 in FIG. 38, while the CPU of ZM/C 100 is executing a process in the above described second loop, actuation of shutter release button turns on light-emitting switch 103 (on condition that takeup motor control switch 119 does not turn on), and the CpU of ZM/C 100 advances the process from S22 to S23.

At S23, power hold signal PH is turned on to actuate MC/U 109. Next at S24, the presence of zooming motor disable signal DIS from MC/U 109 is tested to confirm actuation of MC/U 109. If the actuation is confirmed, a serial-transfer of the result of the POS conversion at S9 is made to MC/U 109 at S25. The result of the POS conversion (zoom code data) is set in an output register; and the data thus set is converted into the serial signal SO synchronously with clock CLK supplied from MC/U 109 for serial-transfer to MC/U 109. The process waits for the above-mentioned transfer process to terminate at S26, and proceeds to S27 upon termination.

At S27 the transfer of serial signal SI containing switch check/operation termination data from MC/U 109 is completed; and at S28, the input data is checked. The process advances to S29 if the input data is the operation termination data (power hold turning-off request data) END showing that the operation of MC/U 109 has terminated; to S31 if the input data is light-measuring switch check data SWSCHK; or to S34 if the input data is mode changeover switch LOCK check data LOCKCHK.

When the process advances to S29, power hold signal PH is turned off because the operation of MC/U 109 will have terminated, and the process advances to S30 where zoom motor disable signal DIS from MC/U 109 is turned off. The process is thereafter reset to S2.

When the process advances to S31, power hold signal PH is temporarily turned off in order to inform MC/U 109 that switch 103 is turned on, and the process advances to S32, where input of data on each switch is carried out by a process similar to the process at S2. At S33, a test is made to determine if light-measuring switch 103 is turned based on the data read at S32. If light-measuring switch 103 is not turned on, the process waits at S30 for zoom motor disable signal DIS to turn off; thereafter, the process is reset to S2. This signifies that power hold signal PH was turned off at S31 in case light-measuring switch 103 is off.

If light-measuring switch 103 is turned on, the process advances to S36 which tests whether mode changeover switch 101 is positioned at the LOCK position based on the data at S32. If mode changeover switch 101 is found to have changed to the LOCK position, the process is reset to S2 through S3 because it is unnecessary to determine if light-measuring switch 103 is turned on. However, if mode changeover switch 101 is found not to have been changed, power hold signal PH is again turned on at S37, and the process is reset to S27. In other words, when MC/U 109 tests whether light-measuring switch 103 is turned on, the CPU of ZM/C 100 informs MC/U 109 of that fact by turning on and off the power hold signal PH if switch 103 is turned on.

Finally, at S34 to S37 and S30, MC/ 109 is informed whether mode changeover switch 101 is changed to the LOCK position.

The zoom code data (the result of POS conversion), and light-measuring switch 103 turned-on data to be transferred from ZM/C 100 to MC/U 109 at S23 to S37 is utilized by MC/U 109 as described below. The zoom code data represents the F stop value of the lens which varies according to the variable power position. These data are supplied to a circuit (not shown) for controlling the shutter speed of shutter block 23.

POS=C represents the position of the lens at its MACRO position. An indication of POS=C is applied to indicator 115 in the viewfinder in case the distance measurement data developed by distance-measuring device 120 is not within the MACRO range to provide a visual indication to the photographer, and to disable actuation of shutter release switch 123. Finally, data indicating that light-measuring switch 103 is turned-on is available to initiate operation of light-measuring device 121.

In the above-described first embodiment, regulator 105 is unconditionally actuated at the point when battery 106 is mounted in the battery case; however, it is alternatively possible, for example, to insert a manually operable switch into the power supply line from battery 106 to regulator 105 for effecting manual starting of the actuation of ZM/C 100 by the photographer.

SECOND EMBODIMENT OF ZOOM LENS DRIVE

Figure 2:
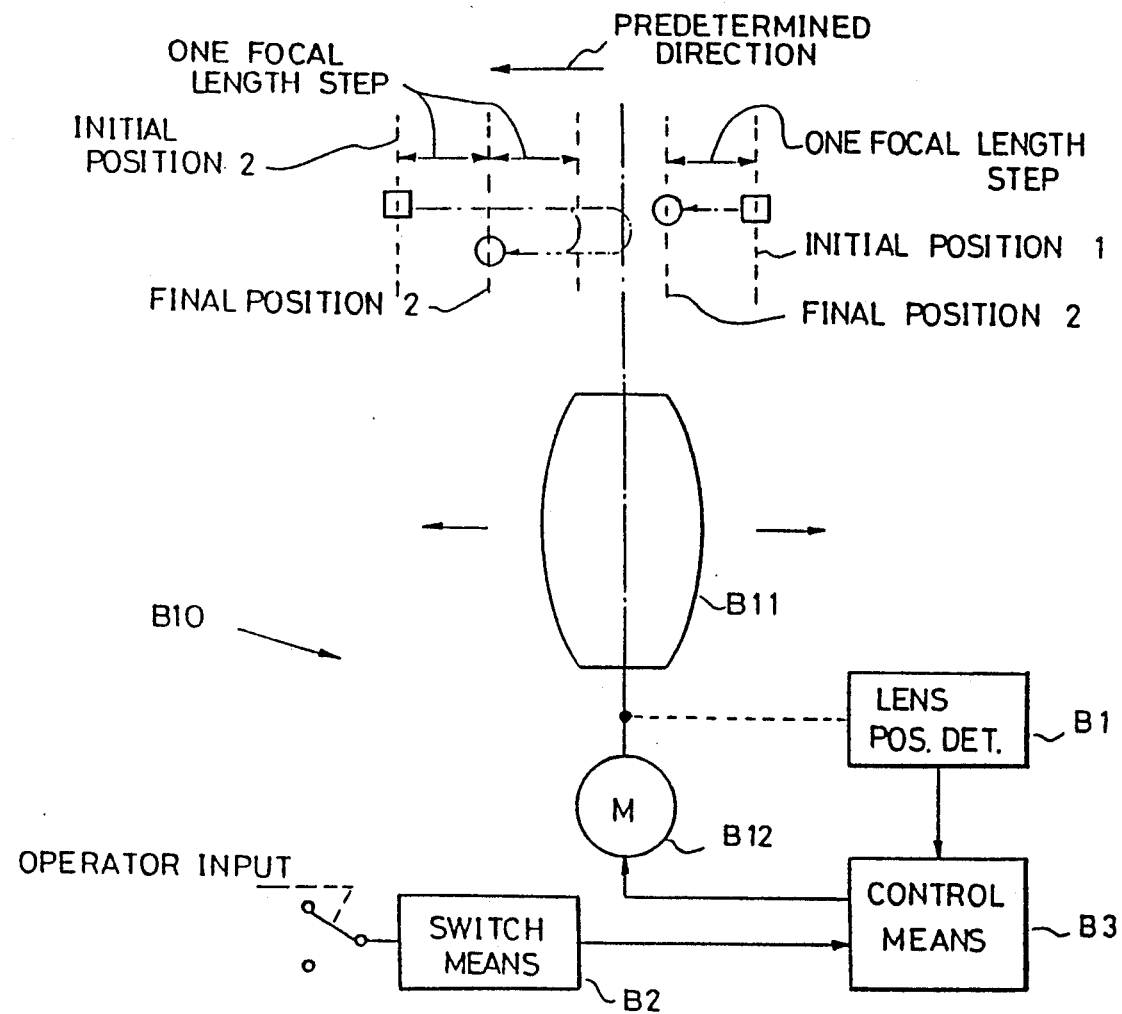
FIG. 2 is a schematic block diagram of a second embodiment of the present invention.

Referring now to FIG. 2, reference numeral B10 designates, in schematic form, a second embodiment of the present invention which includes zoom lens B11 for a camera having a between-the-lens shutter including motor B12 for moving the lens (through a mechanical coupling, not shown) in forward rearward directions as indicated by the arrows in FIG. 2 along an optical axis. Switch means B2 has two operator input settings to control operation of motor B12 for moving lens B11 from an initial to a final, stationary position establishing the focal length of the lens. Embodiment B10 also includes position detection means B1 for detecting the position of the lens, and control means B3 response to operation of switch means B2 to either of its two positions for operating the motor such that:

(1) lens B11 moves a predetermined number of discrete focal-length steps from its initial position to its final position; and (2) movement of the lens to its final position always occurs while the lens is travelling in a predetermined direction.

In the second embodiment of the invention, the manner of driving the lens is different from the manner of driving the lens in the first; but only a change in program is required. Before describing this embodiment in detail, the manner of driving the lens is first described.

1) When mode changeover switch 101 is set to LOCK position and cam ring 14 is located at any position other than POS=0, zoom motor 5 rotates in the reverse direction driving cam ring 14 in the rearward direction until POS=0 (see FIGS. 29 and 43) is detected, and then stops.

2) When mode changeover switch 101 is set to MACRO position and cam ring 14 is located at any position other than POS="C", zoom motor 5 rotates in the forward direction driving cam ring 14 forwardly until POS="C" (see FIGS. 29 and 43) and then stops.

3) When mode changeover switch 101 is set to ZOOM position, and cam ring 14 is located at any position other than POS="2" (i.e., at any of focal-length steps of to f7'):

a) each time zoom switch 102 is changed to TELE position, zoom motor 5 rotates in the forward direction and stops after cam ring 14 has experienced a change of one focal-length step; and b) each time zoom switch 102 is changed to WIDE position, ZOOM motor 5 rotates in the reverse direction until cam ring 14 experiences a change in two focal-length steps, then reverses after passage of a predetermined period of time, and rotates in the forward direction until the cam ring experiences a change of one focal-length step, with the result that a decrease of one focal-length step occurs relative to the step at which switch 102 was changed to WIDE position. The reason for so driving the cam ring is that the mechanical backlash at lens barrel block 1 and finder block 2 is eliminated for no difference between the stop positions of zoom motor 5 when the latter stops either after rotating in the WIDE direction, or stops after rotating in the TELE direction, respectively.

The entire control system, including the above-described control, of the camera is described below in reference to FIGS. 44 to 46. The main flow chart of the second embodiment is identical with that shown in FIG. 38, and the explanation thereof is the same as in the first embodiment.

The flow chart of the mode subroutine (FIG. 44) for the second embodiment is different from the flow chart of the mode subroutine of the first embodiment. In the mode subroutine of FIG. 44, the CPU of ZM/C 100 resets wide-angle terminus flag (the wide-angle terminus being POS=2, or $f_0$ in FIGS. 29 and 43) Fwide to "0" at S130A (this flag resetting is optional in the second embodiment). At S131A and S132A, procedures similar to those at S8 and S9 in FIG. 38 are executed. At S133A, mode changeover switch 101 is tested for "LOCK", "ZOOM" or "MACRO" based on the switch scan at S132A. The process advances to S143A if switch 101 is set to "LOCK" position, to S138A if switch 101 is set to "MACRO" position, and to S142A if switch 101 is set to "ZOOM" position.

If switch 101 is set to "LOCK" position, S134A tests whether the conversion at S132A has resulted in POS=0. If so, zoom motor 5 is braked to a stop at S135A (refer to the rotational control command RCM in Table 3) because the motor is rotating in the reverse direction; and the process is thereafter reset to S2 (FIG. 38). On the other hand, if POS ≠0, S136A tests whether zoom motor 5 is rotating in the reverse direction. If it is, the process is immediately reset to S131A; otherwise, the process is reset to S131A after the process at S137A causes motor 5 to rotate in the reverse direction.

If switch 101 is set to "MACRO" position, S138A tests whether the conversion at S132A has resulted in POS=C. If so, zoom motor 5 is braked at S139A. because the motor is rotating in the forward direction; and thereafter, the process is reset to S2 (FIG. 38). If POS≠C, S140A tests whether motor 5 is rotating in the forward direction. If it is, the process is immediately reset to S131A; otherwise, the process is reset to S131A after the process at S141A causes motor 5 to rotate in the forward direction.

If switch 101 is set to "ZOOM" position, S142A tests whether the POS conversion at S132A is POS≧A, or POS≦1, or 2≦POS≧9. The process advances to S143A if POS≦1,to S153A if 2≦POS≧0, or to S165A if POS≧A. If POS≧1, S143A tests whether zoom motor 5 is rotating in the forward direction. If it is, the process jumps to S146A; otherwise the procedure at S144A is executed.

At S144A, a standby process is executed whereby further advance of the process is delayed for a predetermined period of time, t msec for the reason described below. After the elapse of t msec, S145A changes the direction of zoom motor 5 from reverse direction to forward direction.

Next, at S146A and S147A, processes similar to those for S8 and S9 in FIG. 38 are conducted; and thereafter, at S148A and S149A, tests are made to determine if switch 101 has been changed from "ZOOM" to either "LOCK" or "MACRO" based on the switch scan at S146A. If the position has been changed to "LOCK", the process is reset to S134A; but if the position has been changed to "MACRO", the process is reset to S138A. If the position remains "ZOOM", the process advances to S150A.

S150A tests whether the POS conversion at S147A has resulted in POS=2. If so, the process advances to S151A; otherwise the process jumps to S146A. Recalling that at POS =2, the lens system is located at its wide-angle terminus, flag Fwide is set to "1" at S151A (this flag setting is only optional in this embodiment), and the process advances to S152A where zoom motor 5 is braked to a stop; thereafter, the process is reset to S2 (FIG. 38).

If the POS conversion at A132A is such that 2≦POS≦9, the process advances from S142A to S153A which tests whether motor 5 is rotating in the forward direction. If so, the process jumps to S160A where the result of the POS conversion at S132A is stored in register MPOS. Thereafter, at S161A and S162A, processes similar to those at S8 and S9 in FIG. 38 are effected.

The motor is now running in the forward direction driving cam ring 14 in the direction of f7'. At S162A, a POS conversion is done; and at S163A, POS=Mpos+1 is evaluated. If true, POS has changed by one focal-length step in the TELE direction; and S164A brakes zoom motor 5 to a stop; and thereafter, the process is reset to S2. If POS =Mpos+1 evaluates to false, the process repeatedly executes S161A, S162A until POS=Mpos+1 evaluates to true.

If the test at S153A shows that zoom motor 5 is rotating in the reverse direction, the process advances to S154A where the result of the POS conversion at S132A is stored in register Mpos. After scanning the switches at S155A, and making a POS conversion at S156A, the process advances to S157A where POS=-Mpos−1 is evaluated. If true, POS has changed by one step in the "WIDE" direction, and the process thereafter advances to S158A. If POS=Mpos −1 evaluates to false, the process repeatedly executes S155A, S156A until Mpos−1 evaluates to true; thereafter, the process advances to S160A.

At S158A and S159A, processes similar to the above-described processes at S144A and S145A are carried out. Thereafter, the processes at S160A to 164A are effected, and the process is thereafter reset to S2 (FIG. 38).

If the POS conversion at S142A is such that POS≧A, the process advances to S165A which tests whether motor 5 is rotating in the reverse direction. If it is, the process jumps to S167A; otherwise, the process advances to S166A which reverses motor 5 before the process advances to S168A.

At S167A and S168A, processes similar to those for S8 and S9 in FIG. 38 are executed; and at S169A and S170A, processes similar to the processes for S148A and S149A are executed.

If mode changeover switch 101 remains in "ZOOM" position (as ascertained at S167A), S171A tests whether zoom motor 5 is rotating in the reverse direction. If so, the process advances to S172A; and, if not, to S172A. At S172A, the POS conversion at S168A is tested for POS=9. If POS=9, the process is reset to S167A; otherwise, the process is reset to S167A after executing the procedures at S173A and S174A which are similar to the procedures at S144A and S145A described above. S175A tests whether the POS conversion at S168A has resulted in POS=A, namely, whether the telephoto terminus (f7' in FIG. 43) has been reached. If POS=A, the process is reset to S167A; otherwise, the process is reset to S2 (FIG. 38) after executing the procedure at S176A at which motor 5 is braked to a stop.

TELE SUBROUTINE OF SECOND EMBODIMENT

Referring now to the flow chart of the TELE subroutine in FIG. 45, at S190A the CPU of ZM/C 100 checks whether the POS conversion at S9 in FIG. 38 has resulted in POS=A.

If POS≠A, namely 2≦POS≦9, the process advances to S191A where the result of the POS conversion at S9 (FIG. 38) is stored in register Mpos; thereafter, at S192A, motor 5 is caused to rotate in the forward direction.

Subsequently, at S193A and S194A processes similar to those at S8 and S9 in FIG. 38 are effected. Afterwards, S195A tests whether the POS conversion at S194A has resulted in POS=Mpos+1 to determine if the position of cam ring 14 has changed by one focal-length step in the TELE direction. If POS=Mpos+1 evaluates to true, motor 5 is braked at S196A and stops; and the process thereafter advances to S197A. If POS≠Mpos+1, the processes at S193A to S195A are repeated until POS=Mpos+1, i.e., until the position of cam ring 14 has increased by one focal-length step; thereafter, the process advances to S197A where the procedures described below are executed. If POS=A, the process jumps to S197A which scans the switches, and then advances to S198A which checks whether zooming switch 102 is still positioned at the TELE side. If so, the processes at S197A and S198A are repeatedly executed because the lens is properly positioned at the telephoto terminus. However, if switch 102 is not positioned at the TELE side, the process returns to S2 (FIG. 38).

WIDE SUBROUTINE OF SECOND EMBODIMENT

Figure 46:
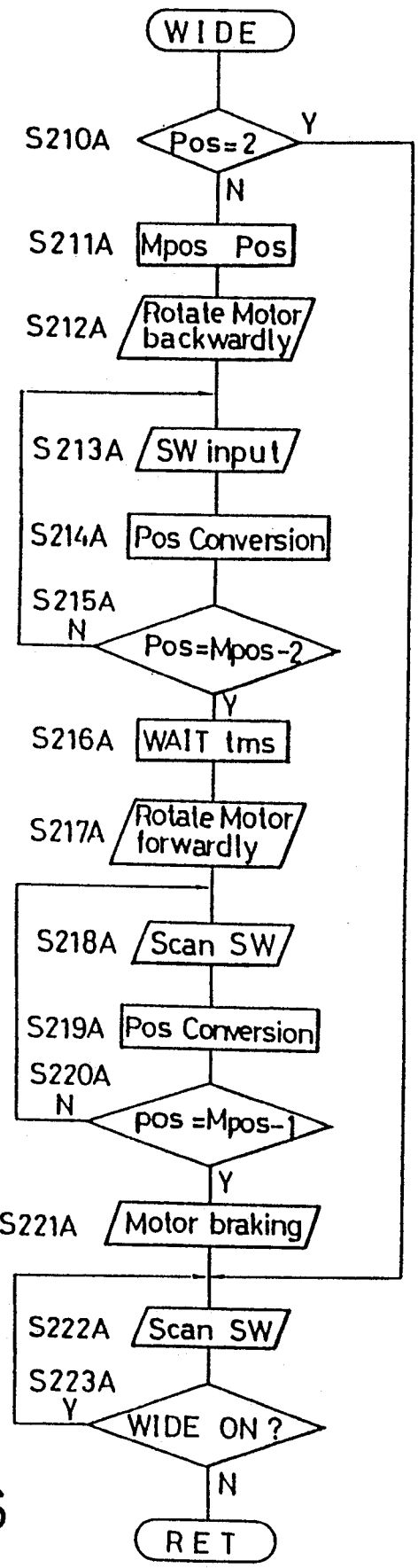

Referring now to the flow chart of the WIDE subroutine in FIG. 46, at S210A, the CPU of ZM/C 100 first tests whether the POS conversion at S9 in FIG. 38 has resulted in POS=2, which indicates that zoom motor 5 has positioned cam ring 14 at the wide-angle terminus. If POS=2, the process jumps to S222A where a scan of the switches is carried out before advancing to S223A, which tests whether zoom switch 102 is still set at the WIDE position. If so, the processes at S222A and 223A are repeatedly executed awaiting a change. If switch 102 is not set to the WIDE position, the process is reset to S2 in FIG. 38.

If the result of the POS conversion at S9 in FIG. 38 is POS≠2, the process advances to S211A where the result of POS conversion at S9 in FIG. 38 is stored in register Mpos. At S212A, zoom motor 5 is commanded to rotate in the reverse direction driving the cam ring towards the WIDE angle terminus.

At 213A and S214A, processes similar to those at S8 and S9 in FIG. 38 are executed; and subsequently, at S215A, POS =Mpos−2 is evaluated using the result of the POS conversion at S214A. If POS=Mpos−2, which means that the cam ring has moved two steps from its original position in the direction of the WIDE terminus, the process advances to S216A; otherwise, the processes at S213A to 215A are repeatedly executed until POS=Mpos−2.

Figures 44, 44A, 44B, 44C:
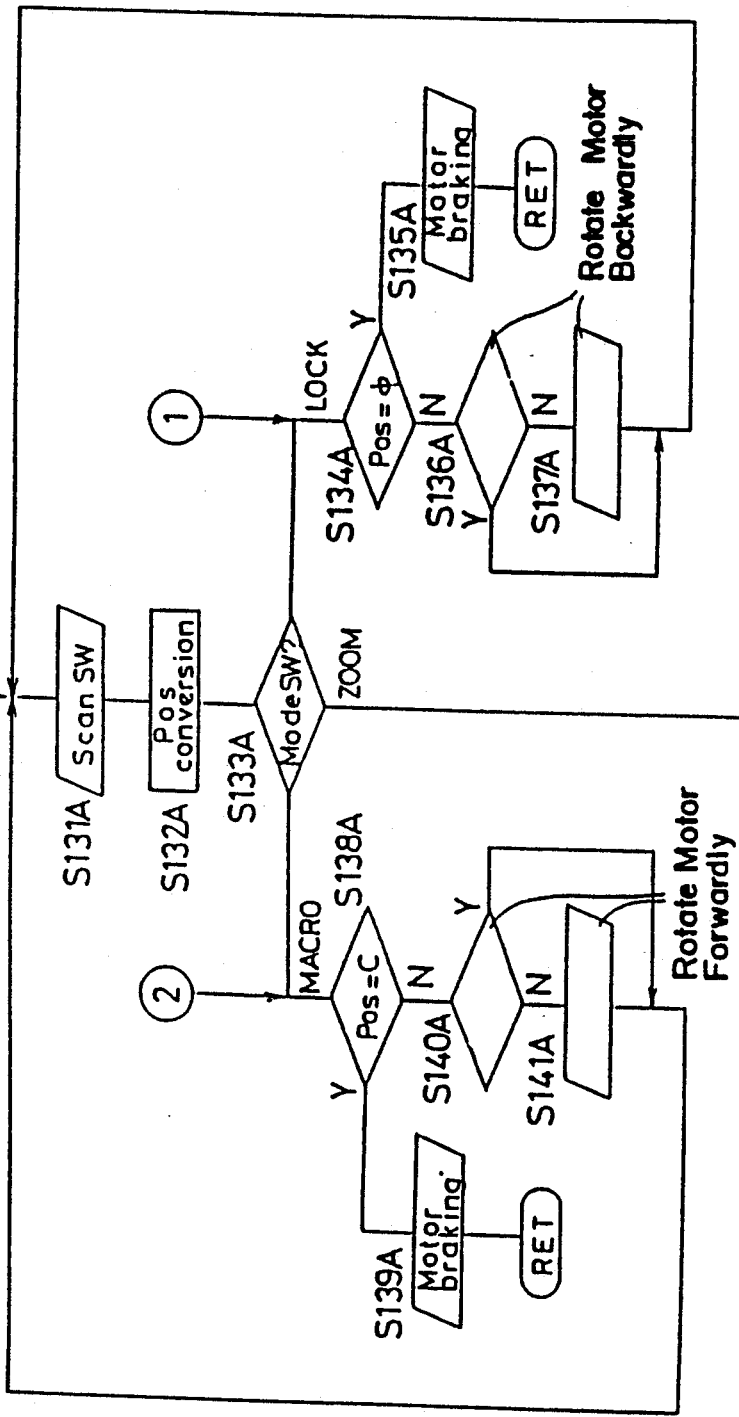
FIG. 44 is a diagram showing the relationship between FIGS. 44A, 44B and 44C.
FIGS. 44A, 44B, 44C, 45 and 46 are flow charts of a second embodiment of the present invention.
Figure 44B:
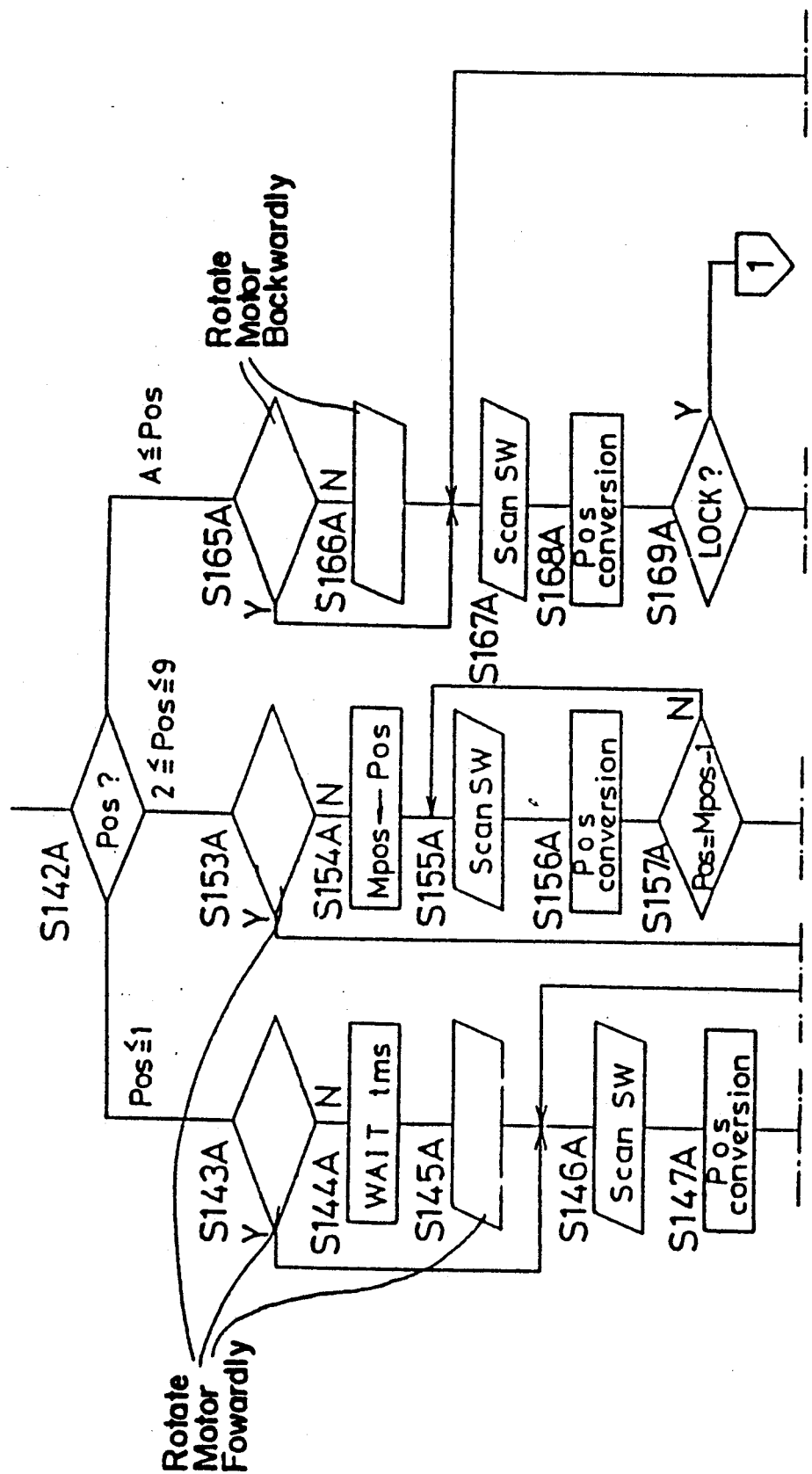
Figure 44C:
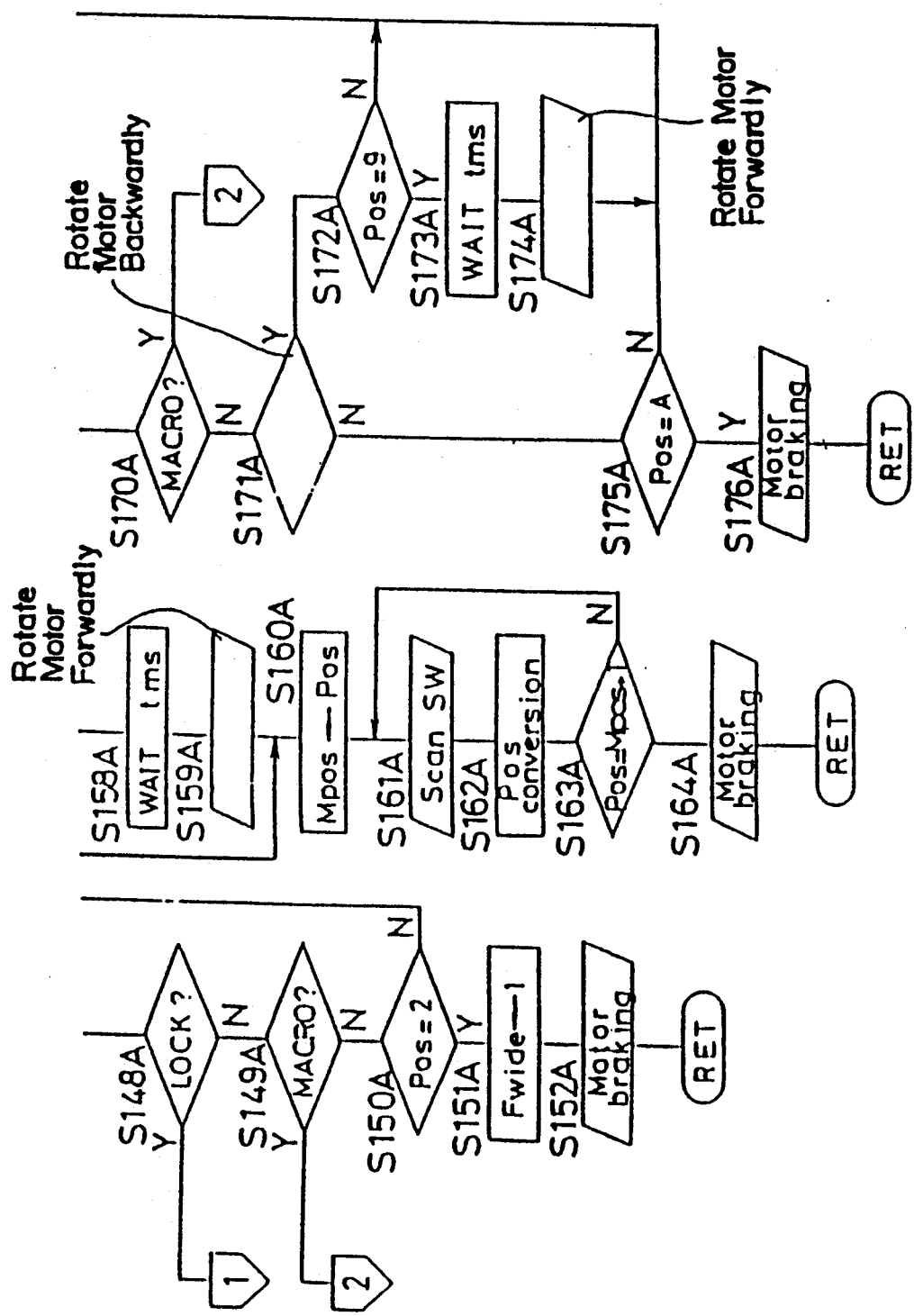

At S216A and S217A, processes similar to processes at S144A and S145A in FIG. 44 are effected, and subsequently at S218A and S219A, processes similar to the processes at S8 and S9 in FIG. 38 are effected before the process advances to S22A.

At S217A, the cam ring has been moved from its initial position two focal-length steps closer to the WIDE angle terminus and the motor begins to run in the forward direction driving the cam ring away from the WIDE angle terminus. At S220A, the POS conversion at S216A is tested for POS=Mpos−1 to determine if the cam ring has advanced away from its initial position by one step. If POS≠Mpos−1, the processes at S218A to S220A are repeatedly executed until POS=-Mpos−1. If POS=Mpos−1, the process advances to S221A where motor 5 is braked to a stop; otherwise, S218A, S219A are repeatedly executed until POS=-Mpos−1 evaluates to true.

OPERATION OF SECOND EMBODIMENT

The effects of the processes at S1 to S22 in FIG. 38, and those in FIGS. 44 to 46 are explained below. Explanations of operations that are identical with their counterparts in the first embodiment are omitted.

(1) Battery 106 is mounted in the battery case (not shown), and none of the following switches are manipulated: takeup motor control switch 119, shutter release button 99, and zoom switch 102.

a) If mode changeover switch 101 is set to the LOCK position, the processes carried out are the same as described in paragraph (1)(a) in the description of the first embodiment.

b) If the setting of mode changeover switch 101 is changed from LOCK to ZOOM position, the processes carried out are the same as described in paragraph (1)(b) in the description of the first embodiment.

c) If the setting of mode changeover switch 101 is changed from ZOOM to MACRO position when cam ring 14 has stopped at the wide-angle terminus, the processes carried out are the same as described in paragraph (1)(c) in the description of the first embodiment.

d) If the setting of mode changeover switch 101 is changed from MACRO to ZOOM position, the processes carried out are the same as described in paragraph (1)(d) in the description of the first embodiment.

e) If the setting of mode changeover switch 101 is changed from ZOOM to MACRO position when cam ring 14 has stopped at the telephoto terminus (POS=A), the processes carried out are the same as in paragraph c) above with the exception that the starting point is POS=A instead of POS=2.

f) When the tests at S148A, S149A, S169A and S170A in FIG. 44, described in paragraphs b) to d) above, determine that the setting of mode changeover switch has been changed from ZOOM position to either LOCK, or MACRO positions, the respective loop process of S136A, S137A, or S131A to S134A are executed. At S135A, which is reached because of a mode change to LOCK position, cam ring 14 is driven until it reaches and stops at POS=$\phi$. At S139A, which is reached because of a mode change to MACRO position, cam ring 14 is driven until it reaches and stops at POS=C.

g) If the setting of mode changeover switch 101 is changed to the ZOOM position while cam ring 14 is located at a position in the range $2 \leq POS \leq 9$ during the loop process of S131A to S133A, S138A, S140A, S141A to S131A, or during the loop process of S131A to S137A to S131A in FIG. 44, the CPU of ZM/C 100 branches the process from the above-mentioned loops at S133A, and advances it to S142A.

Because $2 \leq POS \leq 9$ in this case, the process advances to S153A. If zoom motor 5 is rotating in the forward direction, the process jumps from S153A to S160A allowing execution of S160A to S164A whereby zoom motor 5 advances to the location where POS is changed by +1 in the direction of the telephoto terminus. On the other hand, if zoom motor 5 is rotating in the reverse direction, the process advances from S153A to S164A as POS temporarily changes by −1 in the direction of the WIDE angle terminus. However, motor 5 continues to rotate in the reverse direction for t msec. Thereafter, rotation of zoom motor 5 reverses and begins to rotate in the forward direction eventually stopping when POS has changed by +1 to the TELE side. In other words, when the initial position of the lens is in the zooming range, $2 \leq POS \leq 9$, the position of cam ring 14 changes by one step, either forwardly or rearwardly, depending on the setting mode switch 101.

While the cam ring is located in a position corresponding to $2 \leq POS \leq 9$, independently of the case described above, mode changeover switch 101 assumes the ZOOM position according to the operational specifications of the zoom switch 102 which is described below.

h) If the setting of mode changeover switch 101 is changed from LOCK to ZOOM position while cam ring 14 is located at a position corresponding to POS=1 in the loop process of S131A to S136A to S131A in FIG. 44, the processes carried out are the same as described in paragraph (1)h) in the description of the first embodiment.

(2) If takeup motor control switch 119 is manipulated while the CPU of ZM/C 100 is executing a loop process due to the above-described first loop, second loop, etc. the processes carried out are the same as described in paragraph (2) in the description of the first embodiment.

(3) If zooming switch 102 is manipulated to the TELE side while the CPU of ZM/C 100 is executing a process in the above described second loop, the procedures described below are executed.

The CPU of ZM/C 100 advances the process from S18 to S19 in FIG. 38, and then calls and executes the TELE subroutine shown in FIG. 45. If cam ring 14 has stopped at the telephoto terminus (POS=A), it is unnecessary to rotate zoom motor 5, and the processes to invalidate manipulation of zoom switch 102 at S197A and S198A are executed. If cam ring 14 has stopped at a location other than the telephoto terminus (i.e., $2 \leq POS \leq 9$ when the TELE subroutine is called), the above described process of moving the value of POS to register Mpos is effected at S191A, and forward rotation of motor 5 at S192A is effected until cam ring 14 is driven to a location where POS=Mpos+1. At such location, S196A stops zoom motor 5. Thereafter, the processes to invalidate manipulation of zooming switch 102 are subsequently carried out, and the process is reset to S2 in FIG. 38. Thus, each time zoom switch 102 is moved to the TELE side, cam ring 14 moves one step in the direction of the telephoto terminus. In this way, the cam ring can be moved step-by-step from POS=2 (f0) to POS=A (f7'), whereby cam ring 14 can be position at a desired focal-length as shown in FIG. 43.

(4) If zoom switch 102 is moved to the WIDE side while the CPU of ZM/C 100 is executing a process due to the above described second loop, the procedures discussed below are executed.

The CPU of ZM/C 100 calls and executes the WIDE subroutine shown in FIG. 46 by advancing the process from S20 to S21 in FIG. 38. At S210A, a test for POS=2 is carried out. If POS=2, cam ring 14 has stopped at t wide angle terminus, and hence it is unnecessary to rotate zoom motor 5; and the processes to invalidate the manipulation of zooming switch 102 at S222A and 223A are executed. If POS$\neq$2, the above described process of moving the value of POS into register Mpos is effected at S211A, and, at S212A motor 5 is commanded to rotate in the reverse direction thereafter.

After the motor rotates in the reverse direction, cam 14 is driven to POS=Mpos−2 by executing loop S213A to S215A. When POS=Mpos−2, processes similar to the above described processes at S165A and S166A in case of the first embodiment, are executed at S216A and S217A, to eliminate backlash, and the loop process of S218A to S220A is executed until POS=-Mpos−1. When POS=Mpos−1, S221A stops rotation of zoom motor 5, and the processes to invalidate the manipulation of zoom switch 102 are subsequently executed at S222A and S223A, thereafter, the process is reset to S2 in FIG. 38.

Thus, each time zoom switch 102 is moved to the WIDE side cam ring 14 moves one step in the direction of the WIDE terminus in a manner that eliminates backlash. In this manner, the cam ring can be moved step-by-step from POS=A (F7') to POS=(fo) whereby cam ring 14 can be positioned at a desired focal-length as shown in FIG. 43.

THIRD EMBODIMENT OF ZOOM LENS SYSTEM DRIVE

Figure 3:
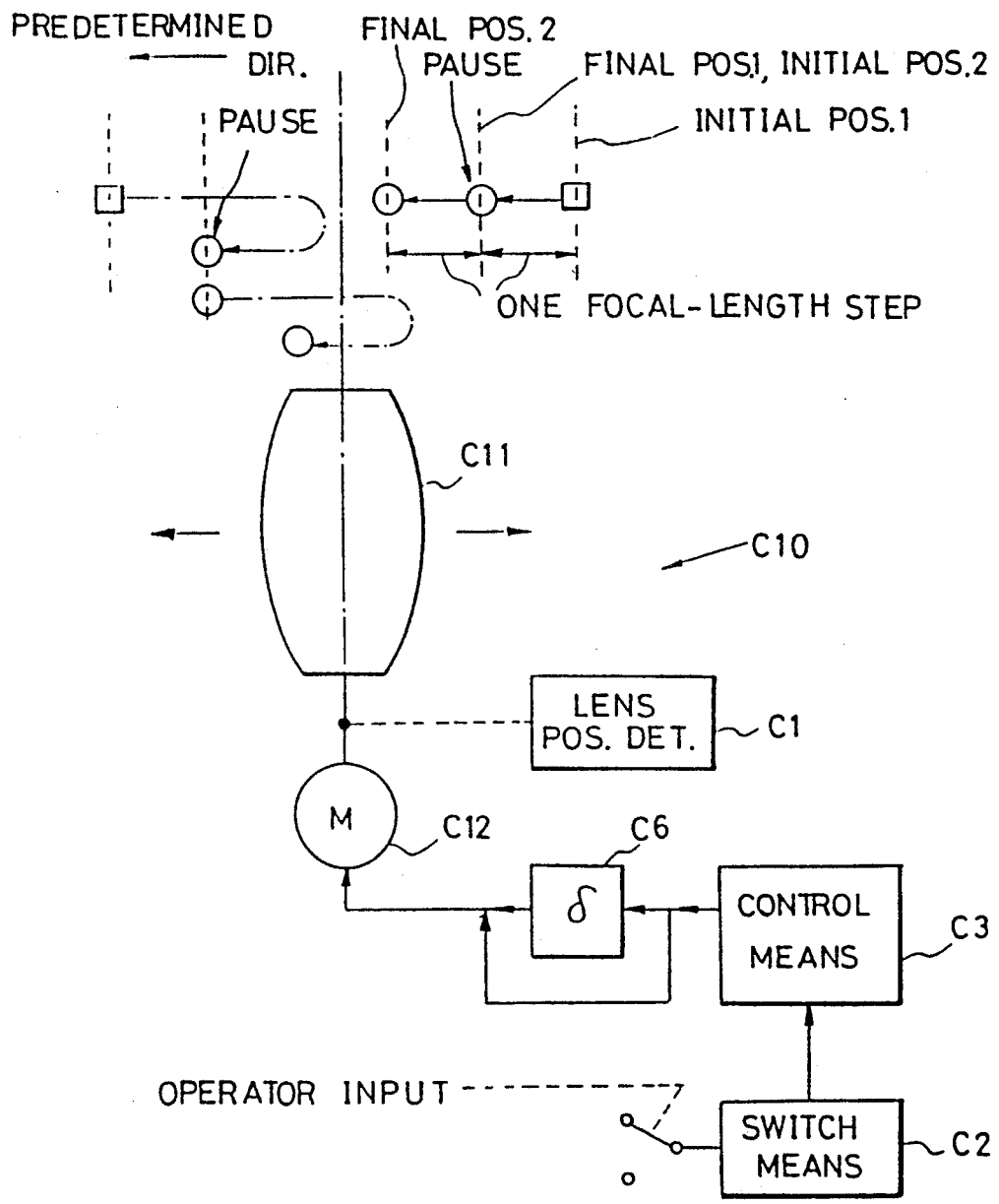
FIG. 3 is a schematic block diagram of a third embodiment of the present invention.

Referring now to FIG. 3, reference numeral C10 designates, in schematic form, a third embodiment of the invention as shown in schematic form. Embodiment C10 includes zoom lens C11 for a camera having between-the-lens shutter including motor C12 for moving the lens (through a mechanical coupling, not shown) in forward and rearward direction, as indicated by the arrows in FIG. 3. Switch means C2 has two operator-selected input settings to control operation of motor C12 for moving the lens from an initial position, defined by the position of the lens when the switch is operated, to a final stationary position establishing the focal length of the lens. Embodiment CIO also includes position detector C1 for detecting the position of the lens, delay means C6 for introducing a predetermined pause in operation of the motor, and control means C3 responsive to sustained operation of switch C2, to position detector means C1, and to delay means C6 for operating the motor such that: (1) the final position of the lens is a predetermined number of discrete focal-length steps from its initial position; (2) movement of the lens to its final position always occurs while the lens is travelling in a predetermined direction; and (3) the lens remains stationary at its final position for said predetermined pause before moving to another position located therefrom by said predetermined number of discrete focal-length steps.

In the third embodiment of the present invention, the manner of driving the lens is different from the manner of driving the lens in the two previously described embodiments, but only a program change is required. Before describing this embodiment in detail, the manner of driving the lens is first described.

(1) If mode changeover switch 101 is set to LOCK position and cam ring 14 is located any position other than POS=φ, zoom motor 5 rotates in the reverse direction driving cam ring 14 in the rearward direction until POS=φ(see FIGS. 29 and 47) is detected, and then stops.

(2) If mode changeover switch 101 is set to MACRO position and cam ring 14 is located at any position other than POS="C", zoom motor 5 rotates in the forward direction driving cam ring 14 forwardly until POS="C" (see FIGS. 29 and 47) and the stops.

(3). If mode changeover switch 101 is set to ZOOM position and cam ring 14 is located at any position other than POS="2" (i.e., at any of focal-length steps of f7'):

a) If Zoom switch 102 is set at TELE position, and remains there, zoom motor 5 rotates in the forward direction and stops after cam 14 has experienced a change of one focal-length step in the forward direction (i.e., in a direction toward the telephoto terminus). After pausing at the new focal-length step for a time t' msec, the previous stop is repeated. As a result, the cam ring moves forwardly one focal-length step at a time, step-by-step, pausing between steps until the cam ring reaches the telephoto terminus. If switch 102 is moved to its neutral position, further stepping of the cam ring terminates.

b) If zoom switch 102 is momentarily set to WIDE position, zoom motor 5 first rotates in the reverse direction until cam ring 14 has experienced a change of two focal-length steps rearwardly from its initial position, then further rotates in the reverse direction for a predetermined time t' msec, and then reverses rotation and runs in the forward direction until the cam ring has experienced a net change of one focal-length step rearwardly of its initial position; and then, the motor stops rotating. The cam ring is so driven at the WIDE position of switch 102 to remove mechanical backlash of lens barrel block 1 and finder block 2 for minimizing the difference between the stop position of the zoom motor 5 when the latter stops rotating in the WIDE direction, and when it stops rotating in the TELE direction. If switch 102 remains at its WIDE position, the cam ring moves rearwardly one focal-length step at a time, step-by-step, pausing between steps until the cam ring reaches the wide angle terminus.

The entire control system, including the above-described control of the camera is described below in reference to FIGS. 48 and 49. The main flow chart for the third embodiment of the invention is identical with that shown in FIG. 38/ the mode subroutine is identical with that shown in FIG. 44, and the explanation with respect to them is the same as their counterparts in the descriptions of the first and second embodiments. The TELE and WIDE subroutines, however, are different.

TELE SUBROUTINE FOR THIRD EMBODIMENT

Figure 48:
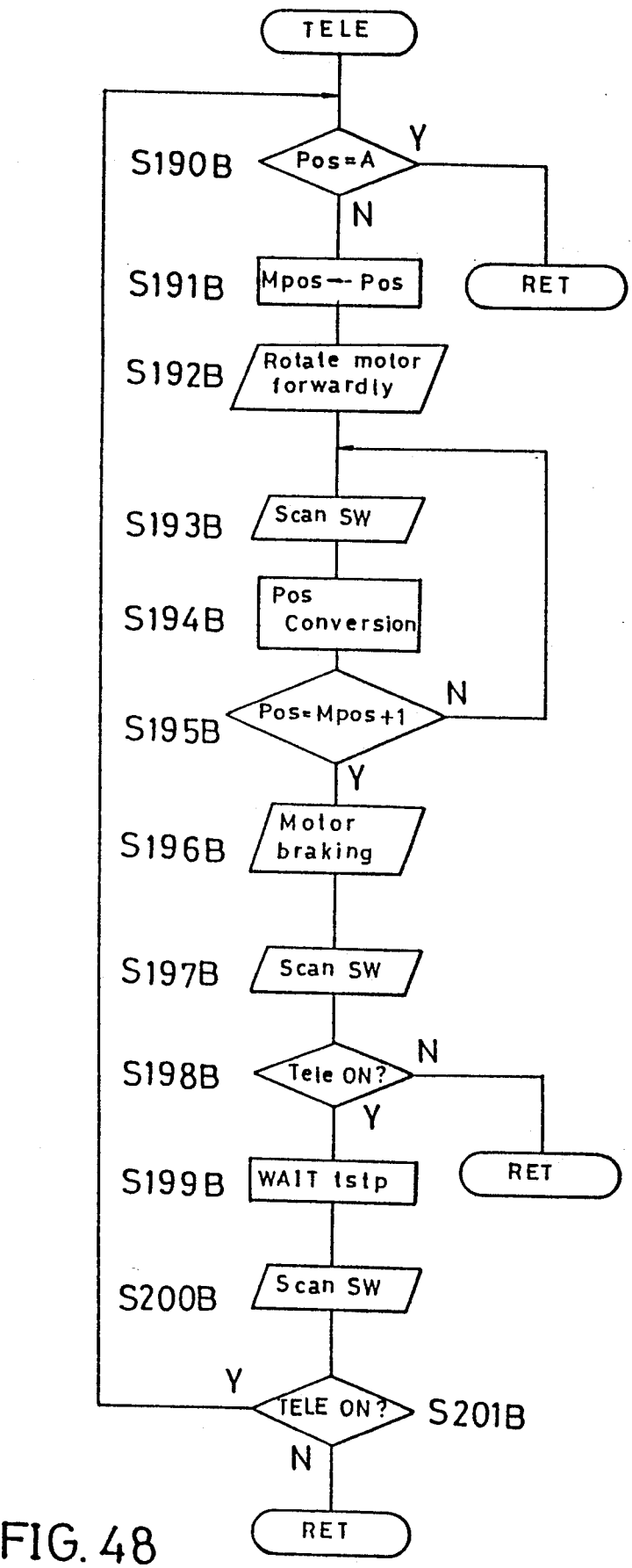

Referring to the flow chart of the TELE subroutine in FIG. 48, at S190B, the CPU of ZM/C 100 tests whether POS=A as a result of the POS conversion at S9 in FIG. 38. If POS =A, the process is reset to S2 in FIG. 38. If POS≠A, namely if 2≦POS≦9, the process advances to S191B to store the result of the POS conversion at S9 in FIG. 38 (initial position of the cam ring) in register Mpos. At S192B, motor 5 is commanded to rotate in the forward direction.

At S193B and S194B, processes similar to those at S8 and S9 in FIG. 38 are executed; thereafter, at S195B, the result of the POS conversion at S194B is tested for POS=Mpos+1 to determine if the cam ring has moved one focal-length step from its initial position in the direction of the telephoto terminus. If POS=Mpos+1, S196B causes zoom motor 5 to stop, and scanning of the switches occurs at S197B. If zoom switch 102 is not set to the TELE side when S198B is executed, the process is reset to S2 in FIG. 38; otherwise, switch 102 remains at the TELE side and the process advances to S199B which executed a delay of t msec. Consequently, the cam ring will have been moved by one focal-length step from its initial position in the forward direction and will pause at its new position for t msec.

After the delay, S200B causes the switches to be scanned. If zoom switch 102 remains at the TELE side, S201B is executed and the process is reset to S190B to repeat the above-described process. If the switch has been changed from the TELE side, the process is reset to S2 in FIG. 38.

At S195B, if POS≠Mpos+1, the processes at S193B to S195B are repeated until POS=Mpos+1.

WIDE SUBROUTINE FOR THIS EMBODIMENT

Figure 49:
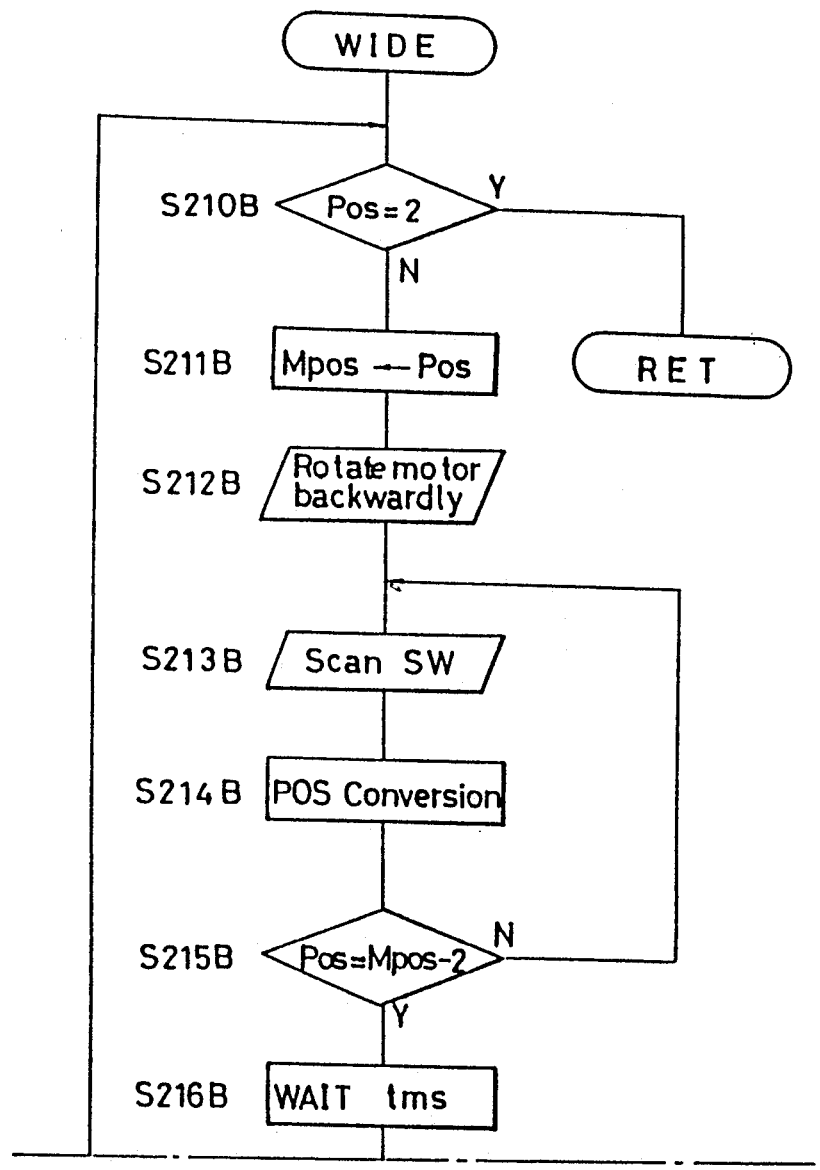
FIG. 49 is a diagram showing the relationship between FIGS. 49A and 49B.
Figure 49B:
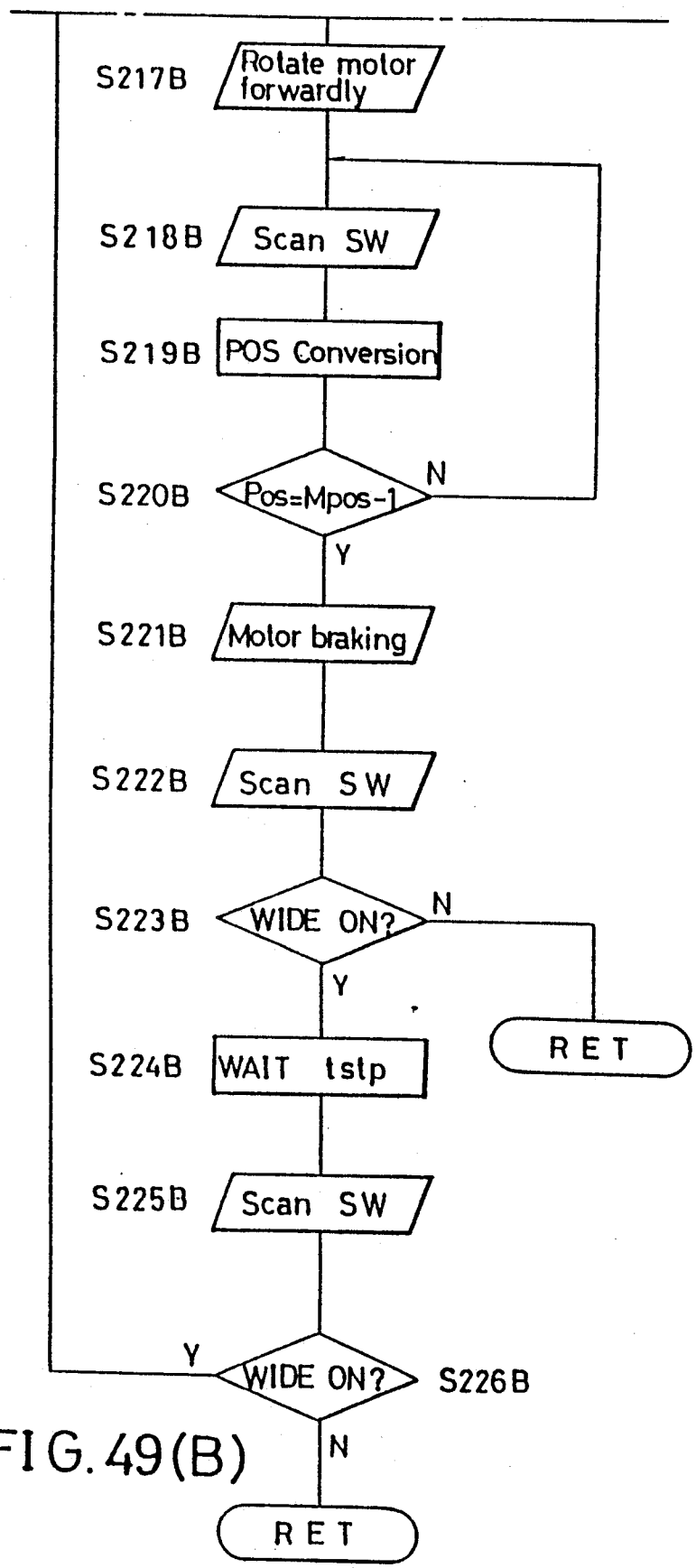

Referring to the flow chart of the WIDE subroutine in FIG. 49, at S210B the CPU of ZM/C 100 tests whether POS=2 as a a result of the POS conversion at S9 in FIG. 38, i.e., whether zoom motor 5 is already stopped at the wide-angle terminus. If POS=2, the process is reset to S2 in FIG. 38; otherwise the process advances to S211B where the result of the POS conversion at S9 in FIG. 38 (initial position of the cam ring) is stored in the register Mpos. At S212B, the zoom motor is commanded to rotate in the reverse direction driving the cam ring rearwardly toward the wide angle terminus.

At S213B and S214B, processes similar to those for S8 and S9 in FIG. 38 are effected; and thereafter, at S215B, POS=Mpos−2 is evaluated using the result of the POS conversion at S214B to determine if the cam ring has moved two focal-length steps from its initial position in the direction of the wide angle terminus. If POS=Mpos−2 evaluates to true, the process advances to S216B; otherwise, the processes at S213B to S215B are repeatedly executed until POS=Mpos−2 evaluates to true.

At S216B and S217B, processes similar to the above-described processes for S165 and S166 in FIG. 39 are executed to delay reversal of motor rotation for t msec; and afterwards at S218B and S219B, processes similar to the above-described processes for S8 and S9 in FIG. 38 are executed.

The motor is now rotating in the forward direction. At S220B, if POS=Mpos−1 based on the POS conversion at S219B, which is to say that the cam ring has moved one focal-length step from its initial position in the direction of the WIDE terminus, the process advances to S222B where the motor is braked to a stop. If POS≠Mpos−1, the processes at S218B to S220B are repeated until POS=Mpos−1. The switches are scanned at S222B; and at S223B, and the state of zoom switch 102 is tested. If the setting of this switch has changed, the process is reset to S2 in FIG. 38; otherwise, S224B executes a waiting process of t msec before the switches are again scanned at S225B. At S226B, the state of switch 102 is tested. If this switch remains set to the WIDE side, the process is reset to S210B to repeat the above-described procedure. If the setting of switch 102 has been changed, the process is reset to S2 in FIG. 38.

OPERATION OF THIRD EMBODIMENT

The effects of the processes at S1 to S22 in FIG. 38 and those in FIGS. 44, 48, and 49 are explained below. Explanations of operations that are identical with their counterparts in case of the first and second embodiments are omitted.

(1) Batter 106 is mounted in the battery case (not shown) and none of the following switches are manipulated: takeup motor control switch 119, shutter release button 99, and zoom switch 102.

a) If the setting of mode changeover switch 101 is in LOCK position, the processes executed are the same as described in paragraph (1)a) in the description of the first and second embodiments.

b) If the setting of mode changeover switch 101 is changed from LOCK to ZOOM position, the processes executed are the same as described in paragraph (1)b) in the descriptions of the first and second embodiments.

c) If the setting of mode changeover switch 101 is changed from ZOOM to MACRO position when cam ring 14 has stopped at the wide-angle terminus (POS≦2), the processes executed are the same as described in paragraph (1)c) in the descriptions of the first and second embodiments.

d) If the setting mode changeover switch 101 is changed from MACRO to ZOOM position, the processes executed are the same as described in paragraph (1)d) in the description of the first and second embodiments.

e) If the setting of mode changeover switch 101 is changed from ZOOM to MACRO position when cam ring 14 has stopped at the telephoto terminus (POS=A), the processes executed are the same as in paragraph c) above with the exception that the starting point is POS=A instead of POS =2.

f) When the tests at S148A, S149A, S169A and S170A in FIG. 44 in the processes described in paragraphs b) to d) above determine that the mode changeover switch has been changed from ZOOM to either LOCK, or MACRO position, the processes executed will be the same as in paragraph (1)f) in the description of the second embodiment.

g) If the setting of mode changeover switch 101 is changed to the ZOOM position while cam ring 14 is located at 2≦POS≦9 during the loop processes of S131A to S133A, S138A, S140A, S141A to S131A, or during the loop process of S131A to S137A to S131A in FIG. 44, the processes executed will be the same as in paragraph (1)g) in the description of the second embodiment.

h) If the setting of mode changeover switch 101 is changed from LOCK to ZOOM position while cam ring 14 is located at a position corresponding to POS=1 in the loop processes of S131A to S136A to S131A in FIG. 44, the processes carried out are the same as described in paragraph (1)h) in the first and second embodiments.

(2) If takeup motor control switch 119 is manipulated while the CPU of ZM/C 100 is executing a loop process due to the above-described first loop, second loop, etc., the processes carried out will be the same as described in paragraph (2) in the description of the first and second embodiments.

(3) switch 102 is moved to the TELE side while the CPU of ZM/C 100 is executing a process in the above-described second loop, the procedures described below are executed.

The CPU of ZM/C 100 advances the process from S18 to S19 in FIG. 38, and then calls and executes the TELE subroutine shown in FIG. 48. If cam ring 14 has stopped at the telephoto terminus (POS=A), rotation of the zoom motor is not necessary; and the process is therefore immediately reset to S2 in FIG. 38. If cam ring 14 has stopped at a location other than the telephoto terminus (i.e., 2≦POS≦9) when the TELE subroutine is called, the above-described process of moving the value of POS to register Mpos is effected at S191B (to establish the initial position of the cam ring), and forward rotation of motor 5 at S192S is effected until cam ring 14 is driven, by procedure S193B to S193B, until POS=Mpos+1. When POS=Mpos+1 evaluates to true, S196B causes zoom motor 5 to stop. At S197B and S198B, zoom switch 102 is scanned and then tested. If the switch is set to TELE-off, the process is reset to S2 in FIG. 38; but, if the switch is set to TELE-on, a pause of t' msec is effected at S199B. Only if TELE-on is thereafter reconfirmed by the processes at S200B and S201B, is execution of the process at S192B repeated to cause zoom motor 5 to again rotate in the forward direction.

Thus, as zoom switch 102 is manipulated to the TELE side for turning-on the motor, cam ring 14 repeatedly moves toward the telephoto terminus, in one focal-length steps, step-by-step, in the forward direction, pausing between steps until the range POS=2 to POS=A is traversed, step-by-step. By having TELE turned on sufficiently long, cam ring 14 is driven to and stops at the telephoto terminus.

(4) If zooming switch 102 is manipulated to the WIDE side while the CPU of ZM/C 100 is executing the above-described second process, the following occurs:

a) The CPU of ZM/C 100 calls and executes the WIDE subroutine shown in FIG. 49 by advancing the process from S20 to S21 in FIG. 38. At S210B, POS=2 is tested. If POS=2, cam ring 14 is stationary at the wide-angle terminus and it is unnecessary to immediately rotate zoom motor 5. Thus, the process is reset to S2 in FIG. 38. If POS≠2, S211B moves the value of POS into register Mpos to store the initial position of the cam ring, and S212B commands zoom motor 5 to rotate in the reverse direction driving the cam ring rearwardly.

After the process of S212B is executed, loop S213B to S215B is executed causing cam ring 14 to be driven until POS = Mpos−2 after which processes S216B and S217B are executed. When motor reversal occurs at S217B, the cam ring will be between two and three focal-length steps displaced from its initial position in the direction of the WIDE angle terminus. These processes are similar to the above-described described processes at S165 and S166, in case of the first embodiment, for eliminating backlash. Thereafter, the loop process of S218B to S220B are executed until POS=Mpos−1. When this condition is detected, S221B stops rotation of zoom motor 5, and the cam ring is displaced one focal-length step from its initial position, S223B then tests whether switch 102 is currently set to WIDE-on. If it is, a t' msec pause is effected at S224B, and zoom motor 5 is caused to restart rotation in the reverse direction by the process at S212B. If the scan at S222B shows that switch 102 is set to WIDE-off, the process is reset to S2 in FIG. 38.

Thus, if zoom switch 102 is maintained at WIDE-on, cam ring 14 repeats, during the time the switch remains set to WIDE-on, a sequence of move, stop and pause operations as the cam ring moves in one focal-length steps, step-by-step, toward the WIDE angle terminus, pausing for t' msec between steps. This step-by-step progress of the cam ring in the rearward direction is carried out in a way that eliminates backlash. By leaving WIDE-on sufficiently long, cam ring 14 is driven to and stops at the wide-angle terminus.

FOURTH EMBODIMENT OF THE ZOOM LENS SYSTEM DRIVE

Referring now to FIG. 4, reference numeral D10 designates a fourth embodiment of the invention in schematic form. Embodiment D10 includes zoom lens D11 for a camera having between the lens shutter including motor D12 for moving the lens (through a mechanical coupling, not shown) in forward and rearward direction, as indicated by the arrows in FIG. 4. Switch means D2 has a plurality of settings selected by an operator to control operation of motor D12 for moving the lens from an initial position; defined by the position of the lens where the switch is operated, to a final stationary position establishing the focal-length of the lens. Embodiment D10 also includes position detector D1 for detecting the position of the lens, memory means D6 for storing data representative of the position of the lens, and control means D5 responsive to selection of a setting of switch D2, to position detector means D1, and to memory means D6 for operating the motor such that selection of a zoom setting of the switch means causes motor D12 to drive the lens from its initial position to a final position determined by the contents of memory means D6 under the condition that movement of the lens to its final position always occurs while the lens is travelling in a predetermined direction.

In the fourth embodiment of the invention, the manner of driving the lens differs from that used to drive the lens in the previous embodiments, but only a change in the program is required. Before describing this embodiment in detail, the manner of driving the lens is first described.

(1) When node changeover switch 101 is set to LOCK position and cam ring 14 is located any position other than POS=$\phi$, zoom motor 5 rotates in the reverse direction driving cam 14 rearwardly until POS=$\phi$ (see FIGS. 29 and 50), and then stops.

(2) When mode changeover switch 101 is set to MACRO position and cam ring 14 is located at any position other than POS="C", zoom motor 5 rotates in the forward direction driving cam ring 14 forwardly until POS="C", and then stops.

(3) When mode changeover switch 101 is set to ZOOM position, and zoom motor 5 is rotating in the reverse direction, setting zoom switch 102 to its WIDE position will cause the motor to stop and then rotate in the forward direction. If the switch is set to TELE position, the motor stops when POS="A". If switch 101 is set to WIDE position, zoom motor 5 rotates continuously in the reverse direction for a short time after POS="1", and then rotates in the forward direction. When POS="2", motor 5 stops rotating. If zoom switch 102 is turned off (placed at the neutral position) during the rotation of zoom motor 5, the latter, if it is rotating in the TELE direction (forward), stops immediately. If the motor is rotating in the WIDE direction (reverse) it will stop after rotating in the forward direction for a short time. The rotation for this short time is intended to eliminate mechanical backlash from the lens barrel block 1 and finder 2 in order to eliminate differences between the stop positions of the motor 5 when rotating in the WIDE and TELE directions, respectively.

(4) If the setting of mode changeover switch 101 is changed from LOCK or MACRO position to ZOOM position:

a) if switch 101 is changed from LOCK to ZOOM position, the motor 5 rotates in the forward direction, and b) if switch 101 is changed from MACRO to ZOOM position, the motor rotates in the reverse direction and stops at the last lens position at which the switch had been previously changed from ZOOM to LOCK position.

The operation effected when zoom switch 101 is shifted from MACRO to ZOOM includes the above-described operation that eliminates backlash.

Also, in this embodiment, because the lens position is detected in stepwise fashion (there are 13 steps from "0" to "C"), a specific lens position value for example Pos=5, does not establish a unique lens position. For this reason, when any of the lens positions within the range of Pos="2" to "A" is restored, zoom motor 5 is caused to stop at a change point whereby the lens does not precisely return to the initial position but to a position very near it.

The whole control system, including the above-mentioned control, of the camera is described below in further detail with reference to FIGS. 51 and 52.

Figure 51A:
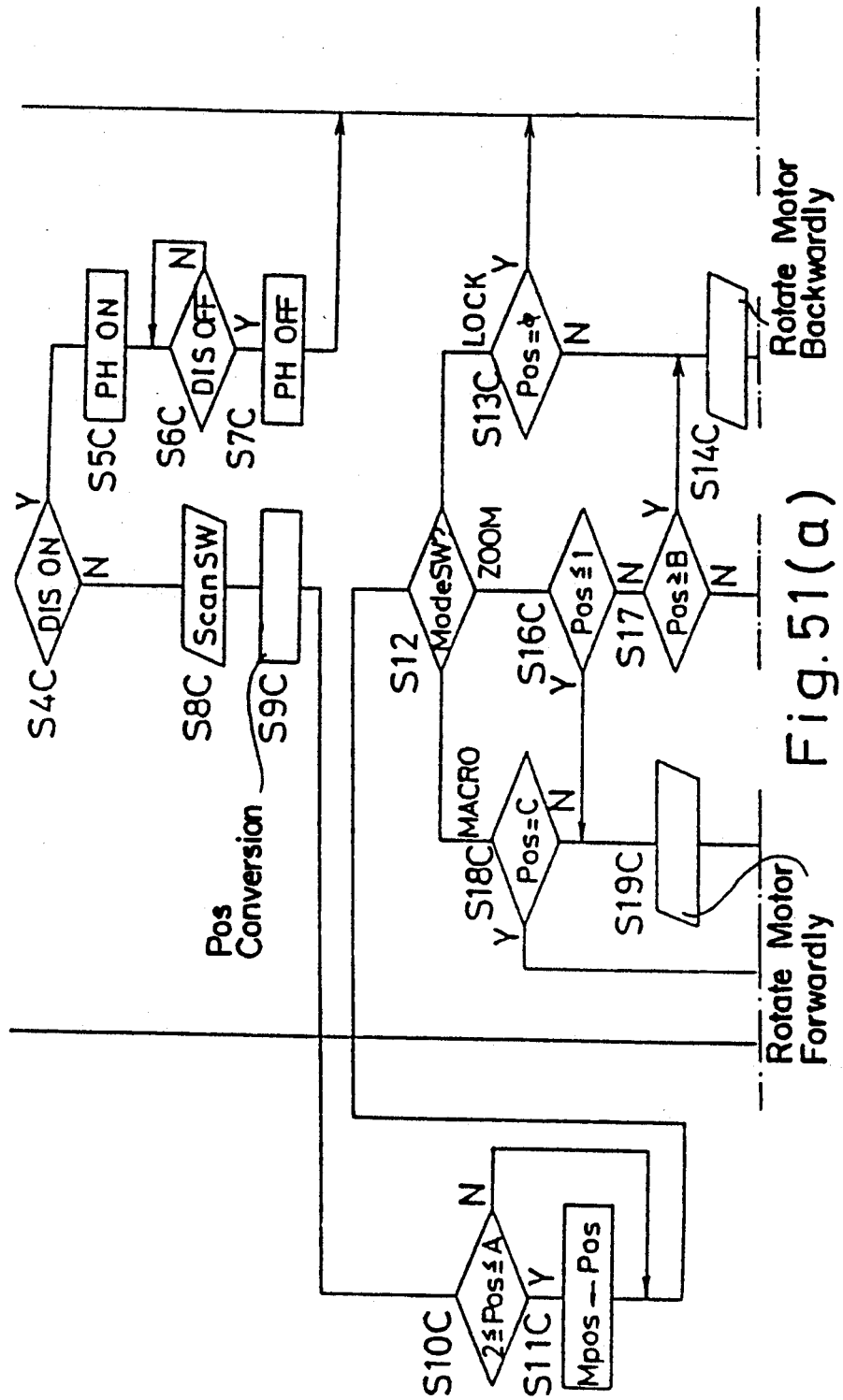
Figure 51B:
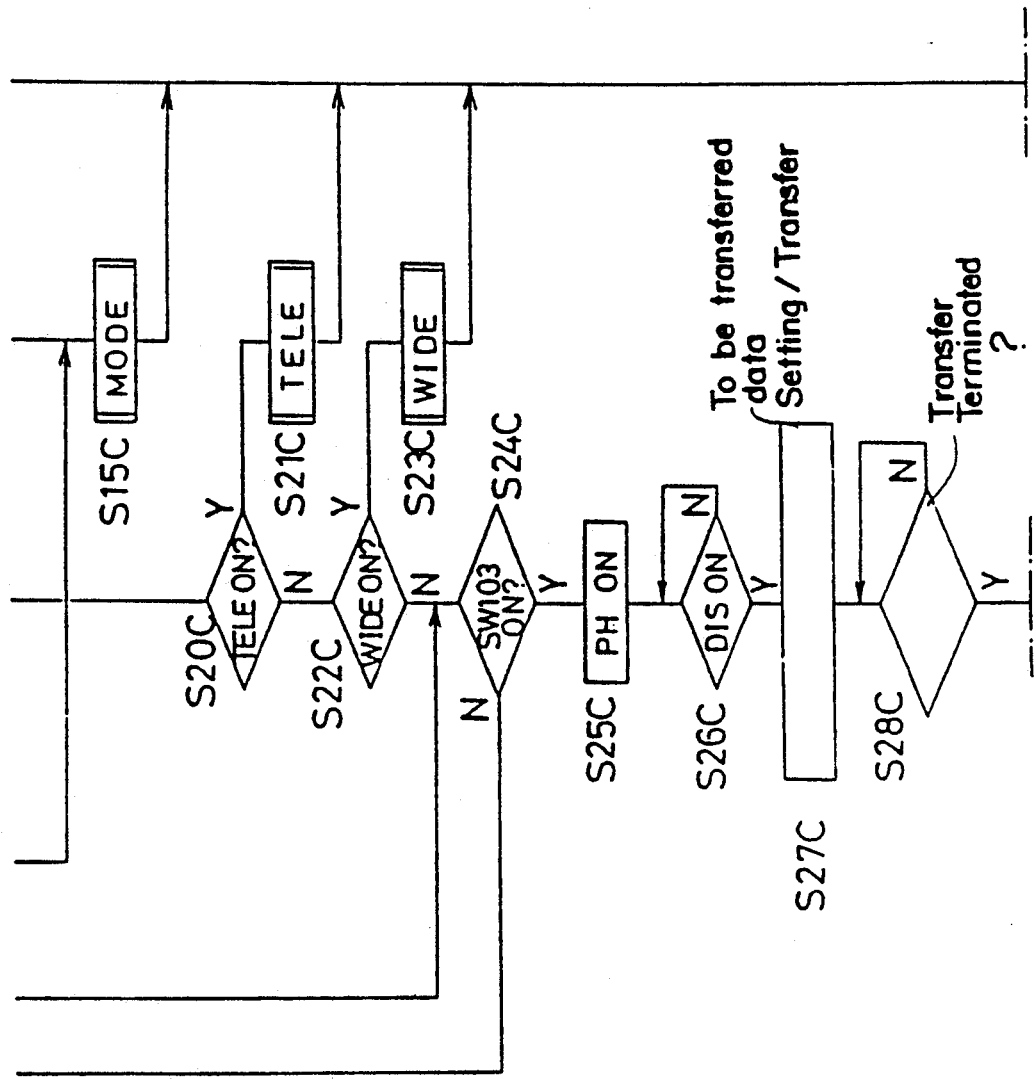
Figure 51C:
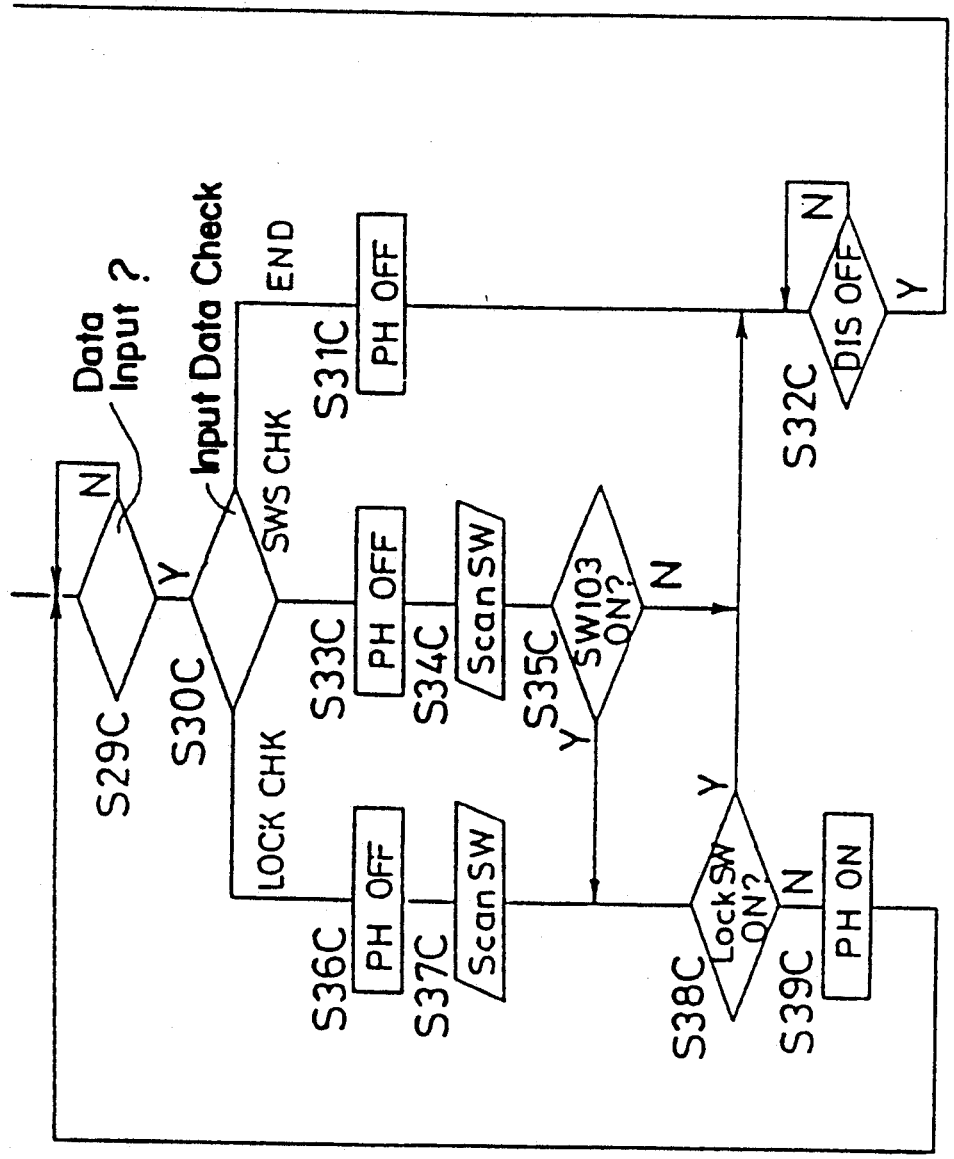

The flow chart shown in FIG. 51 is essentially the same as the flow charts illustrated and explained with respect to the previous embodiments, except for the processes added between the S9 and S12 in the preceding three embodiments in order to implement the action peculiar to this embodiment.

After Pos conversion at S9C, S10C tests for the condition $2 \leq Pos \leq A$. If the condition is true, S11C causes the POS value to be moved to and stored in register Mpos in the CPU or RAM. If Pos>A or Pos<2, the process jumps from S10C to S12C without saving the POS value. Periodic execution of the processes at S10C and S11C saves the current lens position within the zooming range of the zoom lens each time the program returns to S2C. In the preferred embodiment, the initial Mpos value is set by the position to Mpos=2.

MODE SUBROUTINE OF FOURTH EMBODIMENT

Figures 52, 52A:
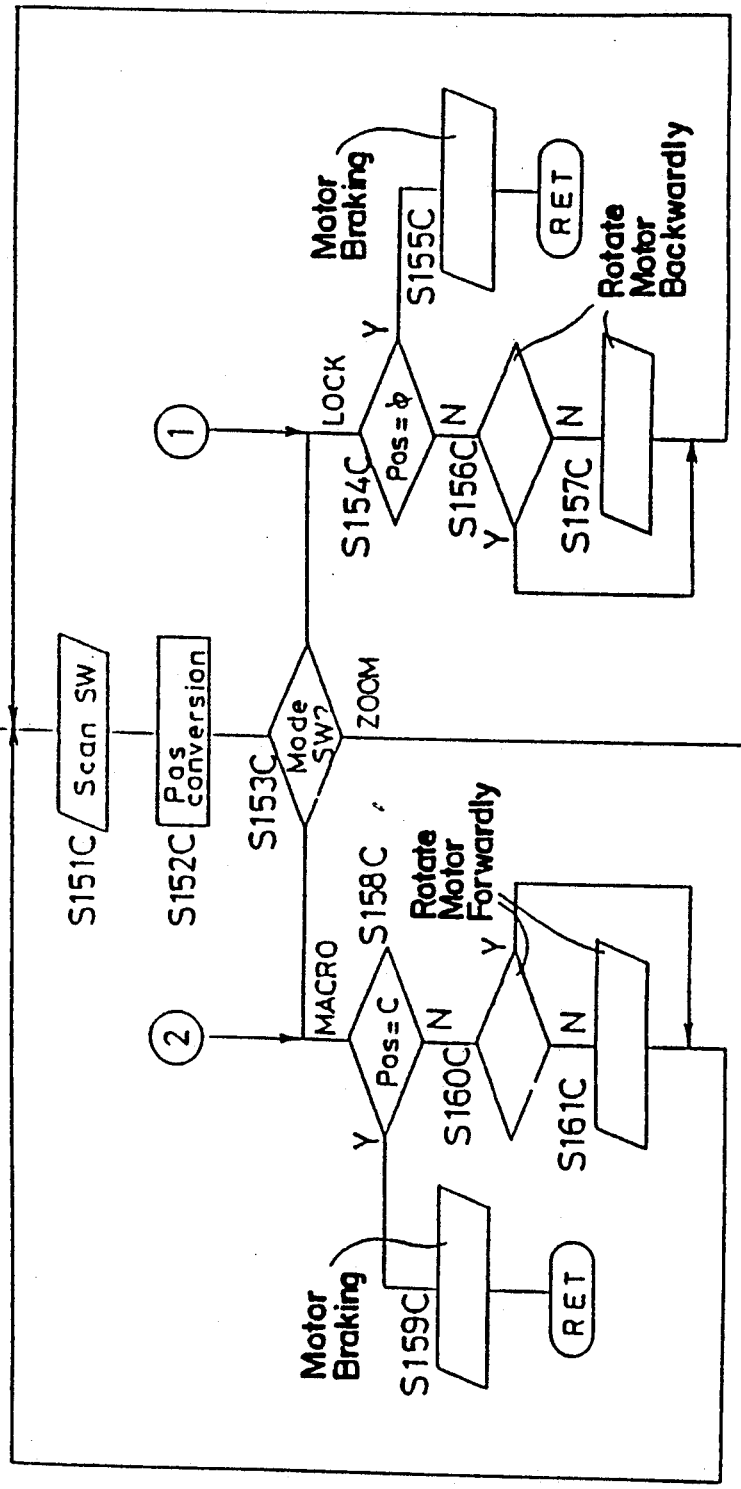
Figure 52B:
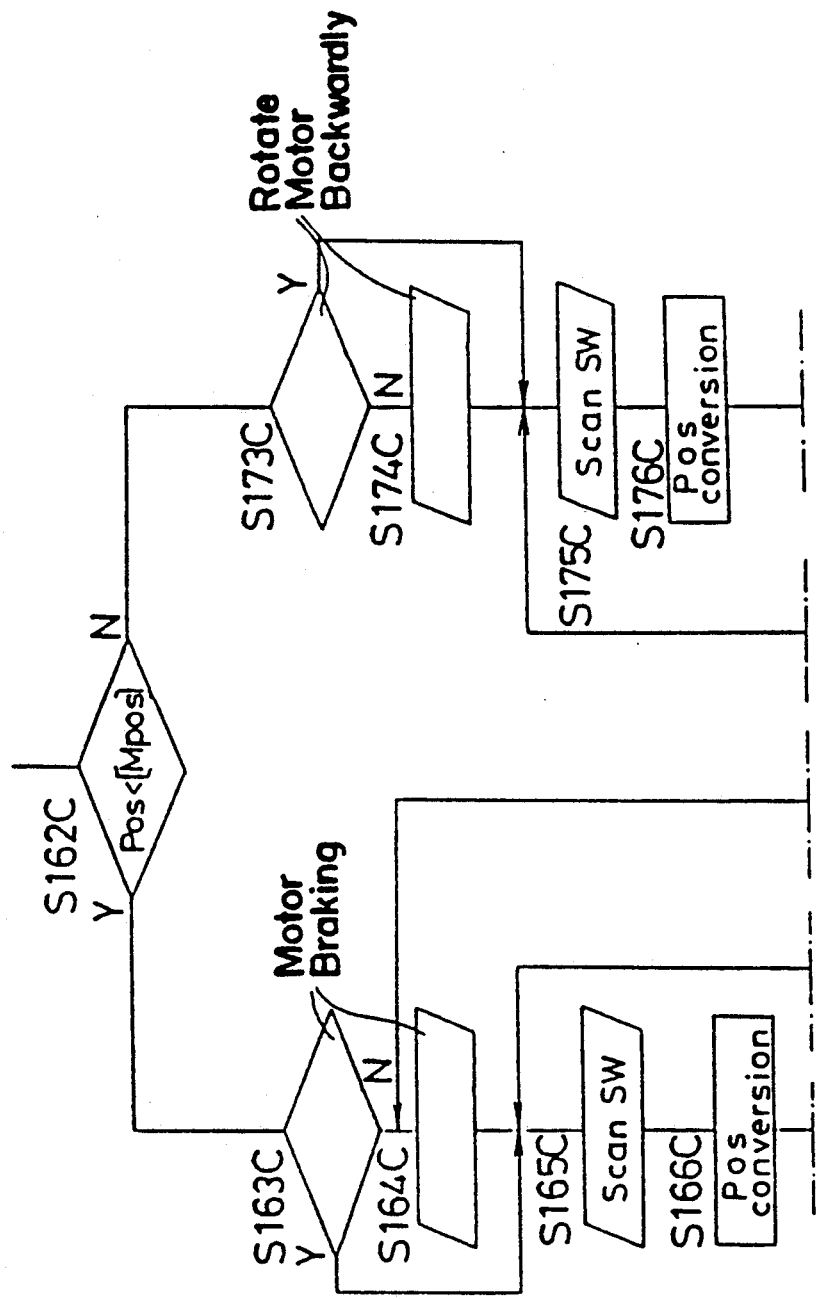

Referring now to the flow chart of the mode subroutine in FIG. 52, the CPU of ZM/C 100 executes each of the processes at S150C to S161C which are similar to those at S130 to S141 in the preceding embodiments, according to the mode as established by the setting of mode changeover switch 101.

If mode changeover switch 101 is set to ZOOM, S162C tests whether the result of the Pos conversion at S152C is Pos<Mpos, namely, whether the current position of the cam ring is closer to the WIDE angle terminus than the focal-length step occupied by the cam ring when step S11C was executed. If Pos<Mpos, the process advances to S163C, but if Pos≧(Mpos), the process advances to S173C.

If Pos<(Mpos), S163C tests whether the zooming motor 5 is rotating in the forward direction. If so, the process jumps to S165C; otherwise, S164C reverses rotation of the motor which thereafter runs in the forward direction.

Processes similar to those at S8C and S9C in FIG. 51 are executed at S165C and S166C. Thereafter, at S167C and S168C, based on the switch scan at S165C, a determination is made as to whether the setting of mode changeover switch 101 has been changed from ZOOM to either LOCK, or MACRO. If switch 101 has been changed to LOCK, the process returns to S154C; and if the switch has been changed to MACRO, the process returns to S158C. If the switch position remains at ZOOM, the process advances to S169C.

S169C tests whether the result of the Pos conversion made at S166C is Pos=Mpos (i.e., whether the cam ring has been returned to the stored location). If Pos≠Mpos, the process returns to S165C. If Pos=Mpos, the process advances to S170C which stops further rotation of zoom motor 5 because the cam ring has returned to the stored location.

S171C tests whether the result of the Pos conversion at S166C is Pos 2. If Pos=2, the cam ring has stopped at the wide angle terminus; and in such case wide-angle terminus flag Fwide is set to "1", and thereafter, the process returns to S2C in FIG. 51. If POS≠2, the process immediately returns to S2C with setting flag Fwide.

If Pos>Mpos as a result of the test at S162C, the process advances to S173C which tests whether zoom motor 5 is rotating in the reverse direction. If so, the process jumps to S175C; otherwise, motor 5 is rotating in the forward direction, and S174C causes rotation of the motor to reverse and to run in the reverse direction; thereafter, the process advances to S175C.

At S175C and S176C, processes similar to those at S8C and S9C in FIG. 51 are executed; and at S177C and S178C, processes similar to those at S167C and S168C are executed.

If the position (mode) of mode changeover switch 101 remains set at ZOOM, S179C tests whether the result of the Pos conversion at S176C is Pos=Mpos−1, namely, whether the current position of the cam ring is one focal-length step closer to the WIDE angle terminus than when the focal-length step of the cam ring was stored in Mpos at S11C. If Pos≠Mpos−1, the process returns to S175C and this loop S175C to S179C is repeatedly executed until Pos=Mpos−1. When Pos=Mpos−1, S180C executes a standby process for the t msec for the reasons explained above; afterwards, the process advances to S164C. Thereafter, Pos=Mpos is attained by executing the processes at S164C to S172C. Thus, the cam ring is returned to the stored location after moving to such location in the forward direction.

The TELE subroutine and the WIDE subroutine in this embodiment are the same as the respective subroutines in the first embodiment. For this reason, no further explanation is required.

OPERATION OF THE FOURTH EMBODIMENT

The effects of the processes at S1C to S24C in FIG. 51 and those in FIG. 52 are explained below. However, the explanation of operations identical to processes having counterparts in the previous embodiments are omitted.

(1) Battery 106 is connected and none of switches are manipulated: takeup motor control switch 119, shutter release button 99, and zoom switch 102.

a) If mode changeover switch 101 is in the LOCK position, a first loop is executed as described in paragraph a) in the description of the first to the third embodiments.

b) If mode changeover switch 101 is changed from LOCK to ZOOM position, the CPU of ZM/C 100 exits the above mentioned first loop and advances to S16C. Because Pos="0", the process advances to S19C which causes zoom motor 5 to rotate in the forward direction, and then branches to the WIDE subroutine (FIG. 52) and executed the procedures S163C, S165C, and S166C through S150C, S153C and S162C. Under the condition that mode changeover switch 101 has not been shifted from ZOOM to either LOCK or MACRO at S167C and S168C, the loop process of S169C, S165C and S168C causes the motor to drive the cam ring until Pos=Mpos. Then, after S170C stops zoom motor 5, the process returns to S2C in FIG. 51 through S171C or S171C and S172C.

When shipped from the factory, "2" is stored in $M_{pos}$. Thus, when the camera is first used after shipment from the factory, cam ring 14 is driven from POS=$\phi$ to the wide-angle terminus (Pos=2) where the focal length is $f_o$. The next time the camera is used, the cam ring is driven from POS=$\phi$ to the position where zooming was done in the last zooming mode (i.e., the position stored in register Mpos at S11C). After the CPU of ZM/C returns to S2C, each process of the second process loop (S4C, S8C to S12C, S16C, S17C, S20C, S22C, S24C and S4C) is repeated under the condition that none of the camera controls is changed. However, because the Pos data remains unchanged throughout a certain range of zoom positions, the previous zoom position will not always coincide exactly with the stop position attained under the stop control of Pos data change point based on the Mpos value. However, the error is only a small one; and if the cam ring returns to a position very close to the previous zoom position, a zoom position very close to the photographer's choice is automatically determined making use of the camera very convenient.

c) If mode changeover switch 101 is changed from ZOOM to MACRO position under the condition that cam ring 14 is located at the wide-angle terminus, the effect will be the same as described in paragraph c) in the descriptions of the previous embodiments.

d) If mode changeover switch 101 is changed from the MACRO to ZOOM position, the CPU of ZM/C 100 causes the process to exit the loop at S12C and advance to S16C. Because Pos C, the process at S17C is executed and the process advances to S14C where zoom motor 5 is commanded to rotate in the reverse direction. The process then branches to the mode subroutine of FIG. 52 and advances through S151C to S153C. If switch 101 remains in the ZOOM position, the process advances to S162C, S173C, S175C, and S176C. After executing S177C and S178C, the loop S175C, S176C to S179C is repeatedly executed until Pos=Mpos−1. When Pos=Mpos−1, S180 C causes the motor to continue to rotate in the reverse direction for a time of t msec before S164C reverses rotation of zoom motor 5, and causes it to rotate in the forward direction.

Cam ring 14 is stopped as soon as it arrives at a position corresponding to Pos=Mpos from a position corresponding to Pos=Mpos−1. Note that if zoom motor 5 were rotating in the reverse direction driving the cam ring from POS=A toward POS=Mpos, and were stopped at Pos=Mpos−1 before being driven in the forward direction toward Pos=Mpos, zoom motor 5 is likely to stop without eliminating the backlash of the gears, etc. in the transmission system driving the cam ring. However, the processes at S180C and S164C cause zoom motor 5 to continue to operate in the reverse direction for a time t msec following detection of Pos=-Mpos−1 before the rotation of motor is reversed, motor 5 will return the cam ring to a position corresponding to Pos=Mpos while rotating in the forward direction, and can be stopped at such position with the elimination of backlash in the forward-rotation direction.

After completion of the process at S164C, the process loop of S165C to S169C is repeatedly executed until POS=Mpos; thereafter, zoom motor 5 is stopped at S170C, and the process advances through either S171C, or through S171C and S172C to S2C in FIG. 51. Thus, cam ring 14 is stopped at wide-angle terminus (Mpos) if no zooming had been done since the camera had been shipped from the factory. If a zooming operation had been carried out previously, the cam ring will be stopped at the previous zoom position stored in Mpos. The zoom position at which the cam ring stops based on Mpos does not always precisely coincide with the precedent zoom position, but is very close as has been described above.

After the CPU of ZM/C 100 returns to S2C as in paragraph b) above, each process executed during the previously mentioned second loop is repeated under the condition that none of the switch settings has been altered.

In case the process advances from S162C to S173C because mode changeover switch 101 has been changed from MACRO to ZOOM position, the above process will also take place if mode changeover switch 101 is changed to ZOOM position while cam ring 14 is located at a position corresponding to Pos>A during execution of loop S151C to S153C to S158C, S160C, S161C and S151C. However, in this case, zoom motor 5 is rotating in the forward direction when the process at S174C causes the motor to rotate in the reverse direction.

e) If mode changeover switch 101 is changed from ZOOM to MACRO position under the condition that cam ring 14 is stopped at POS=A, the same process described in paragraph c) above will be executed except that the starting point corresponds to Pos=A, not Pos=2.

f) If the tests at S167C, S168C, S177C and S178C in FIG. 52 referred to in paragraph b) and d) show that mode changeover switch 101 has been changed from ZOOM position to LOCK position, or to MACRO position, the processes executed as a result are the same as described in connection with the previous embodiment.

g) If mode changeover switch 101 is changed from LOCK to ZOOM position when cam ring 14 is located at POS=1 during the loop process of S151C to S156C and S151C in FIG. 52, the CPU of ZM/C 100 advances the process from S153C through S162C and S163C to S164C at which motor 5 is commanded to rotate forwardly. Thereafter, the processes that follow are the same as described in paragraph d).

(2) If takeup motor control switch 119 is actuated while the CPU of ZM/C 100 is executing any of the various loops described above, the effect will be the same as described in the above in connection with the previous embodiments.

(3) If zoom switch 102 is changed to the TELE side while the CPU of ZM/C 100 is executing the above described second loop, the effect will be the same as described in paragraph (3) in the description of the first embodiment.

When the CPU returns to the above described second loop after cam ring 14 is stopped at any location within the zooming range ($2 \leq Pos \leq A$), the resultant data indicative of the zoom position (lens position) are stored in register Mpos at S11C, and the current position of the cam ring becomes the initial zoom position during a subsequent zoom mode of operation.

(4) If zoom switch 102 is changed to the WIDE side while the CPU of ZM/C 100 is executing the above second loop, the effect of the processes that are executed will be the same as described in paragraph (4) in the description of the first embodiment. If CPU returns to the above-described second loop after cam ring 14 is stopped at any position with the zooming range ($2 \leq Pos \leq A$), the Pos data indicative of the zoom position is stored in register Mpos at S11C.

(5) If the mode changeover switch 101 is changed from ZOOM to LOCK and back to ZOOM, or from ZOOM to MACRO and back to ZOOM, cam ring 14 is moved as shown in FIG. 50.

In the fourth embodiment, the data $2 \leq Pos \leq A$ are stored in register Mpos in the CPU or RAM. However, this embodiment may be so arranged that the data $2 \leq Pos \leq A$ is stored in a non-volatile memory such as $E^2$ PROM to maintain the data even when the battery 106 is removed from the camera.

The above description of the various embodiments emphasizes that backlash is eliminated when rotation of motor 5 is changed from reverse to forward using the TELE terminus location as reference. However, the invention can also be implemented to eliminate the backlash when rotation of zoom motor 5 is changed from the forward to reverse using the WIDE terminus as reference.

Also for the first and fourth embodiments, the power of the lens can be set continuously, not merely in steps, like f2 to f7; and other types of position detectors, such as potentiometer which detect a continuous value, can be used.

The extra time t msec that the zoom motor runs in the reverse direction to ensure elimination of backlash has an absolute value that is dependent upon actual conditions such as the precision of the mechanical coupling between the motor and the cam ring, the physical of the focal-length steps, etc. The pause time t' msec, which is the time the cam ring pauses between stepping from one focal-length step to the next in the second through fourth embodiments, is dependent on design considerations such as the desirability for quickly scanning the zoom range, or providing more time for the photographer to decide whether he has properly framed the subject to be photographed.

What is claimed:

1. A lens shutter camera including a lens drive system, said lens drive system comprising:
   (a) at least one lens adapted to be positioned in at least two different focal length positions;
   (b) a reversible motor operable for moving the lens along a fixed optical axis in forward and rearward directions into at least said two positions;
   (c) switch means operable by an operator, said switch means including at least one switch for identifying the direction of movement of said lens toward one of said positions
   (d) control means responsive to said switch means for operating said motor such that movement of the lens from an initial position, determined by the position of the lens when the operator begins to operate the switch means, to a final position determined by the switch means, always ends after the lens travels to its final position in a predetermined direction which is independent of the position identified by the switch means, and
   said at least two positions including a retracted lens position.

2. A lens drive system according to claim 1, wherein one of said focal length positions is a telephoto position, and a second of said focal length position is a wide angle position.

3. A lens drive system according to claim 1, wherein said lens system includes a between the lens shutter.

4. A lens drive system in accordance with claim 1, wherein said lens is positionable at a wide angle position representing a relatively short focal length and a telephoto position representing a relatively long focal length, said predetermined direction being in a forward direction with respect to said telephoto position.

5. A lens drive system in accordance with claim 1, wherein said control means includes:
   (a) position detecting means for detecting the presence of said lens at one of said positions;
   (b) direction detection means for detecting the directional movement of said lens; and
   (c) logic means responsive to the switch means, said position detecting means, and to the direction detection means, said logic means comprising means for operating the motor in a direction such that the lens moves towards the position identified by said switch means, at least until said position detecting means detects the presence of said lens at one of said positions, said logic means thereafter either:
      (1) stopping operation of the motor, if the lens arrives at said final position moving in said predetermined direction; or
      (2) continuing operation of the motor for a given period, if the lens arrives at said final position moving in a direction opposite to said predetermined direction, and thereafter reversing the direction of movement of said lens by causing said motor to move the lens in said predetermined direction.

6. A lens drive system according to claim 5, wherein said logic means comprises means for continuing said operation of said motor in said opposite direction for a predetermined period of time prior to reversing the direction of movement of said lens.

7. A lens drive system in accordance with claim 5, wherein said logic means comprises means for disabling operation of said motor when said lens moves into one of said positions in said predetermined direction.

8. A lens drive system according to claim 1, including a between-the-lens shutter mounted for movement with the lens, means for focusing the lens on a subject to be photographed as a function of the distance of the subject from the camera, means for effecting focusing of the lens only after the lens arrives at said final position.

9. A lens drive system in accordance with claim 1, wherein said at least two positions also include a macro photographic position, located beyond the telephoto position, into which said lens can be moved for effecting close-up photography.

10. A lens drive system in accordance with claim 7, wherein said logic means comprises means for disabling operation of said motor when said lens moves along said predetermined direction into said telephoto position.

11. A lens drive system in accordance with claim 7, wherein said logic means comprises means for disabling operation of said motor after said lens has moved in a direction opposite to said predetermined direction, over a predetermined distance beyond said wide angle position, and thereafter said lens undergoes reverse movement back to said wide angle position.

12. A lens drive system in accordance with claim 4, wherein said retracted lens position is located rearwardly of said wide angle position.

13. A lens drive system according to claim 1, further including means for focusing said lens on an object at a plurality of distances from an image forming surface of the camera.

14. The lens drive system for a camera according to claim 1, further including means for detecting the focal length position of said lens.

15. A lens shutter camera including a photographic lens system and defining separate finder and photographic lens system optical axes, said camera including an apparatus for driving the photographic lens system of said camera and a fixed photographic lens said photographic lens system comprising means for focusing said photographic lens system on a photographic subject positioned at different distances from the camera, said lens system being movable along the fixed photographic lens system optical axis, in a predetermined direction and in a direction which is opposite to said predetermined direction, to at least two distinct focal length positions of said lens system, said apparatus including a driving source for moving said lens system, means for driving said driving source during movement of said lens system towards said focal length positions, and means for terminating movement of said lens system only when said lens system is moving in said predetermined direction.

16. The lens shutter camera according to claim 15, further including a between the lens shutter.

17. A lens shutter camera including a photographic lens system defining a photographic lens system optical axis and a viewfinder defining a viewfinder optical axis separate from the photographic lens system optical axis, said photographic lens system including at least one lens system movable along the optical axis of said photographic lens system in a predetermined direction and in a direction opposite said predetermined direction by a driving source in order to selectively position said photographic lens system into at least two different focal length positions, said camera including means for driving said driving source during movement of said lens system, means for terminating movement of said lens system only when said lens system is moving in said predetermined direction, and means for enabling the focusing of said photographic lens system on a photographic subject positioned at different distances from the camera.

18. The camera according to claim 17 further comprising a between-the-lens shutter.

19. The camera according to claim 17 further comprising means for mounting said photographic lens system to a camera body so that the optical axis of said photographic lens system is fixed.

* * * * *